US012326022B2

(12) United States Patent
Takase et al.

(10) Patent No.: US 12,326,022 B2
(45) **Date of Patent: *Jun. 10, 2025**

(54) DOOR ASSEMBLY FOR SELECTIVELY INTERLOCKING OPPOSING DOORS

(71) Applicant: Larson Manufacturing Company of South Dakota, LLC, Brookings, SD (US)

(72) Inventors: Ayako P. Takase, Providence, RI (US); Robert Hutton, IV, Providence, RI (US); Patrick Scott Grossman, Grand Haven, MI (US); Lynn K. Van Sickle, Coopersville, MI (US); Tommy Leon Knight, Grand Rapids, MI (US); Dylan S. Schlenvogt, Holland, MI (US); Brian Lafrence, Holland, MI (US)

(73) Assignee: Larson Manufacturing Company of South Dakota, LLC, Brookings, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,604

(22) Filed: Mar. 13, 2024

(65) Prior Publication Data

US 2024/0279969 A1 Aug. 22, 2024

Related U.S. Application Data

(63) Continuation of application No. 18/090,672, filed on Dec. 29, 2022, now Pat. No. 11,952,814, which is a (Continued)

(51) Int. Cl.
*E05C 7/02* (2006.01)
*E05B 9/10* (2006.01)
(Continued)

(52) U.S. Cl.
CPC .................. *E05C 7/02* (2013.01); *E05B 9/10* (2013.01); *E05B 47/0038* (2013.01);
(Continued)

(58) Field of Classification Search
CPC .......... E05C 7/03; E05B 9/10; E05B 47/0038; E05B 63/14; E05B 63/16; E05B 1/70;
(Continued)

(56) References Cited

U.S. PATENT DOCUMENTS

| | | | |
|---|---|---|---|
| 525,906 A | 9/1894 | Johnson | |
| 1,140,524 A | 5/1915 | Mosler et al. | |

(Continued)

FOREIGN PATENT DOCUMENTS

| | | | |
|---|---|---|---|
| CA | 3210875 A1 * | 3/2024 | ........... E05B 13/004 |
| CN | 1286781 | 1/1995 | |

(Continued)

OTHER PUBLICATIONS

PCT International Search Report and Written Opinion for International Application No. PCT/US2017/027713, Sep. 8, 2017, 14 pages.

*Primary Examiner* — Jerry E Redman
(74) *Attorney, Agent, or Firm* — Kagan Binder, PLLC

(57) ABSTRACT

A door assembly for selectively interlocking opposing doors each pivotably mounted at a hinge side thereof to a door frame so as to both open and close in the same direction includes a door handle assembly mounted to one door at a latch side thereof opposite the hinge side and carrying a first plurality of magnets, and another door handle assembly mounted to the other door at a latch side thereof opposite the hinge side and carrying a second plurality of magnets. The door handle assemblies are arranged relative to each other with the first and second pluralities of magnets aligned such each aligned pair of the first and second pluralities of
(Continued)

magnets have opposite magnetic polarities, and the aligned first and second pluralities of magnets magnetically couple to each other as the door handle assemblies are brought into contact with each other.

16 Claims, 23 Drawing Sheets

Related U.S. Application Data continuation of application No. 17/074,385, filed on Oct. 19, 2020, now Pat. No. 11,542,733, which is a continuation of application No. 16/092,674, filed as application No. PCT/US2017/027713 on Apr. 14, 2017, now Pat. No. 10,808,438.

(60) Provisional application No. 62/322,919, filed on Apr. 15, 2016.

(51) Int. Cl.

| | |
|---|---|
| ***E05B 47/00*** | (2006.01) |
| ***E05B 63/14*** | (2006.01) |
| ***E05B 63/16*** | (2006.01) |
| ***E06B 1/70*** | (2006.01) |
| ***E06B 3/36*** | (2006.01) |
| ***E06B 7/23*** | (2006.01) |
| *E05D 3/04* | (2006.01) |

(52) U.S. Cl.

CPC .............. *E05B 63/14* (2013.01); *E05B 63/16* (2013.01); *E06B 1/70* (2013.01); *E06B 3/362* (2013.01); *E06B 7/2316* (2013.01); *E05D 3/04* (2013.01); *E05Y 2900/132* (2013.01)

(58) Field of Classification Search

CPC ......... E05B 3/362; E05B 7/2316; E05D 3/04; E05Y 2900/132

USPC ............................................................ 49/168

See application file for complete search history.

(56) References Cited

U.S. PATENT DOCUMENTS

| | | | | |
|---|---|---|---|---|
| 1,686,819 | A | 10/1928 | Kirschbaum | |
| 1,920,813 | A | 8/1933 | Storms | |
| 2,177,617 | A | 10/1939 | Hinton | |
| 2,219,344 | A | 10/1940 | Taylor | |
| 2,537,896 | A | 1/1951 | Hinton et al. | |
| 2,736,401 | A | 2/1956 | Milone | |
| 2,911,095 | A | 11/1959 | Hutch | |
| 3,024,501 | A | 3/1962 | McPhail | |
| 3,024,837 | A | 3/1962 | McPhail | |
| 3,164,228 | A | 1/1965 | Segre | |
| 3,881,220 | A | 5/1975 | Kiraly | |
| 4,001,972 | A | 1/1977 | Hurwitz | |
| 4,094,099 | A | 6/1978 | Birch | |
| 4,208,837 | A | 6/1980 | Black, Sr. et al. | |
| 4,299,058 | A | 11/1981 | Spaulding | |
| 4,302,907 | A | 12/1981 | Jose et al. | |
| 4,389,817 | A | 6/1983 | Olberding | |
| 4,408,546 | A | 10/1983 | Schmidt | |
| 4,470,276 | A | 9/1984 | Bayless | |
| 4,660,873 | A | 4/1987 | Sholund | |
| 4,891,907 | A | 1/1990 | Rapaway | |
| 5,095,654 | A * | 3/1992 | Eccleston | E05F 15/53<br>292/144 |
| 5,144,721 | A | 9/1992 | Schade | |
| 5,474,345 | A | 12/1995 | Clark et al. | |
| 5,535,550 | A | 7/1996 | Yang | |
| 5,613,324 | A | 3/1997 | Theune | |
| 6,357,509 | B1 | 3/2002 | Lamazares | |
| 6,526,694 | B1 | 3/2003 | Cosgrove | |
| 6,938,665 | B2 | 9/2005 | Lewis et al. | |
| 6,941,997 | B2 | 9/2005 | Butler | |
| D525,906 | S | 8/2006 | Gut | |
| 7,950,439 | B2 | 5/2011 | Anderson | |
| 9,045,214 | B2 | 6/2015 | Koch et al. | |
| 9,228,386 | B2 | 1/2016 | Thielmann et al. | |
| 9,273,505 | B1 | 3/2016 | Knittel | |
| 9,540,853 | B2 | 1/2017 | Pickar et al. | |
| 10,233,669 | B2 | 3/2019 | Huang et al. | |
| 10,808,438 | B2 * | 10/2020 | Takase | E05C 7/02 |
| 11,542,733 | B2 * | 1/2023 | Takase | E05B 63/16 |
| 11,774,267 | B1 * | 10/2023 | Tobias | E05B 17/22<br>70/129 |
| 11,952,814 | B2 * | 4/2024 | Takase | E06B 7/2316 |
| 2003/0101652 | A1 | 6/2003 | Cosgrove | |
| 2006/0225250 | A1 | 10/2006 | Yeremian | |
| 2014/0132142 | A1 | 5/2014 | Kim et al. | |
| 2014/0132143 | A1 | 5/2014 | Kim et al. | |
| 2014/0132146 | A1 | 5/2014 | Kim et al. | |
| 2014/0232250 | A1 | 8/2014 | Kim et al. | |
| 2014/0232251 | A1 | 8/2014 | Kim et al. | |
| 2014/0292001 | A1 | 10/2014 | Nunez et al. | |
| 2018/0328077 | A1 | 11/2018 | Huang et al. | |
| 2019/0153756 | A1 | 5/2019 | Huang et al. | |
| 2021/0159634 | A1 * | 5/2021 | Uyeda | H01R 13/5205 |
| 2021/0207401 | A1 * | 7/2021 | Cook | E05B 47/0012 |
| 2022/0162881 | A1 * | 5/2022 | Davies | E05B 17/2088 |
| 2022/0263297 | A1 * | 8/2022 | Bodurka | E05D 11/0081 |
| 2023/0220701 | A1 * | 7/2023 | Mohammed | E05B 9/002 |
| 2023/0366239 | A1 * | 11/2023 | Cook | G07C 9/33 |
| 2024/0279969 | A1 * | 8/2024 | Takase | E05B 63/14 |

FOREIGN PATENT DOCUMENTS

| | | | | |
|---|---|---|---|---|
| CN | 2206820 | | 9/1995 | |
| CN | 202139954 | | 2/2012 | |
| CN | 203640569 | | 6/2014 | |
| CN | 108868376 | A | 11/2018 | |
| DE | 465865 | | 9/1928 | |
| GB | 2622224 | A * | 3/2024 | E05B 47/00 |
| KR | 20120063316 | A | 6/2012 | |
| KR | 20160011864 | A | 2/2016 | |
| KR | 102625164 | B1 * | 1/2024 | |
| TW | 106115225 | A | 5/2017 | |
| TW | 107141798 | | 11/2018 | |

* cited by examiner

FIG. 20A
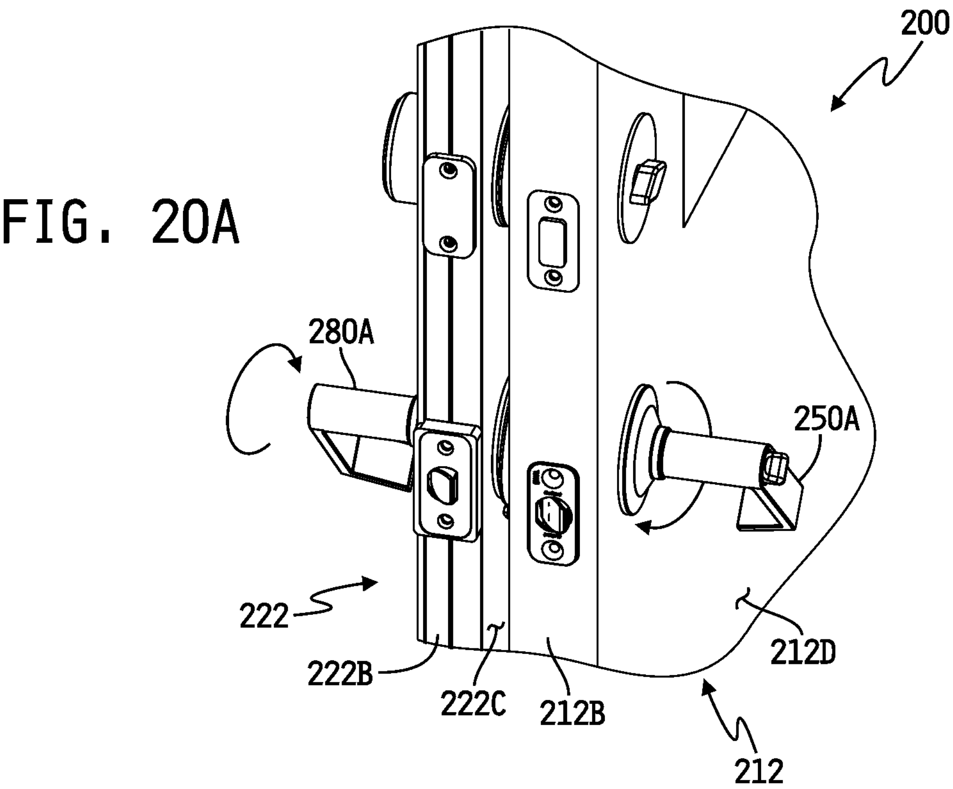
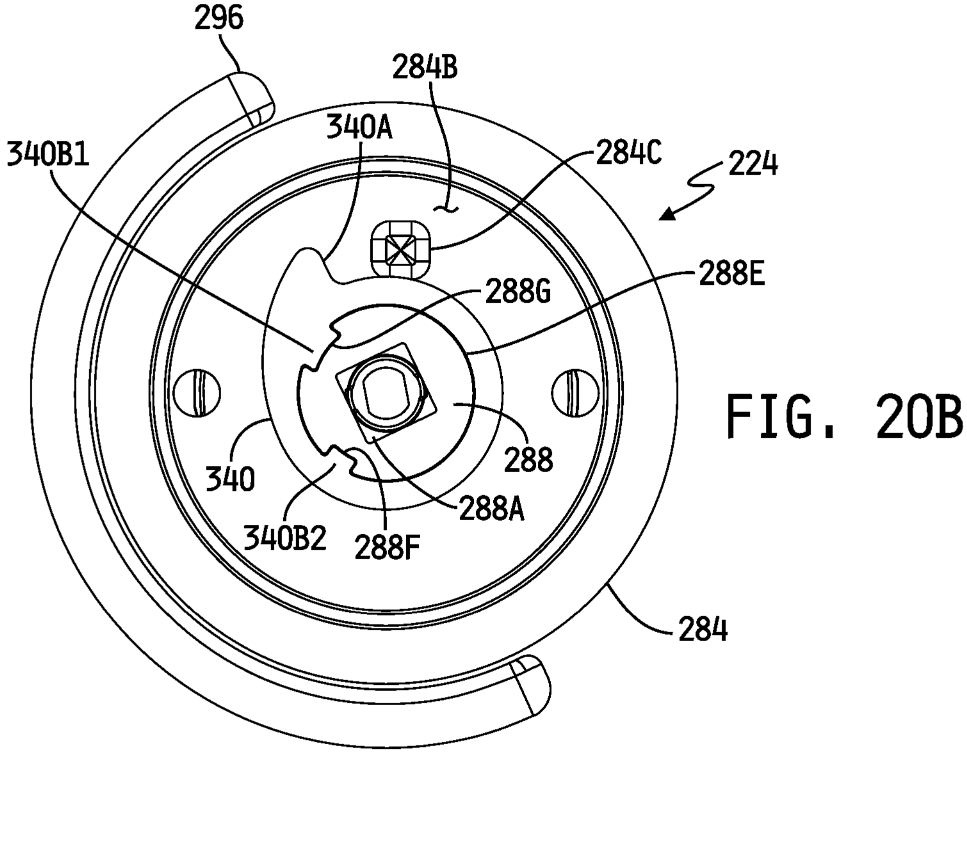
FIG. 20B

DOOR ASSEMBLY FOR SELECTIVELY INTERLOCKING OPPOSING DOORS

CROSS-REFERENCE TO RELATED APPLICATIONS

This application is a continuation application of U.S. patent application Ser. No. 18/090,672, filed on Dec. 29, 2022, now issued as U.S. Pat. No. 11,952,814, which is a continuation application of U.S. patent application Ser. No. 17/074,385, filed on Oct. 19, 2020, issued on Jan. 3, 2023 as U.S. Pat. No. 11,542,733, which is a Continuation of U.S. patent application Ser. No. 16/092,674, filed on Oct. 10, 2018, now Issued as U.S. Pat. No. 10,808,438, which is U. S. 371 national phase of PCT/US2017/027713 filed Apr. 14, 2017. PCT/US2017/027713 claims the benefit of and priority to U.S. provisional patent application Ser. No. 62/322,919 filed Apr. 15, 2016, the entire contents of which are incorporated herein by reference in their entireties.

FIELD OF THE INVENTION

The present invention relates generally to door assemblies having two doors co-mounted to and within a single door frame of a building, and more specifically to structures for selectively interlocking the two doors together.

BACKGROUND

Two doors may conventionally be co-mounted in a single doorway of a building, one example of which is a conventional exterior door and a conventional storm door co-mounted to and within a single door frame of a commercial or residential building. Such co-mounted doors are typically separately and independently operable to latch and unlatch each door to and from a latch side door jamb, and are also typically separately and independently operable to lock and unlock each door.

SUMMARY

The present invention may comprise one or more of the features recited in the attached claims, and/or one or more of the following features and combinations thereof. In one aspect, a door assembly for selectively interlocking first and second opposing doors each pivotably mounted at a hinge side thereof to a door frame so as to both open and close in the same direction may comprise a first door handle assembly operatively mounted to the first door at a latch side of the first door opposite the hinge side thereof, the first door handle assembly carrying a first plurality of magnets each having a magnetic surface, and a second door handle assembly operatively mounted to the second door at a latch side of the second door opposite the hinge side thereof, the second door handle assembly carrying a second plurality of magnets each having a magnetic surface, the first and second door handle assemblies arranged relative to each other with the first plurality of magnets aligned with the second plurality of magnets such that the magnetic surfaces of each aligned pair of the first and second pluralities of magnets have opposite magnetic polarities, the magnetic surface of each of the first plurality of magnets magnetically coupling to the magnetic surface of an aligned one of the second plurality of magnets as the first and second door handle assemblies are brought into contact with each other, whereby the first and second doors are interlocked via magnetic coupling of the first and second door handle assemblies.

In another aspect, a door assembly for selectively interlocking first and second opposing doors each pivotably mounted at a hinge side thereof to a door frame so as to both open and close in the same direction may comprise a first door handle assembly operatively mounted to the first door at a latch side of the first door opposite the hinge side thereof, the first door handle assembly carrying a first plurality of magnets each having a magnetic surface, a second door handle assembly operatively mounted to the second door at a latch side of the second door opposite the hinge side thereof, the second door handle assembly carrying a second plurality of magnets each having a magnetic surface, and means for selectively aligning the first plurality of magnets with the second plurality of magnets such that the magnetic surfaces of each aligned pair of the first and second pluralities of magnets have opposite magnetic polarities, the magnetic surface of each of the first plurality of magnets magnetically coupling to the magnetic surface of an aligned one of the second plurality of magnets when the first and second door handle assemblies are brought into contact with each other, whereby the first and second doors are interlocked via magnetic coupling of the first and second door handle assemblies.

In yet another aspect, a door assembly for selectively interlocking first and second opposing doors each pivotably mounted at a hinge side thereof to a door frame so as to both open and close in the same direction may comprise a first door handle assembly operatively mounted to the first door, the first door handle assembly having a first portion mounted to a first major surface of the first door and a second portion mounted to a second major surface of the first door opposite the first major surface of the first door and coupled to the first portion of the first door handle assembly through the first door, the first portion of the first door handle assembly carrying at least a first magnet having magnetic surface with a first magnetic polarity, and a second door handle assembly operatively mounted to the second door, the second door handle assembly having a first portion mounted to a first major surface of the second door and a second portion mounted to a second major surface of the second door opposite the first major surface of the second door and coupled to the first portion of the second door handle assembly through the second door, the first portion of the second door handle assembly carrying at least a second magnet having a magnetic surface with a second magnetic polarity opposite the first magnetic polarity, the first major surface of the first door facing the first major surface of the second door, and the first and second door handle assemblies being aligned such that the first portion of the first door handle assembly faces the first portion of the second door handle assembly when the first and second doors are brought together, wherein one of (1) the at least the first magnet is aligned with the at least the second magnet such that the magnetic surface of the at least a first magnet magnetically couples to the magnetic surface of the at least the second magnet to interlock the first portions of the first and second door handle assemblies as the first and second doors are brought together, and (2) the first portion of the second door handle assembly is movable relative to the second door to an interlock position in which the at least the first magnet is aligned with the at least the second magnet such that the magnetic surface of the at least a first magnet magnetically couples to the magnetic surface of the at least the second magnet to interlock the first portions of the first and second door handle assemblies as the first and second doors are brought together.

In yet another aspect, a door assembly may comprise a door jamb including a hinge-side jamb spaced apart from a latch-side jamb, a first door having a hinge side and a latch side opposite the hinge side thereof, a second door having a hinge side and a latch side opposite the hinge side thereof, the hinge sides of the first and second doors both pivotably mounted to the hinge-side jamb such that the first and second doors pivot individually or together in the same direction relative to the hinge-side jamb between open and closed positions, a first door handle assembly operatively mounted to the first door, a first latch assembly mounted to the first door and operatively coupled to the first door handle assembly, the first latch assembly including a first latch tongue movable in response to actuation of the first door handle assembly between a retracted position within the first latch assembly and an extended position extending away from the latch side of the first door, a second handle assembly operatively mounted to the second door, a second latch assembly mounted to the second door and operatively coupled to the second door handle assembly, the second latch assembly including a second latch tongue movable in response to actuation of the second door handle assembly between a retracted position within the second latch assembly and an extended position extending away from the latch side of the second door, and a single strike plate mounted to the latch-side jamb, the single strike plate defining a first opening sized to receive therein the first latch tongue in the extended position thereof when the first door is closed and a second opening sized to receive therein the second latch tongue in the extended position thereof when the second door is closed.

In still a further aspect, a door assembly may comprise a door jamb including a hinge-side jamb spaced apart from a latch-side jamb and a top jamb connected to and between the hinge-side and latch-side jambs, a first door having a hinge side, a latch side opposite the hinge side thereof, a top extending between the hinge and latch sides thereof, a bottom opposite the top thereof, a first major surface between the latch side, hinge side, top and bottom thereof, and a second major surface opposite the first major surface thereof, a second door having a hinge side, a latch side opposite the hinge side thereof, a top extending between the hinge and latch sides thereof, a bottom opposite the top thereof, a first major surface between the latch side, hinge side, top and bottom thereof, and a second major surface opposite the first major surface thereof, the hinge sides of the first and second doors both pivotably mounted to the hinge-side jamb such that the first and second doors pivot individually or together in the same direction relative to the hinge-side jamb between open and closed positions and such that the first major surface of the first door faces the second major surface of the second door when the first and second doors are both closed, a first door stop including a first hinge-side door stop coupled to or integral with and extending a long a length of the hinge-side jamb, a first latch-side stop coupled to or integral with and extending along a length of the latch-side jamb and a first top stop coupled to or integral with and extending along a length of the top jamb and coupled to and between top ends of the first hinge-side door stop and the first latch-side door stop, the first hinge-side door stop, the first latch-side door stop and the first top stop together defining a first door stop surface facing the first major surface of the first door when the first door is closed, the first door stop surface defining a physical stop to and about a periphery of the first major surface of the first door, and a second door stop including a second hinge-side door stop coupled to or integral with and extending a long a length of the hinge-side jamb and spaced apart from the first hinge-side door stop, a second latch-side stop coupled to or integral with and extending along a length of the latch-side jamb and spaced apart from the first latch-side door stop and a second top stop coupled to or integral with and extending along a length of the top jamb, the second top stop spaced apart from the first top stop and coupled to and between top ends of the second hinge-side door stop and the second latch-side door stop, the second hinge-side door stop, the second latch-side door stop and the second top stop together defining a second door stop surface facing the first major surface of the second door when the second door is closed, the second door stop surface defining a physical stop to and about a periphery of the first major surface of the second door.

In yet a further aspect, a door assembly may comprise a door jamb including a hinge-side jamb spaced apart from a latch-side jamb, a first door having a hinge side and a latch side opposite the hinge side thereof, a second door having a hinge side and a latch side opposite the hinge side thereof, the hinge sides of the first and second doors both pivotably mounted to the hinge-side jamb such that the first and second doors pivot individually or together in the same direction relative to the hinge-side jamb between open and closed positions, a door sill extending between the hinge-side jamb and the latch-side jamb, the door sill including a top sill surface positioned below and along a bottom surface of the first door when the first door is closed, the door sill including a dam mounted to the sill surface and having a top dam surface positioned above the sill surface, the dam positioned below and extending along a bottom surface of the second door when the second door is closed, the bottom surface of the first door passing over the top surface of the dam when the first door is opened, and an elongated sweep mounted to and along the bottom surface of the second door, the elongated sweep including an elongated flexible member extending downwardly therefrom, the elongated sweep adjustable relative to the bottom surface of the second door to a position at which that the elongated flexible member contacts the top sill surface when the first door is closed yet the elongated sweep clears the top surface of the dam when the first door is opened.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

FIG. 20A is a perspective view of the two doors of the door assembly of FIGS. 10-18B shown with the two door handle assemblies interlocked and illustrating how the two doors may be opened and closed via actuation of either door handle assembly.

FIG. 20B is an elevational view similar to FIG. 17D illustrating operation of the magnet assembly of the door handle assembly of FIGS. 17A-17C during opening and closing of the two doors as shown in FIG. 20A.

DETAILED DESCRIPTION OF THE DRAWINGS

Figure 1A:
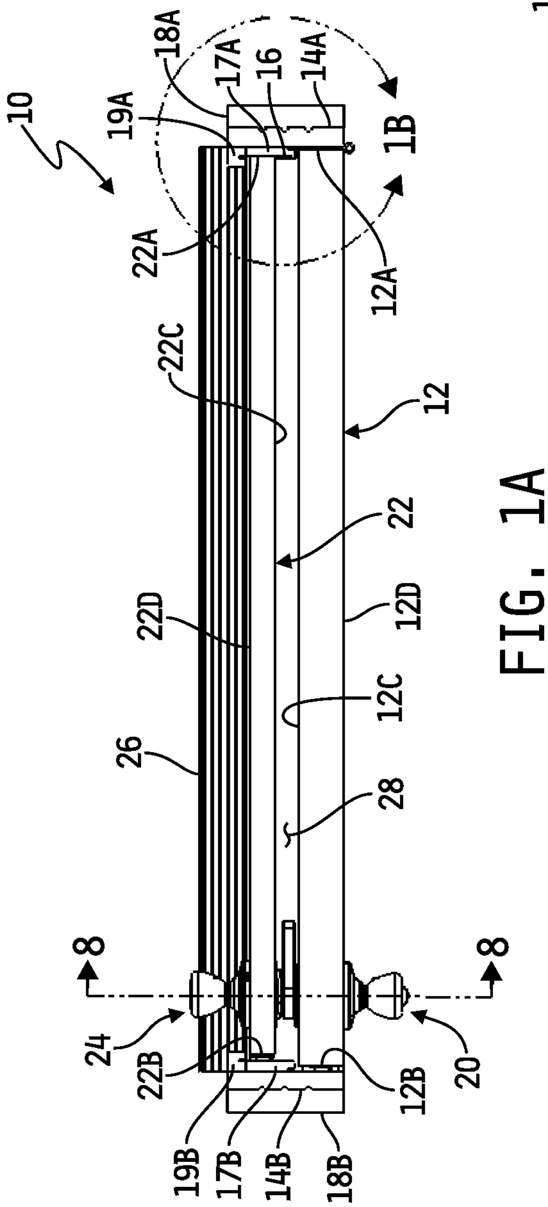
FIG. 1A is a top plan view of an embodiment of a door assembly including a pair of opposing doors that share a common hinge assembly, with the doors shown interlocked and with each in a closed position relative to a door frame.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment”, “an embodiment”, “an example embodiment”, etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Figure 3A:
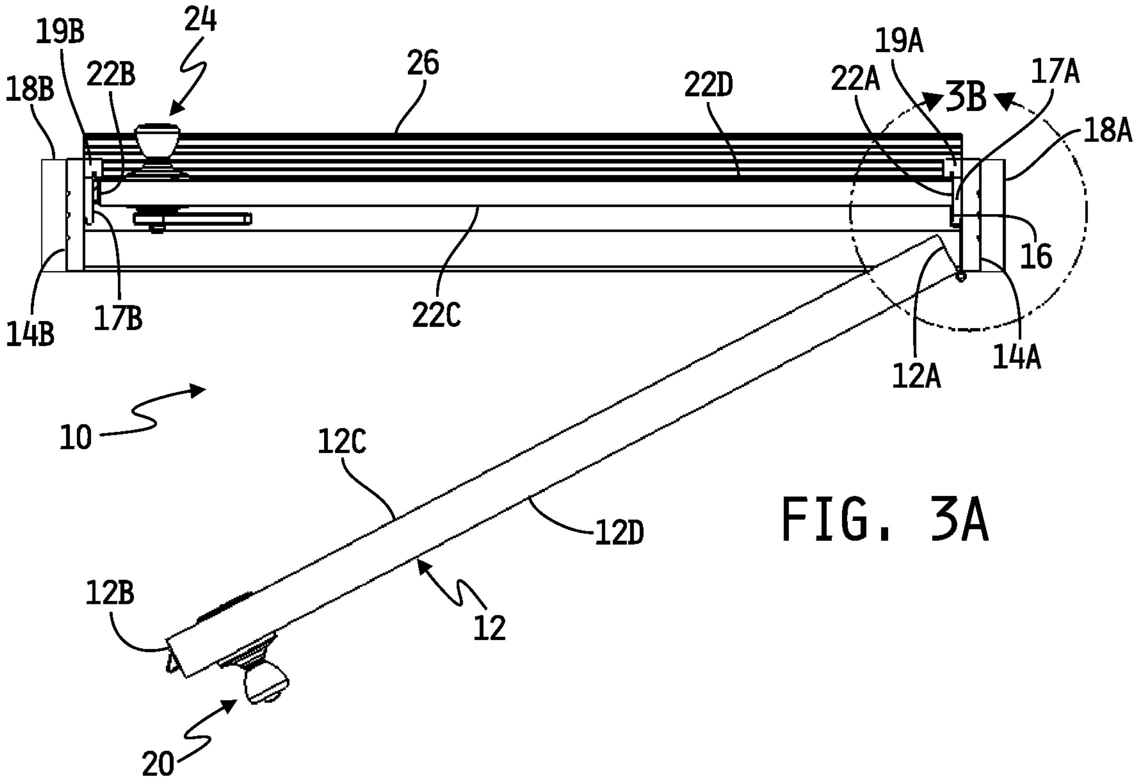
FIG. 3A is a top plan view of the door assembly illustrated in FIG. 1A shown with the doors decoupled from each other and with one of the doors in a closed position relative to the door frame and the other door in a partially open position relative to the door frame.
Figure 3B:
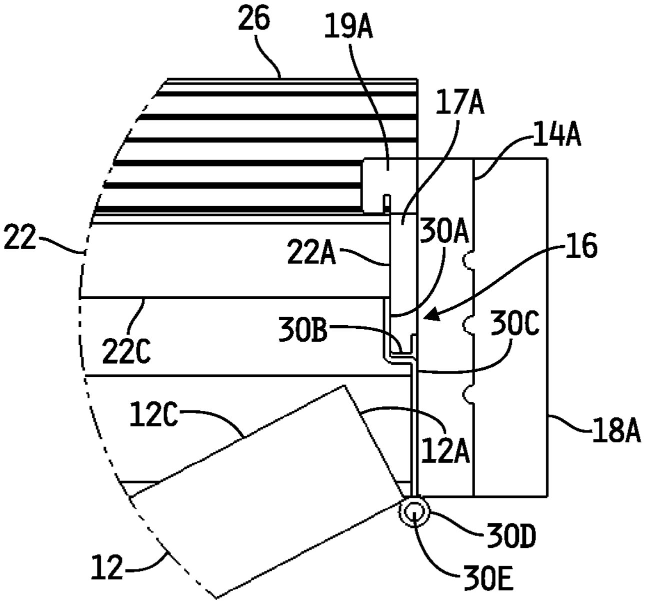
FIG. 3B is a magnified view of the portion 3B of the door assembly illustrated in FIG. 3A.

Referring now to FIGS. 1A-1B, 3A—3B and 4A—4B, an embodiment is shown of a door assembly 10 including a pair of selectively interlocking, opposing doors 12, 22. In the illustrated embodiment, the doors 12, 22 share one or more common hinge assemblies 16. In one embodiment, the doors 12, 22 share three common hinge assemblies 16 spaced apart along the length of a door jamb 14A in a conventional manner, although in other embodiments the doors 12, 22 may alternatively share more or fewer common hinge assemblies 16. The door 12 includes a handle assembly 20, and the door 22 includes a separate handle assembly 24. The handle assemblies 20, 24 may be selectively interlocked, i.e., selectively coupled to or engaged with each other, such that the doors 12, 22 are together pivotable about the one or more hinge assemblies 16 between closed and open positions as illustrated in FIGS. 1A, 1B and 4A, 4B respectively. The handle assemblies 20, 24 may also be selectively decoupled or disengaged from each other such that the doors 12, 22 may each be separately pivotable about the one or more hinge assemblies 16 so as to be independently openable and closable as illustrated in FIGS. 3A and 3B.

The door assembly 10 includes a door jamb mountable in a conventional manner to a door frame of a building structure. The door jamb illustratively includes a hinge-side jamb and a latch-side jamb both coupled to a top jamb, wherein each such jamb may be a separate from the others with all such jambs coupled together in a conventional manner to form the door jamb or wherein two or more such jambs may be of unitary construction. In the illustrated embodiment, hinge-side and latch-side jambs 14A, 14B of the door jamb are shown, with the hinge-side jamb 14A mounted, attached or otherwise affixed to a stud 18A, e.g., so-called jack stud, which partially defines a doorway of a building structure in and to which the door assembly 10 is mounted, and with the latch-side jamb 14B mounted, attached or otherwise affixed to another stud 18B, e.g., so-called jack stud, which also partially defines the doorway of the building structure in and to which the door assembly 10 is mounted. The top jamb is likewise mounted, attached or otherwise affixed to a conventional header or other door frame structure which also partially defines the doorway of the building structure in and to which the door assembly 10 is mounted. The structure 26 illustratively represents a sill plate coupled to the floor of the building structure or other floor structure that is part of the building structure which, in any case, also partially defines the doorway of the building structure. In some embodiments, the sill plate 26 is coupled to either or both of the jambs 14A, 14B, although in alternate embodiments the sill plate 26 may be separate from either or both of the jambs 14A, 14B. The building structure may be, or may be part of, a residential building, a commercial building, an industrial building or any other conventional building. The door frame is illustratively part of the building structure and may be constructed of one or more framing members, e.g., studs or jack studs 18A, 18B and a header, made from one or more conventional materials, examples of which may include, but are not limited to, wood, composite wood, plastic or plasticized wood substitute, steel or other metal material(s).

In the illustrated embodiment, the door 12 defines a hinge side 12A to which the one or more hinge assemblies 16 is/are mounted, and the door 22 likewise defines a hinge side 22A to which the one or more hinge assemblies 16 is/are mounted. The one or more hinge assemblies 16 is/are also mounted to an inwardly-facing, generally planar, surface 14A1 of the hinge-side jamb 14A. The door 12 further defines a latch side 12B, and at least one conventional door latching component, e.g., at least one latch tongue, of the handle assembly 20 extends therefrom. At least one conventional door latch engaging component, e.g., at least one conventional strike plate 15A (see, e.g., FIG. 4A), is mounted, attached or otherwise affixed to the latch-side jamb 14B, and the at least one door latching component extending from the door 12 and the at least one strike plate 15A are conventionally configured to selectively engage each other when the door 12 is pivoted about the one or more hinge assemblies 16 to a closed position as illustrated in FIG. 1A. Likewise, the door 22 defines a latch side 22B, and at least one conventional door latching component, e.g., at least one latch tongue of the handle assembly 24, extends therefrom. At least another conventional door latch engaging component, e.g., at least another conventional strike plate 15B (see, e.g., FIG. 4A), is mounted, attached or otherwise affixed to a latch-side stop 17B coupled to or integral with the latch-side jamb 14B, and the at least one door latching component extending from the door 22 and the at least another strike plate 15B are conventionally configured to selectively engage each other when the door 22 is pivoted about the one or more hinge assemblies 16 to a closed position as illustrated in FIGS. 1A and 3A. All such door latching components and door latch engaging components are also conventionally configured to selectively disengage from each other, e.g., via conventional actuation of the door handle assemblies 20, 24 respectively, to enable the doors 12, 22 respectively to pivot about the one or more hinge assemblies 16.

The door 12 further defines a first major surface 12C, and a second major surface 12D opposite the first major surface 12C, and the door 22 likewise defines a first major surface 22C and a second major surface 22D opposite the first major surface 22C. The first major surface 12C of the door 12 generally faces the first major surface 22C defined by the door 22, and a space 28 is defined by the door handle assemblies 20, 24 between the first major surfaces 12C, 22C of the doors 12, 22 respectively when the door handle assemblies 20, 24 are interlocked as illustrated in FIGS. 1A, 1B and 4A, 4B. In the illustrated embodiment, the door 12 is a conventional exterior door, the first major surface 12C of which generally faces the door 22 and the second major surface 12D of which faces an interior of the building, and the door 22 is a conventional storm door, the first major surface 22C of which generally faces the door 12 and the second major surface 22D of which faces an exterior of the building. In some alternate embodiments, the door 12 may represent a conventional storm door and the door 22 may represent a conventional exterior door. In other alternate embodiments, the door 12 may represent any conventional interior, exterior, storm, general purpose or special purpose door, and the door 22 may likewise represent any conventional interior, exterior, storm, general purpose or special purpose door. The door 12 may be formed of one or more conventional materials, examples of which may include, but are not limited to, wood, composite, plastic, fiber reinforced plastic, metal, any combination the foregoing, any of the foregoing materials as one or more outer shells or skins with an interior core that is hollow or is formed of a conventional material such as foam, plastic, fiber reinforced plastic, or the like. The door 22 may likewise be formed of one or more conventional materials, examples of which may include, but are not limited to, wood, composite, plastic, fiber reinforced plastic, metal, any combination the foregoing, any of the foregoing materials as one or more outer shells or skins with an interior core that is hollow or is formed of a conventional material such as foam, plastic, fiber reinforced plastic, or the like.

Figure 1B:
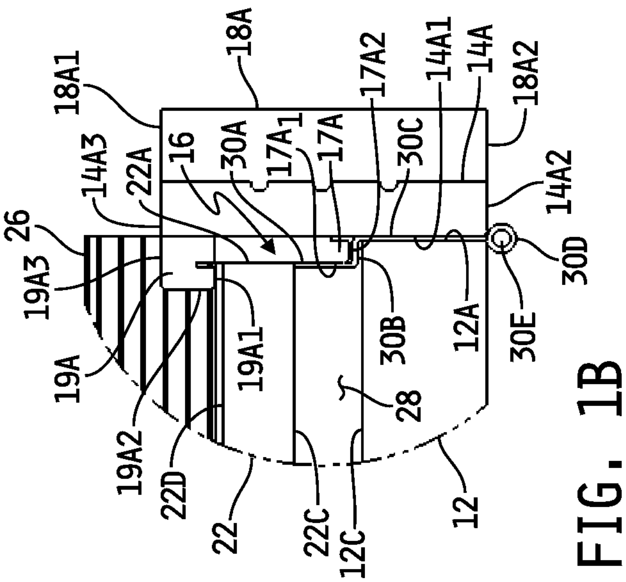
FIG. 1B is a magnified view of the portion 1B of the door assembly illustrated in FIG. 1A.
Figure 4A:
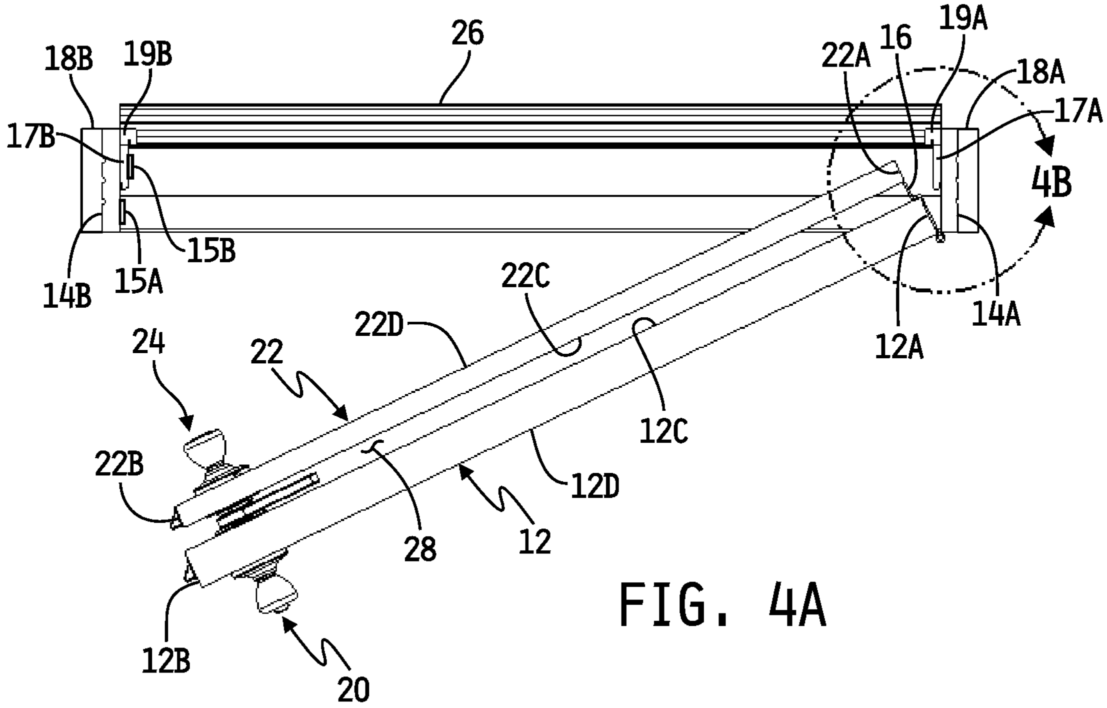
FIG. 4A is a top plan view of the door assembly illustrated in FIGS. 1A and 3A shown with the doors interlocked and with both in a partially open position relative to the door frame.
Figure 4B:
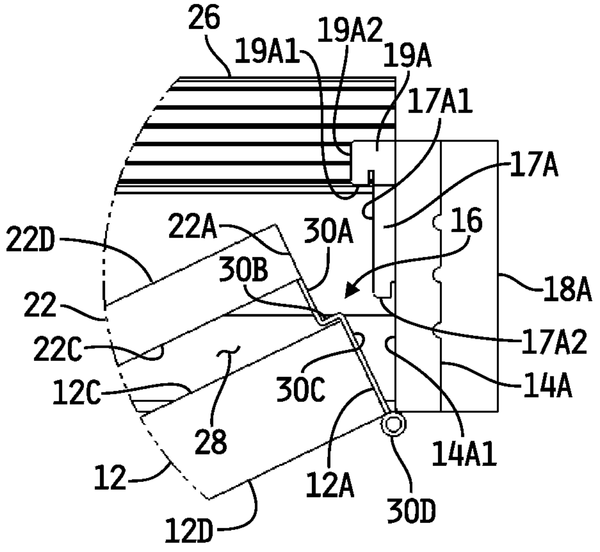
FIG. 4B is a magnified view of the portion 4B of the door assembly illustrated in FIG. 4A.

As illustrated most clearly in FIGS. 1B and 4B, the door frame component 18A, e.g., stud or jack stud, has a first generally planar surface 18A1 and a second generally planar surface 18A2 opposite the surface 18A1 with opposing planar side surfaces extending between the surfaces 18A1 and 18A2. An outwardly facing side surface of the hinge-side door jamb 14A opposite the inwardly facing side surface 14A1 illustratively abuts an inwardly facing one of the side surfaces of the door frame component 18A when the hinge-side door jamb 14A is mounted thereto. The hinge-side door jamb 14A defines a generally planar surface 14A2 at one end of the side surface 14A1 and another generally planar surface 14A3 at an opposite end of the side surface 14A1. As illustrated in FIG. 1B, the end surfaces 14A3 and 18A1 of the hinge-side door jamb 14A and the door frame component 18A are illustratively flush with each other as are the end surfaces 14A2 and 18A2, although in other embodiments either or both of the planar surfaces 14A2, 14A3 of the hinge-side door jamb 14A may extend beyond the corresponding surfaces 18A2, 18A1 of the door frame component 18A or vice versa. In any case, the latch-side door jamb 14B and corresponding door frame component 18B are illustratively identically configured as just described, as are the top door jamb and corresponding door frame component.

The door jamb further illustratively includes a conventional door stop mounted to and about an inner periphery of the door jamb which forms a physical stop and, in some embodiments, a sealing surface for the door 12. As further illustrated by example in FIGS. 1B, 3B and 4B, an inner side of a hinge-side door stop 17A is illustratively affixed to the inner-facing surface 14A1 of the hinge-side door jamb 14A along its length, and an inner side of a latch-side door stop 17B is likewise illustratively affixed to an inner-facing surface of the hinge-side door jamb 14B. A generally planar outer side surface 17A1 of the hinge-side door stop 17A faces inwardly toward the door stop 17B, and a generally planar end surface 17A2 extends between the inner side surface and the outer side surface 17A of the stop 17A between, and generally parallel with, the end surfaces 14A2 and 14A3 of the hinge-side jamb 14A. The latch-side door stop 17B and corresponding top-side door stop are illustratively identically configured as just described. The end surface 17A2 of the hinge-side stop 17A, as well as the corresponding end surfaces of the latch-side stop 17B and the corresponding top-side stop, are sized to extend inwardly of the door jamb and over a portion of the major surface 12C of the door 12 along the sides 12A and 12B and the top thereof to act as a conventional physical stop to the door 12 as it is moved from an open position, e.g., as illustrated in FIGS. 3A and 4A, to its closed position, e.g., as illustrated in FIG. 1A. In some embodiments, a conventional sealing material, e.g., foam, plastic, rubber, etc., may be attached or affixed to and along the end surface of the hinge-side stop 17A, as well as the corresponding end surfaces of the latch-side stop 17B and the top-side stop, to form a seal between the major surface 12C of the door 12 and such stop surfaces when the door 12 is closed as illustrated in FIG. 1A. In any case, as illustrated by example in FIGS. 1A and 3A, the door 22 is illustratively sized such that the hinge side 22A abuts, or is at least adjacent to, the inwardly-facing surface of the hinge-side stop 17A, and such that the latch-side 22B and the top end likewise abut, or are at least adjacent to, the inwardly-facing surfaces of the latch-side stop 17B and the top-end stop respectively.

As illustrated in the embodiment depicted in FIGS. 1A, 3A and 4A, the doors 12, 22 pivot in the same direction about the one or more hinges 16, and the doors 12, 22 therefore each open and close in the same direction. In this regard, some embodiments of the door assembly 10 further illustratively include a second door stop mounted to and about an inner periphery of the door jamb to form a physical stop and, in some embodiments, a sealing surface for the door 22. As illustrated by example in FIGS. 1B, 3B and 4B, an inner side of a second hinge-side door stop 19A is illustratively attached or affixed to the inner-facing surface 14A1 of the hinge-side door jamb 14A along its length between the end 14A3 of the door jamb 14A and the stop 17A, and an inner side of a latch-side door stop 17B is likewise illustratively affixed to an inner-facing surface of the hinge-side door jamb 14B. A generally planar outer side surface 19A2 of the hinge-side door stop 19A faces inwardly toward the door stop 19B, and generally planar and opposing end surfaces 19A1 and 19A2 extend between the inner side surface and the outer side surface 19A2 of the stop 19A. In the illustrated embodiment, the end surface 19A3 is generally parallel with the end surface 14A3 of the hinge-side jamb 14A, although in alternate embodiments the end surface 19A3 may extend beyond the end surface 14A3 or vice versa. Also in the illustrated embodiment, a portion of the end surface 19A1 abuts, or is at least adjacent to, a corresponding end surface of the door stop 17A, and another portion extends beyond the outer side surface 17A1 of the stop 17A. In some alternative embodiments, the end of the stop 17A may extend to the end surface 14A3 of the jamb 14A and the stop 19A may be attached or affixed to the inner-facing surface 17A1 of the stop 17A along its length. In any case, the exposed end surface 19A1 of the stop is generally planar and parallel to the end surface 17A2 of the stop 17A. The latch-side door stop 19B and corresponding top-side door stop are illustratively identically configured as just described.

The end surface 19A1 of the hinge-side stop 19A, as well as the corresponding end surfaces of the latch-side stop 19B and the corresponding top-side stop, are sized to extend inwardly of the door jamb and over a portion of the major surface 22D of the door 22 along the sides 22A and 22B and the top thereof to act as a conventional physical stop to the door 22 as it is moved from an open position, e.g., as illustrated in FIG. 4A, to its closed position, e.g., as illustrated in FIGS. 1A and 3A. In some embodiments, a conventional sealing material, e.g., foam, plastic, rubber, etc., may be attached or affixed to and along the end surface of the hinge-side stop 19A, as well as the corresponding end surfaces of the latch-side stop 19B and the top-side stop, to form a seal between the major surface 22D of the door 22 and such stop surfaces when the door 22 is closed as illustrated in FIGS. 1A and 3A.

In some embodiments, as illustrated in FIGS. 1A and 3A—4B, the side jambs 14A, 14B, as well as the corresponding top jamb, are each separate components coupled together in a conventional manner, although in some alternate embodiments at least two such jamb components may be integral and of unitary construction, and in other alternate embodiments all three such jamb components are integral and of a single unitary construction. Likewise, the side stops 17A, 17B, as well as the corresponding top stop, are each separate components coupled together in a conventional manner, although in some alternate embodiments at least two such stop components may be integral and of unitary construction, and in other alternate embodiments all three such stop components are integral and of a single unitary construction. Further still, the side stops 19A, 19B, as well as the corresponding top stop, are likewise each illustratively separate components coupled together in a conventional manner, although in some alternate embodiments at least two such stop components may be integral and of unitary construction, and in other alternate embodiments all three such stop components are integral and of a single unitary construction. In still other alternate embodiments the jamb components and the stop components for the door 12 may be integral and of a single unitary construction, and the stop components for the door 22 may be separate pieces mounted, affixed or otherwise attached to the unitary structure, and in yet further alternate embodiments all jamb and stop components may be integral and of a single unitary construction. In any case, it will be appreciated that the common pivoting direction of the doors 12, 22, along with the door jamb and stop combination just described, advantageously provides for double sealing of the door assembly relative to the door jamb, which feature is generally not attainable in conventional storm door applications in which the storm door opens and closes in directions opposite to the opening and closing directions of the main or exterior door.

Figure 2A:
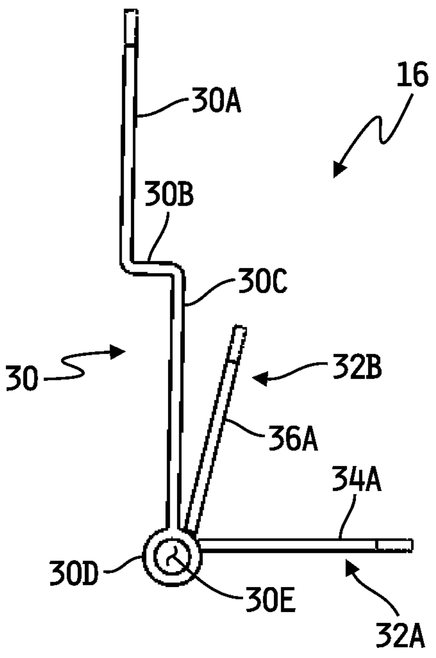
FIG. 2A is a top plan view of an embodiment of the hinge assembly illustrated in FIGS. 1A and 1B.
Figure 2B:
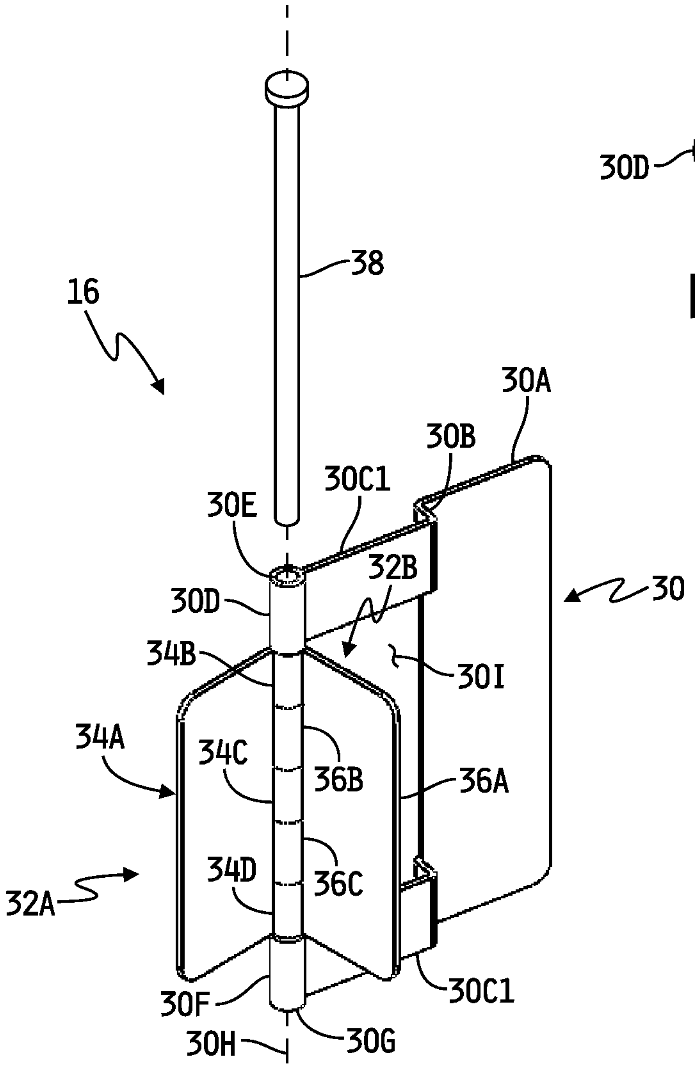
FIG. 2B is a perspective view of the hinge assembly illustrated in FIG. 2A.

Referring now specifically to FIGS. 2A and 2B, an embodiment of one of the one or more hinge assemblies 16 is shown. In the illustrated embodiment, the hinge assembly 16 includes three separate but inter-engaging hinges 30, 32A and 32B. The hinge 30 defines a hinge plate having three integral, planar hinge plate sections or portions 30A, 30B, 30C and a pair of opposing knuckles 30D, 30F at a terminal end of the hinge plate section 30C. Planes defined by the planar hinge plate sections 30A and 30C are illustratively parallel with each other, and a plane defined by the planar hinge section 30B joining the hinge plate sections 30A, 30C is illustratively perpendicular with the planes defined by the planar hinge plate sections 30A, 30C. The dimensions of the hinge plate sections 30A, 30B, 30C are illustratively configured complementarily to corresponding portions of the surfaces 17A1, 17A2 and 14A1 respectively of the hinge-side jamb 14A and stop 17A (see FIG. 4B) such that the hinge plate sections 30A, 30B, 30C contact the surfaces 17A1, 17A2 and 14A1 respectively when the hinge 30 is pivoted into contact with the stop 17A and/or hinge-side jamb 14A (see, e.g., FIGS. 1B and 3B). The knuckles 30D, 30F define bores 30E, 30G centrally therethrough such that the bores 30E, 30G are aligned and define a pivot axis 30H centrally therethrough.

The hinge 32A defines a planar hinge plate 34A and three knuckles 34B, 34C, 34C along one side thereof. The knuckles 34B, 34C, 34D define bores centrally therethrough, and the bores defined through the knuckles 34B, 34C, 34D are aligned such that the pivot axis 30H passes centrally therethrough. The hinge 32B similarly defines a planar hinge plate 36A and two knuckles 36B, 36C along one side thereof. The knuckles 36B, 36C define bores centrally therethrough, and the bores defined through the knuckles 36B, 36C are aligned such that the pivot axis 30H passes centrally therethrough. The knuckles 30D, 30F, 34B, 34C, 34D, 36B, 36C are all arranged to interdigitate in a conventional manner such that the bores defined therethrough all align to define a composite, elongated bore with the pivot axis 30H passing centrally therethrough. A conventional hinge pin 38 is sized to be received within the composite, elongated bore such that each hinge 30, 32A, 32B pivots relative to the pin 38 about the pivot axis 30H. The hinge plate section 30C of the hinge 30 defines an opening 301 therethrough sized to allow each hinge plate 34A, 36A to pass therethrough between upper 30C1 and lower 30C2 hinge plate portions as the hinge plates 34A, 36A pivot about the hinge axis 30H.

As illustrated in FIGS. 1A-1B, 3A—3B and 4A—4B, the hinge plate portion 30A of the hinge 30 is mounted, attached or otherwise affixed to the hinge side 22A of the door 22, e.g., via one or more screws or other conventional fixation members. In some embodiments, the hinge side 22A of the door 22 may illustratively be mortised to receive the hinge plate portion 30A. The hinge plate 36A is mounted, attached or otherwise affixed to the hinge side 12A of the door 12, e.g., via one or more screws or other fixation members. In some embodiments, the hinge side 12A of the door 12 may illustratively be mortised to receive the hinge plate 36A. The hinge plate 34A is mounted, attached or otherwise affixed to the surface 14A1 of the hinge-side jamb 14A, e.g., via one or more screws or other fixation members. In some embodiments, the surface 14A1 of the hinge side jamb 14A may illustratively be mortised to receive the hinge plate 34A.

In the door assembly example illustrated in FIGS. 1A and 1B with the door handle assemblies 20, 24 interlocked and with both doors 12, 22 in their closed positions, the hinge plate portions 30A, 30B and 30C are received in contact with surfaces 17A1, 17A2 and 14A1 respectively of the hinge-side jamb 14A and stop 17A, and the hinge plates 34A, 36A are in contact with each other through the opening 301 defined through the hinge plate portion 30C of the hinge 30. In the door assembly example illustrated in FIGS. 3A and 3B with the door handle assemblies 20, 24 decoupled and with the door 22 in its closed position and the door 12 partially open, the hinge plate portions 30A, 30B and 30C are received in contact with surfaces 17A1, 17A2 and 14A1 respectively of the hinge-side jamb 14A and stop 17A, and the hinge plate 34A is at least partially received within the opening 301 defined through the hinge plate portion 30C of the hinge 30 and the hinge plate 36A mounted to the hinge side 12A of the door 12 is pivoted outwardly away from the hinge plate portion 30C of the hinge 30. In the door assembly example illustrated in FIGS. 4A and 4B with the door handle assemblies 20, 24 interlocked and with both doors 12, 22 in their partially open position, the hinge plate portions 30A, 30B and 30C are pivoted outwardly away from the surfaces 17A1, 17A2 and 14A1 respectively of the hinge-side jamb 14A and stop 17A, the hinge plate 36A is likewise pivoted outwardly away from the hinge side jamb 14A and the hinge plate 34A and is at least partially received within the opening 301 defined through the hinge plate portion 30C of the hinge 30, and the hinge plate 34A is remains secured to the section 14A1 of the hinge side jamb 14A.

Figure 5:
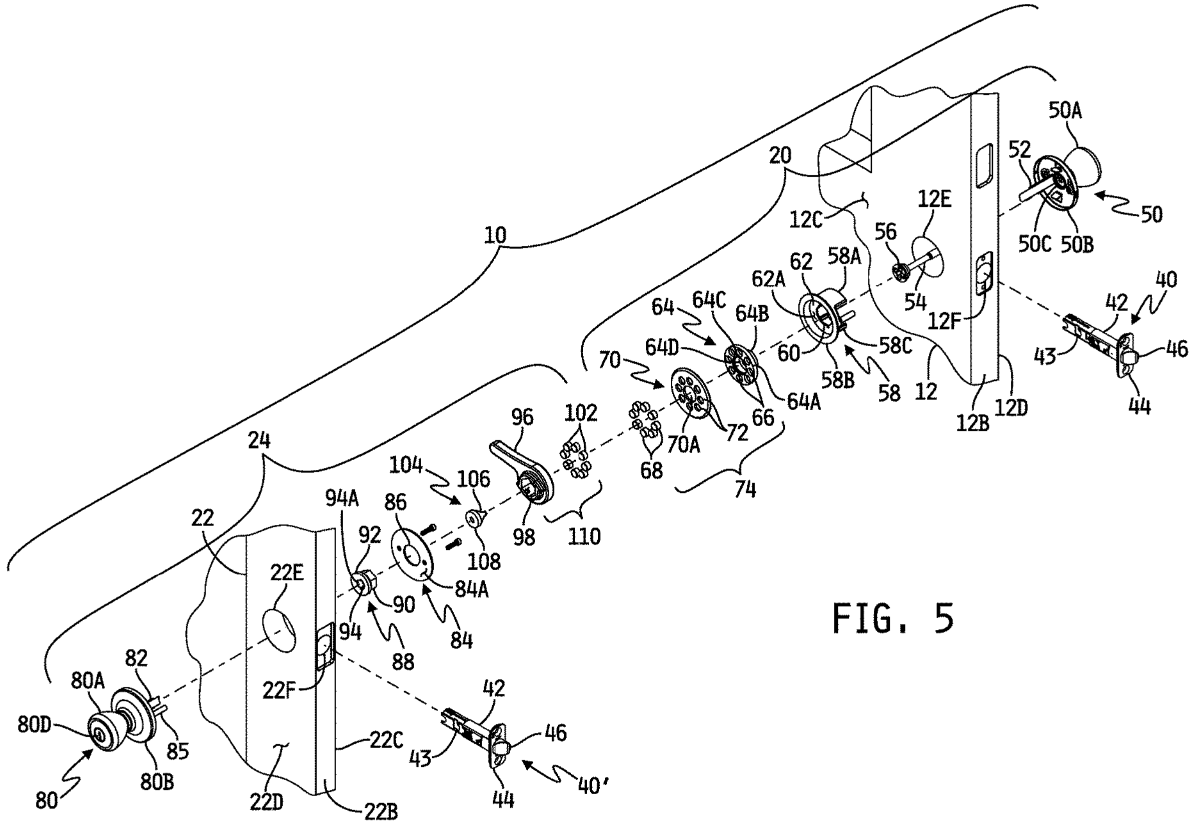
FIG. 5 is an exploded view of an embodiment of a door handle arrangement mounted to the door assembly illustrated in FIGS. 1A, 1B, 3A, 3B, 4A and 4B.

Referring now to FIG. 5, an exploded view of the door assembly 10 is shown illustrating embodiments of each of the door handle assemblies 20, 24 as well as embodiments of latch assemblies 40, 40' mounted to each of the doors 12, 22 respectively. In the illustrated assembly, the door 12 defines a cylindrical opening or face bore 12E therethrough, i.e., defined through the first and second major surfaces 12C, 12D of the door 12, adjacent to the latch side 12B, and another cylindrical opening or side bore 12F therein which opens to the face bore 12E. A conventional latch assembly 40 includes an elongated latch case 42 coupled to a latch plate 44 from which a latch tongue 46 extends. The elongated latch case 42 is illustratively sized to be received within the side bore 12F with at least a portion of the latch case 42 extending into the face bore 12E and the latch plate 44 abutting the latch side 12B of the door 12. In some embodiments, the latch side 12B of the door may be mortised to receive the latch plate 44 therein. The latch case 42 illustratively defines a bore 43 therethrough sized to receive therethrough a cam 52 of the door handle assembly 20. The latch case 42 and/or a handleset 50 of the door handle assembly 20 illustratively carries one or more conventional biasing components such that the latch tongue 46 is normally biased outwardly from the latch plate 44, e.g., as illustrated in FIG. 5, so that it engages and is captured by a conventional strike plate 15A mounted to the latch side jamb 14B of the door assembly 10 (see, e.g., FIG. 4A), and such that axial rotation of the cam 52 causes the latch tongue 46 to be drawn inwardly toward and within the latch case 42 so that it disengages from the strike plate 15A to allow the door 12 to be pivoted via the hinge assembly 16 between open and closed positions thereof. In embodiments in which the handle assembly 20 is lockable, as illustrated in FIG. 5, the bore 43 also receives a spindle 54 of the door handle assembly 20 therethrough. Rotation of the spindle 54 about its longitudinal axis actuates conventional components within the handleset 50 and/or within the latch case 42 between locked and unlocked positions in a conventional manner. For example, when the spindle 54 is rotated to an unlocked position, conventional components within the handleset 50 and/or latch case 42 allow rotation of the cam 52 within the bore 43 to cause the latch tongue 46 to be drawing inwardly within the latch case 42 as described above. When the spindle 54 is rotated to a locked position, conventional components within the handleset 50 and/or latch case 42 prevent rotation of the cam 52, thereby preventing the cam 52 from drawing the latch tongue 46 inwardly within the latch case 42 such that the latch tongue 46 remains engaged with the strike plate 15A. It will be understood that this disclosure contemplates alternate embodiments in which the handle assembly 20 is not lockable, and in such embodiments the spindle 54 may be omitted. In embodiments in which the door handle 20 is lockable as just described, the combination of the door handle assembly 20 and the latch assembly 40 may generally be termed a "lockset."

The door 22 illustratively likewise defines a cylindrical opening or face bore 22E therethrough, i.e., defined through the first and second major surfaces 22C, 22D of the door 22, adjacent to the latch side 22B, and another cylindrical opening or side bore 22F therein which opens to the face bore 22E. A conventional latch assembly 40' includes the same components as described above with respect to the latch assembly 40, and the latch case 42 of the latch assembly 40' is received within the side bore 22F and face bore 22E. The latch assembly 40' is operable generally as described above with respect to the latch assembly 40 such that the latch tongue 46 of the latch assembly 40' is normally biased outwardly from the latch plate 44, e.g., as illustrated in FIG. 5, via one or more conventional biasing components carried by the latch case 42 and/or a handleset 80 of the door handle assembly 24 so that it engages and is captured by a conventional strike plate 15B mounted to the latch side jamb 14B of the door assembly 10 (see, e.g., FIG. 4A), and such that axial rotation of a cam 82 received through the bore 43 causes the latch tongue 46 to be drawn inwardly toward and within the latch case 42 so that it disengages from the strike plate 15B to allow the door 22 to be pivoted relative to the hinge assembly 16 between open and closed positions thereof. In embodiments in which the handle assembly 24 is lockable, as illustrated in FIG. 5, the bore 43 also receives a spindle 85 of the door handle assembly 24 therethrough. Rotation of the spindle 85 about its longitudinal axis actuates conventional components within the handleset 80 and/or within the latch case 42 between locked and unlocked positions in a conventional manner as described above. It will be understood that this disclosure contemplates alternate embodiments in which the handle assembly 24 is not lockable, and in such embodiments the spindle 85 may be omitted. In embodiments in which the handle assembly 24 is lockable as just described, the combination of the door handle assembly 24 and the latch assembly 40' may generally be termed a "lockset."

Figure 7A:
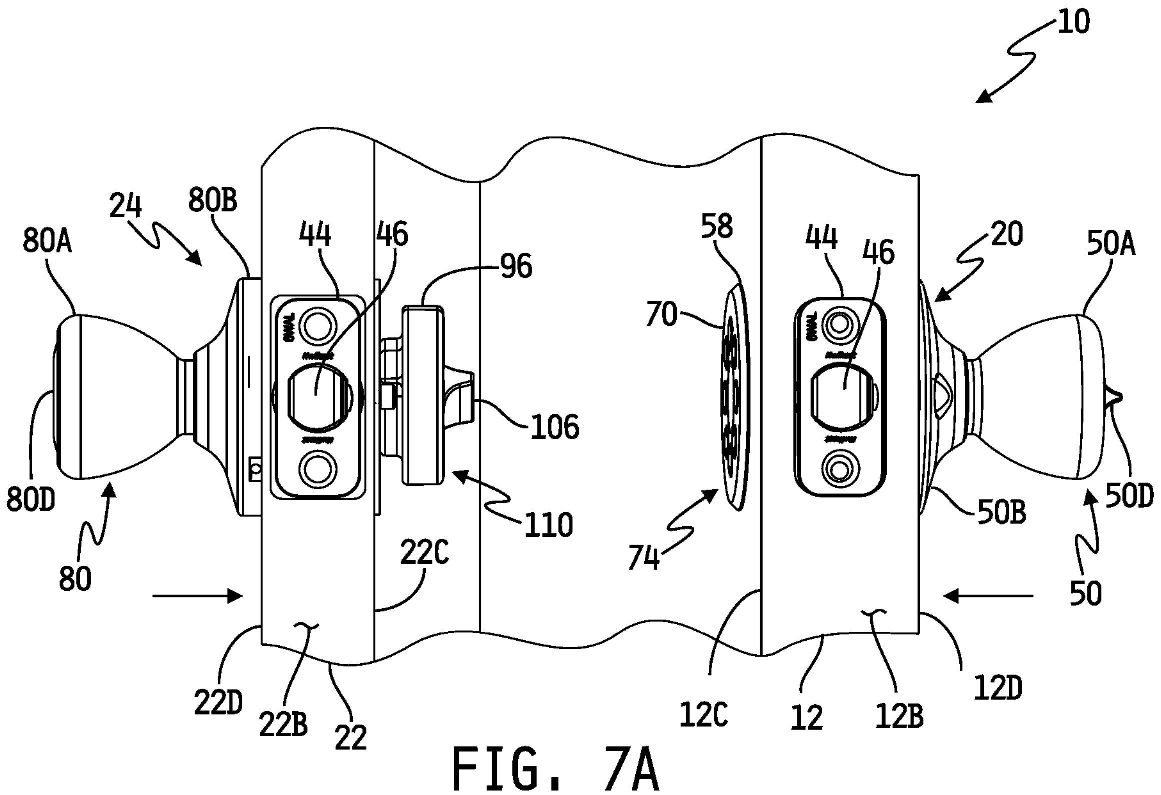
FIG. 7A is a side elevational view of the two doors of the door assembly of FIGS. 1A, 1B, 3A, 3B, 4A, 4B, 5, 6A and 6B shown with the two door handle assemblies decoupled and moving toward each other.
Figure 7B:
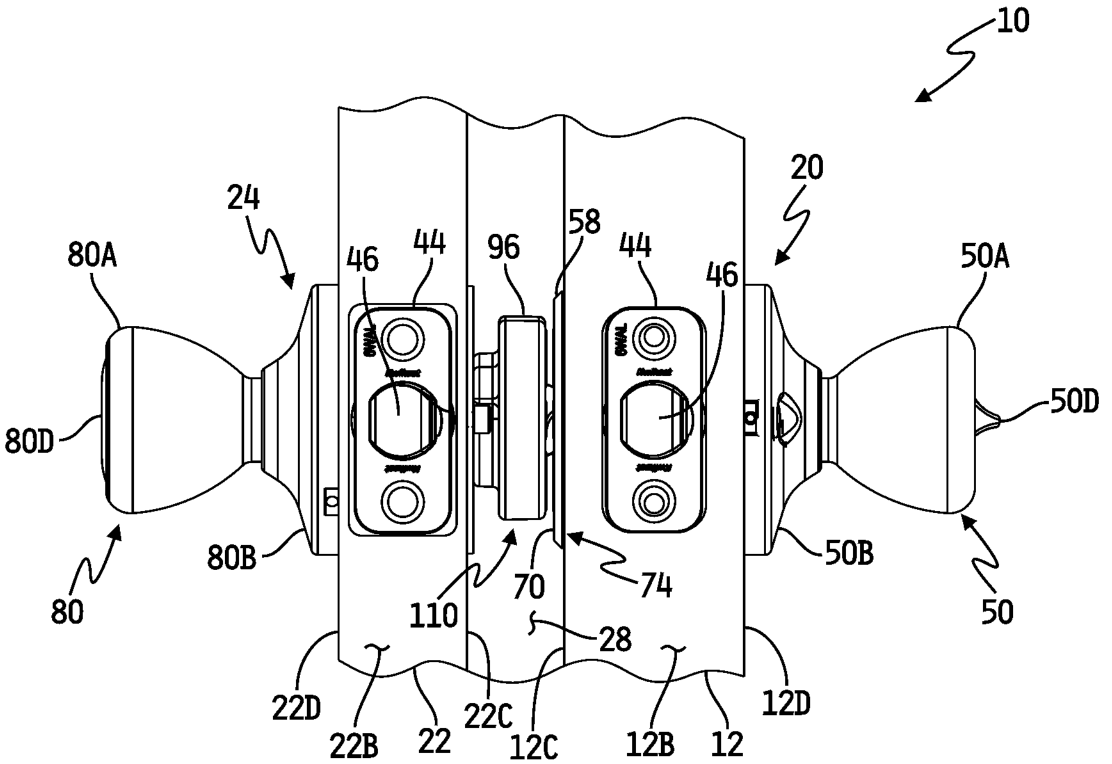
FIG. 7B is a side elevational view similar to FIG. 7A showing the two door handle assemblies interlocked.
Figure 8:
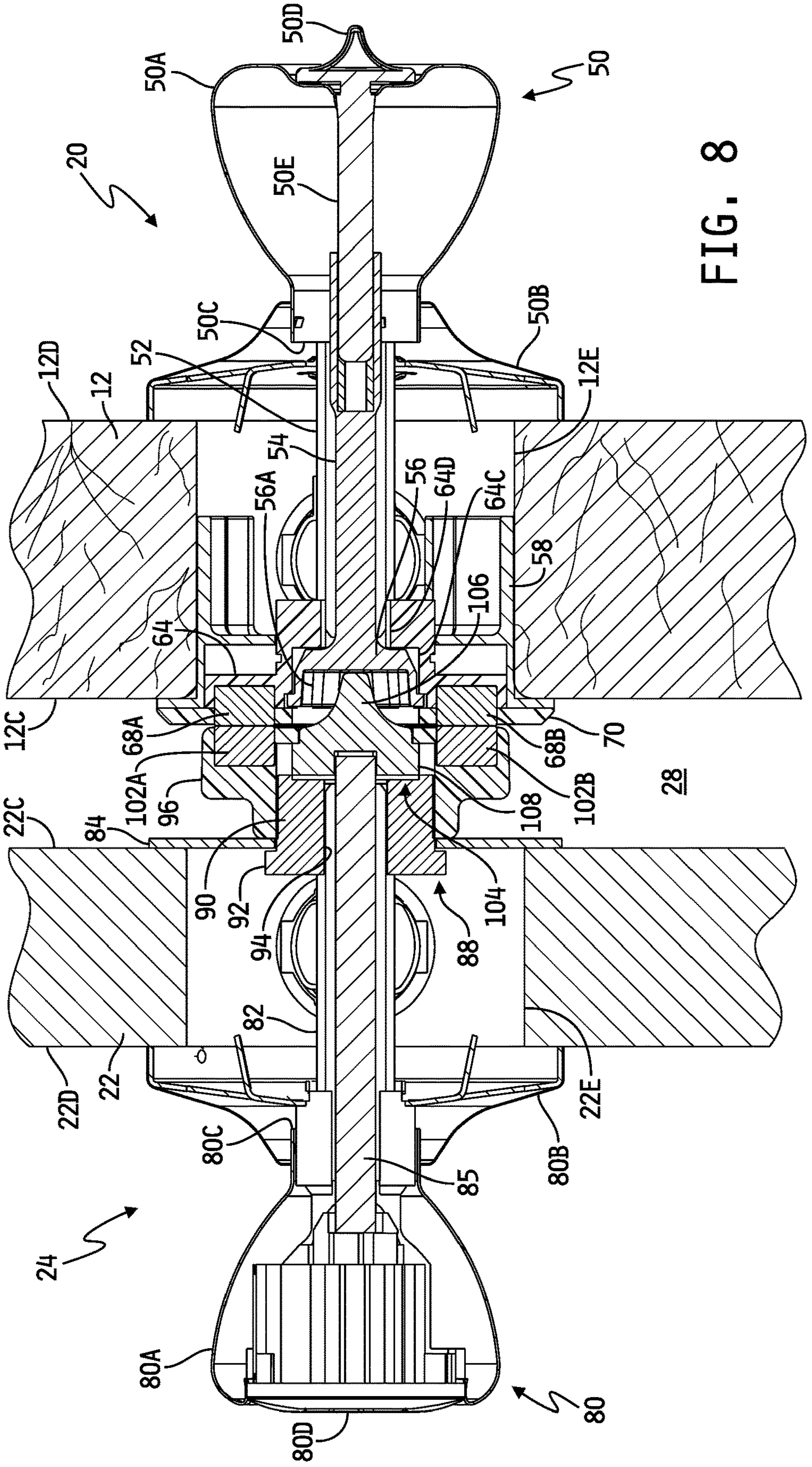
FIG. 8 is a cross-sectional view of the two interlocked door handle assemblies as viewed along section lines 8-8 of FIG. 1A.

Referring generally now to the right sides of FIGS. 5 and 8 respectively, the door handle assembly 20 includes a handleset 50 having handle 50A rotatably coupled to a rosette 50B. Generally, the handle 50A may be or include any structure or combination of structures rotatably coupled to the rosette 50B. In the illustrated embodiment, for example, the handle 50A is provided in the form of a conventional knob rotatable relative to the rosette 50B, and in such embodiments the handleset 50 may be alternately referred to as a "knobset." In alternate embodiments, the handle 50A may be provided in the form of a lever rotatable relative to the rosette 50B, and in such embodiments the handleset 50 may be alternately referred to as a "leverset." The handleset 50 further includes a cam 52 rotatably coupled to the handle 50A such that the cam rotates with the handle 50A about a rotational axis. In some embodiments such as that illustrated in FIG. 5, the handle 50A defines a central bore 50C therein sized to receive one end of a spindle 54, and in such embodiments an axis extending centrally through the bore 50C defines the rotational axis of the handle 50A and cam 52. In such embodiments, the received end of the spindle 54 illustratively engages and is coupled to one end of a lock spindle 50E carried by the handle 50A. The opposite end of the lock spindle 50E is coupled to a conventional locking button 50D (see, e.g., FIGS. 7A and 7B) carried by the handle 50A. Rotation of the locking button 50D rotates the lock spindle 50E which, in turn, rotates the spindle 54 and vice versa.

The handleset 50 is mounted to the door 12 with the rosette 50B abutting the major surface 12D of the door 12 about the face bore 12E and with the cam 52 extending into the face bore 12E and through the bore 43 defined through the latch case 42 of the latch assembly 40. In embodiments which include it, the spindle 54 likewise extends into the face bore 12E and further extends through the bore 43 defined through the latch case 42 of the latch assembly 40, as described above. A lock receiver 56 is illustratively affixed to or integral with an opposite end of the spindle 54 such that the lock receiver 56 rotates with the spindle 54, and in such embodiments the locking button 50D, lock spindle 50E, spindle 54 and lock receiver 56 are together rotatable relative to the door handle 50A between an unlocked position in which the spindle 54 cooperates with components within the handleset 50 and/or the latch assembly 40 to allow rotation of the cam 52 via the door handle 50A to operate the latch tongue 46 as described above, and a locked position in which the spindle 54 cooperates with components within the handleset 50 and/or the latch assembly 40 to prevent rotation of the cam 52 such that the handle 50A is prevented from rotating to operate the latch tongue 46. As also described above, the door handle assembly 20 may not include a locking feature in some embodiments, and in such embodiments the locking button 50D and the lock receiver 56 may be omitted along with the spindle 54.

A cylindrical chassis 58 defines an outer periphery 58A sized to be received within the face bore 12E defined through the door 12. The chassis 58 further illustratively defines a lip 58B at one end thereof which abuts the first major surface 12C of the door 12 when the chassis 58 is received within the face bore 12E. The chassis 58 is illustratively affixed to the rosette 50B of the handleset 50 through the face bore 12E, e.g., via one or more conventional fixation members (not shown in FIG. 5 or 8). The chassis 58 and the rosette 50B are thus each fixed in position relative to the door 12 such that neither the rosette 50B nor the chassis 58 rotates with the handle 50A, lock spindle 50E, cam 52 or spindle 54. In the illustrated example, the chassis 58 defines a channel 58C longitudinally along the outer periphery thereof that is sized to receive the latch case 42 transversely therethrough. In some embodiments, the channel 58C is sized to engage the latch case 42 such that the latch case 42 prevents the chassis 58 from rotating within and relative to the face bore 12E.

The chassis 58 further illustratively defines a recessed plate 62 inwardly of the lip 58B, and the plate 62 defines an opening 60 centrally therethrough that is sized to receive the lock receiver 56 and spindle 54 therethrough. Between the end of the chassis 58 adjacent to the lip 58B and the recessed plate 62, the chassis 58 defines a cylindrical pocket 62A sized to receive a cylindrical magnet housing 64 therein. The cylindrical magnet housing 64 defines a cylindrical body portion 64A having a first outer diameter sized to be received within the pocket 62A of the chassis 58 and to be rotatable within the pocket 62A relative to the chassis 58 about the opening 60. A cylindrical shaft 64B extends axially away from the body portion 64A and the shaft 64B has a second outer diameter sized to be received within and through the opening 60 defined through the chassis 58. The body 64A defines a first bore 64C centrally therethrough, and the shaft 64B defines a second bore 64D centrally therethrough, wherein the axes of the bores 64C and 64D are aligned and the diameter of the bore 64D is less than that of 64C. The bore 64C is sized to receive the lock receiver 56 and the spindle 54 therein such that the lock receiver 56 is rotatable relative to the bore 64C, and the bore 64D is sized to receive the spindle 54 but not the lock receiver 56 therein. The bore 64D further illustratively defines a notch in and along a surface thereof that is sized to receive a terminal end of the cam 52, and the cam 52 is thereby affixed or otherwise coupled to the shaft 64B within the bore 64D such that the magnet housing 64 axially rotates with the cam 52 about the opening 60 and bore 64C of the cylindrical pocket 62A defined by the chassis 58.

Distributed about the body portion 64A of the magnet housing 64 between the outer diameter of the body portion 64A and the bore 64C, the body portion 64A defines a plurality of bores 66 therein such that central axes of the bores 66 are parallel with the central axes of the bores 64C, 64D. Each of the bores 66 is illustratively sized to receive therein a different one of a corresponding plurality of cylindrically-shaped magnets 68 each defining a planar face oriented in a direction facing away from the recessed plate 62. A cylindrical cover plate 70 is received over and engages the exposed terminal face of the body portion 64A of the magnet housing 64. In the illustrated embodiment, the cylindrical cover plate 70 has an outer diameter that is substantially equal to the outer diameter of the body portion 64A of the magnet housing 64, although alternate embodiments are contemplated in which the outer diameter of the cover plate 70 is less than or greater than the outer diameter of the body portion 64A of the magnet housing 64. In any case, the cover plate 70 illustratively defines a bore 70A centrally therethrough that aligns with the bores 64C, 64D and the opening 60, and the bore 70A is sized to receive the lock receiver 56 therein. In the illustrated embodiment, the terminal face of the cover plate 70 extends beyond the terminal face of the lock receiver 56 when the door handle assembly 20 is assembled and mounted to the door 12, although alternate embodiments are contemplated in which the terminal face of the lock receiver 56 may extend beyond the terminal face of the cover plate 70 or in which the terminal face of the lock receiver 56 is substantially flush with the terminal face of the cover plate 70. In the illustrated embodiment, the cover plate 70 further defines a plurality of bores 72 therethrough distributed about the bore 70A such that each bore 72 aligns axially with a corresponding one of the bores 66 so that a planar outer face of a corresponding one of the magnets 68 is exposed through each bore 72. In the illustrated embodiment, the diameters of the bores 72 are sized such that the exposed planar faces of the magnets 68 are co-planar with an outer face of the cover plate 70, although this disclosure contemplates alternate embodiments in which the exposed planar faces of the magnets 68 are at least partially recessed within the openings 72. In alternate embodiments, the cover plate 70 may be solid such that the cover plate 70 covers the planar outer faces of the magnets 68. In any case, the magnet housing 64, magnets 66 and cover plate 70 together illustratively define a magnet assembly 74 which is coupled to the door handle 50A via the cam 52 and which rotates with the handle 50A and cam 52 within and relative to the pocket 62A of the chassis 58.

In the illustrated embodiment, the plurality of magnets 68 illustratively include eight magnets 68 equally spaced about the periphery of the axially aligned bores 64C, 64D, 70A of the magnet assembly 74. Alternatively, the magnet assembly 74 may be configured to include more or fewer magnets, e.g., such that the total number of magnets is one or more. In embodiments which include two or more magnets 68, such magnets may be equally or non-equally spaced about the periphery of the axially aligned bores 64C, 64D, 70A, equally or non-equally spaced only partially about the periphery of the axially aligned bores 64C, 64D, 70A, or equally and/or non-equally spaced individually and/or in sub-groups about or partially about the periphery of the axially aligned bores 64C, 64D, 70A. In any of the foregoing embodiments, each of the one or more magnets 68 may be a conventional permanent magnet.

Alternatively or additionally, the one or more magnets 68 may be or include one or more conventional programmable magnets each having programmable magnetic polarities and/or magnetic field strengths and/or each having two or more zones in which the magnetic polarity and/or magnetic field strength is programmable in a conventional manner. In one example such embodiment, which should not be considered to be limiting in any way, a single programmable magnet 68 may be used and programmed in a conventional manner to define at least two magnetic zones having opposite magnetic polarities, and in one specific example, a single programmable magnet 68 may be used and programmed in a conventional manner to define multiple magnetic zones distributed radially about an exposed surface thereof with each zone having a magnetic polarity opposite to the magnetic polarities of adjacent zones.

Figure 6A:
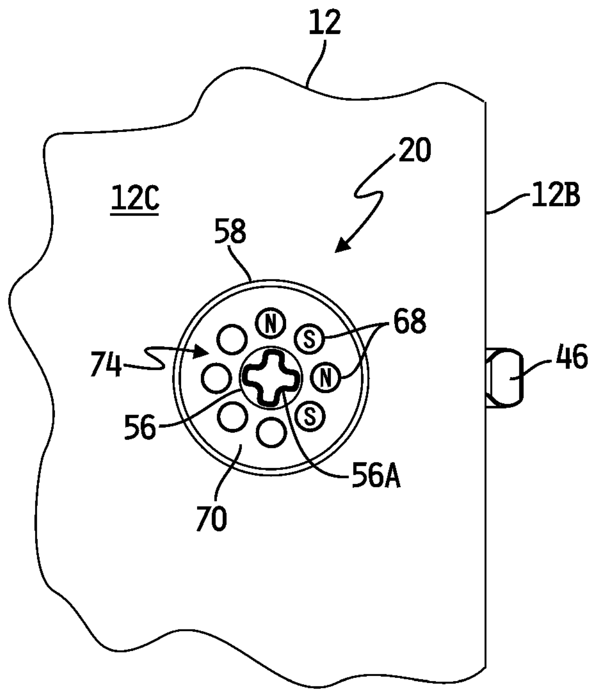
FIG. 6A is a front elevational view of one of the door handle assemblies of the door handle arrangement illustrated in FIG. 5, shown mounted to one of the doors as viewed on a face that opposes the other door.

In embodiments that include the lock receiver 56, the locking end 56A of the lock receiver 56 exposed through the opening 70A is illustratively configured, e.g., keyed, to rotatably engage a locking protrusion carried by the door handle assembly 24, i.e., to couple to the locking protrusion carried by the door handle assembly 24 such that the locking protrusion and the lock receiver 56 rotate together in response to rotation of one or the other. An example configuration of the locking end 56A of the lock receiver 56 is illustrated in the front elevational view of FIG. 6A showing the door handle assembly 20 as assembled and mounted to the major surface 12C of the door 12.

As described above, the rosette 50B of the handleset 50 and the chassis 58 of the door handle assembly 20 are illustratively coupled to each other and both fixed in position relative to the door 12, whereas the door handle 50A, cam 52 and magnet assembly 74 are rotatable together relative to the rosette 50B, chassis 58 and door 12. In embodiments that include them, the locking button 50D, lock spindle 50E, spindle 54 and lock receiver 56 are rotatable together relative to the chassis 58, rosette 50B and door 12, as well as relative to the door handle 50A, cam 52 and magnet assembly 74, to lock and unlock the door handle assembly 20 as also described above.

Referring generally now to the left sides of FIGS. 5 and 8 respectively, the door handle assembly 24 includes a handleset 80 having handle 80A rotatably coupled to a rosette 80B. Generally, the handle 80A may be or include any structure or combination of structures rotatably coupled to the rosette 80B. In the illustrated embodiment, for example, the handle 80A is provided in the form of a conventional knob rotatable relative to the rosette 80B, and in such embodiments the handleset 80 may be alternately referred to as a "knobset." In alternate embodiments, the handle 80A may be provided in the form of a lever rotatable relative to the rosette 80B, and in such embodiments the handleset 80 may be alternately referred to as a "leverset." The handleset 80 further includes a cam 82 rotatably coupled to the handle 80A such that the cam 82 rotates with the handle 80A about a rotational axis. In some embodiments such as that illustrated in FIG. 5, the handle 80A defines a central bore 80C therein (see, e.g., FIG. 8) sized to receive one end of a spindle 85, and in such embodiments an axis extending centrally through the bore 80C defines the rotational axis of the handle 80A and cam 82. In such embodiments, the received end of the spindle 85 illustratively engages a conventional keyway 80D carried by the handle 80A, and in such embodiments the keyway 80D is rotatable, e.g., via a conventional key configured complementarily to the keyway 80D, between an unlocked position in which the spindle 85 cooperates with components within the handleset 80 and/or within the latch assembly 40' to allow rotation of the handle 80A to operate the latch tongue 46 extending from the latch assembly 40', and a locked position in which the spindle 85 cooperates with components within the handleset 80 and/or within the latch assembly 40' to prevent rotation of the handle 80A such that the handle 80A is prevented from operating the latch tongue 46 extending from the latch assembly 40'. In other embodiments, the door handle assembly 24 may not include a locking feature and in such embodiments the keyway 80D may be omitted along with the spindle 85.

The handleset 80 is mounted to the door 22 with the rosette 80B abutting the major surface 22D of the door 12 about the face bore 22E and with the cam 82 extending into the face bore 22E and through the bore 43 defined through the latch case 42 of the latch assembly 40'. In embodiments which include it, the spindle 85 likewise extends into the face bore 22E and further extends through the bore 43 defined through the latch case 42 of the latch assembly 40', as described above. A lock member 104 is illustratively affixed to an opposite end of the spindle 85 such that the lock member 104 rotates with the spindle 85, and in such embodiments the keyway 80D, spindle 85 and lock member 104 are together rotatable relative to the door handle 80A between locked and unlocked positions as described above. As also described above, the door handle assembly 24 may not include a locking feature in some embodiments, and in such embodiments the keyway 80D and the lock member 104 may be omitted along with the spindle 85.

A mounting plate 84, e.g., in the form of an annular disk is received in contact with the major surface 22C of the door 22 about the face bore 22D, and a bore 86 defined through the mounting plate 85 is centrally aligned with the face bore 22E. The mounting plate 84 is illustratively affixed to the rosette 80B of the handleset 80 through the face bore 22E, e.g., via one or more conventional fixation members. The mounting plate 84 and the rosette 80B are thus each fixed in position relative to the door 22 such that neither the rosette 80B nor the mounting plate 84 rotates with the handle 80A, cam 82 or spindle 85.

A bushing 88 defines an outer periphery 90 sized to be received within the bore 86 defined through the mounting plate 84, and further defines a lip or flange 92 at one end thereof which abuts the inner surface 84A of the mounting plate 84 when the bushing 88 is received through the bore 86. The bushing 88 defines a bore 94 centrally therethrough sized to receive the spindle 95 therein. One end of the bushing 88 is illustratively notched around the bore 94 to receive a distal end of the lock member 104 therein. The bushing 88 further defines a notch or channel 94A adjacent to the bore 94 that is sized to receive therein a terminal end of the cam 82, and the cam 82 is affixed or otherwise coupled to the bushing 88 within the channel 94A such that the bushing 88 axially rotates with the cam 82 about the bore 94. In embodiments in which the door handle assembly 24 is configured to be lockable, the spindle 85 extends through the bore 94 between the handle 80A and the lock member 104.

An interlocking handle 96 defines a bore 98 therethrough that is sized and configured to receive the bushing 88 therein. The outer periphery 90 of the bushing and/or the inner surface of the bore 98 defined through the interlocking handle 96 is/are illustratively configured to rotatably couple to each other such that the interlocking handle 96 rotates with the bushing and vice versa about the axially aligned bores 94 and 98. In the illustrated embodiment, for example, the outer periphery 90 of the bushing 88 and the inner surface of the bore 98 of the interlocking handle each illustratively have piece-wise circular cross-sections defined by a plurality of sequentially joined planar sections. Ridges defined at the junctions of the planar sections of the outer periphery 90 align with corresponding creases defined at the junctions of the planar sections of the bore 98 when the bushing 88 is axially received within the bore 98 of the interlocking handle 96 to rotationally couple the interlocking handle 96 to the bushing 88 such that the bushing 88 rotates with the interlocking handle 96 and vice versa. In the example embodiment illustrated in FIG. 5, the outer periphery 90 and the inner surface of the bore 98 are both hexagonal in cross-section, although other piece-wise circular cross-sections are contemplated by this disclosure.

Distributed about the bore 98, an exposed face 99 of the interlocking handle 96 defines a plurality of bores 100 (see, e.g., FIG. 6B) therein such that central axes of the bores 100 are parallel with the central axis of the bore 98. Each of the bores 100 is illustratively sized to receive therein a different one of a corresponding plurality of cylindrically-shaped magnets 102 each defining a planar face oriented in a direction facing away from the mounting plate 84. In the illustrated embodiment, the bores 100 are sized such that the exposed planar faces of the magnets 102 are co-planar with the exposed face 99 of the mounting plate 84, although this disclosure contemplates alternate embodiments in which the exposed planar faces of the magnets 102 are at least partially recessed within the bores 100. In any case, the interlocking handle 96 and magnets 102 together illustratively define a magnet assembly 110 which is coupled to the door handle 80A via the cam 82 and which rotates with the handle 80A and cam 82 relative to the mounting plate 84.

Figure 6B:
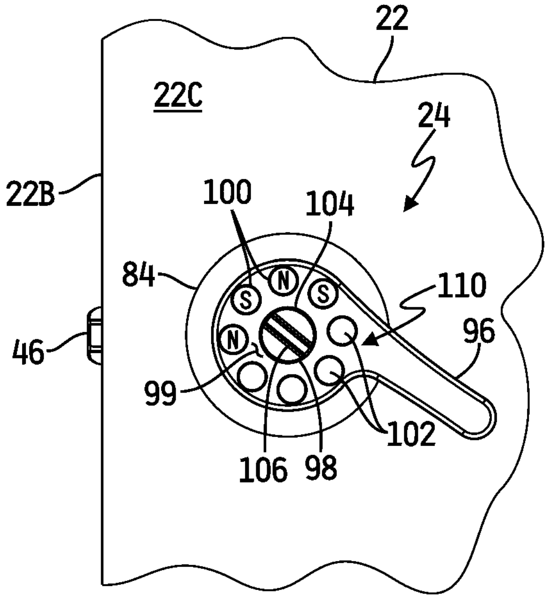
FIG. 6B is a front elevational view of the other of the door handle assemblies of the door handle arrangement illustrated in FIG. 5, shown mounted to the other door as viewed on a face that opposes the one door.

In the example embodiment illustrated in FIGS. 5 and 6B, the plurality of magnets 102 illustratively includes eight magnets 68 equally spaced about the periphery of the bore 98 of the magnet assembly 110. Alternatively, the magnet assembly 110 may be configured to include more or fewer magnets, e.g., such that the total number of magnets is one or more. In embodiments which include two or more magnets 110, such magnets may be equally or non-equally spaced about the periphery of the bores 98, equally or non-equally spaced only partially about the periphery of the bore 98, or equally and/or non-equally spaced individually and/or in sub-groups about or partially about the periphery of the bore 98. In any of the foregoing embodiments, each of the one or more magnets 102 may be a conventional permanent magnet. Alternatively or additionally, the one or more magnets 102 may be or include one or more conventional programmable magnets each having programmable magnetic polarities and/or magnetic field strengths and/or each having two or more zones in which the magnetic polarity and/or magnetic field strength is programmable in a conventional manner. In one example such embodiment, which should not be considered to be limiting in any way, a single programmable magnet 102 may be used and programmed in a conventional manner to define at least two magnetic zones having opposite magnetic polarities, and in one specific example, a single programmable magnet 102 may be used and programmed in a conventional manner to define multiple magnetic zones distributed radially about an exposed surface thereof with each zone having a magnetic polarity opposite to the magnetic polarities of adjacent zones One end of a lock member 104 defines an outer periphery 108 sized to be received in the bore 94 at the end of the bushing 88 that extends away from the mounting plate 84 such that the lock member 104 rotates within the bore 94 relative to the bushing 88 and the interlocking handle 96. The lock member 104 is affixed or otherwise coupled to one end of the spindle 85 as described above, and the lock member 104 thus rotates with the spindle 85 and keyway 80D relative to the door handle 80A, rosette 80B, mounting plate 84, bushing 88 and interlocking handle 96.

A locking protrusion 106 extends outwardly away from an opposite end of the lock member 104, and the locking protrusion 106 is illustratively configured complementarily to the locking end 56A of the lock receiver 56 such that the locking protrusion rotatably engages the locking end 56A of the lock receiver when the door handle assemblies 20 and 24 are brought together in contact with each other. An example configuration of the locking protrusion 106 extending from the lock member 104 is illustrated in the front elevational view of FIG. 6B showing the door handle assembly 24 as assembled and mounted to the major surface 22C of the door 22. As shown in the example embodiment illustrated in FIGS. 6A and 6B, the locking end 56A of the lock receiver 56 is illustratively provided in the form of a pair of cross-slotted channels and the locking protrusion 106 of the lock member 104 is illustratively provided in the form of a linear blade or edge sized to be received within either of the cross-slotted channels such that the lock receiver 56 and lock member 104 are rotationally coupled together. It will be understood that the configurations of the locking end 56A of the lock receiver 56 and the locking protrusion 106 extending from the lock member 104 illustrated in FIGS. 5-8 represent only one example configuration. Those skilled in the art will recognize other configurations of the locking end 56A of the lock receiver 56 and/or of the locking protrusion 106 of the lock member 104 that may be implemented to rotationally coupled the lock receiver 56 and the lock member 104 when the door handle assemblies 20 and 24 are brought together in contact with each other, and it will be understood that any such other configurations are contemplated by this disclosure.

As described above, the rosette 80B of the handleset 80 and the mounting plate 84 of the door handle assembly 24 are illustratively affixed to each other and both are fixed in position relative to the door 22, whereas the door handle 80A, cam 82, bushing 88 and magnet assembly 110 are rotatable together relative to the rosette 80B, mounting plate 84 and door 22. In embodiments that include them, the keyway 80D, the spindle 85 and lock member 104 are rotatable together relative to the rosette 50B, mounting plate 84 and door 22, as well as relative to the door handle 80A, cam 82, bushing 88 and magnet assembly 110, to lock and unlock the door handle assembly 24 as also described above.

The door handle assemblies 20, 24 may be selectively interlocked, coupled together or otherwise engage each other such that the doors 12, 22 pivot together about the one or more hinge assemblies 16, e.g., as illustrated in FIGS. 4A and 4B, and may be selectively decoupled or disengaged from each other such that the doors 12, 22 pivot independently from each other about the one or more hinge assemblies 16, e.g., as illustrated in FIGS. 3A and 3B. In the illustrated embodiment, such selective interlocking of the door handle assemblies 20, 24 is illustratively accomplished through selective alignment of the two sets of magnets 68, 102 via appropriate positioning of the interlocking handle 96 relative to the door 22 followed by magnetic coupling of and between the two sets of magnets 68, 102 as the two handle assemblies 20, 24 are subsequently brought into contact with each other. Selective decoupling or disengagement of the interlocked door handle assemblies 20, 24 is illustratively accomplished by rotating the door handle 50A in a release direction, e.g., counterclockwise, until the interlocking handle 96 magnetically coupled to the magnet assembly 74 and rotating therewith has reached a release position at which the interlocking handle 96 is prevented from further rotation in the release direction, and then further rotating the door handle 50A in the release direction with a rotational force that is sufficient to overcome the magnetic coupling force between the two sets of magnets 68, 102, thereby decoupling the two door handle assemblies 20, 24.

Referring now to FIGS. 6A-8, selective interlocking of the door handle assemblies 20, 24 is graphically demonstrated. In the example door assemblies 20, 24 illustrated in FIGS. 6A and 6B respectively, the magnets 68, 102 are illustratively arranged such that the exposed surfaces of the magnets 68 alternate in magnetic polarity about the lock receiver 56 and the exposed surfaces of the magnets 102 likewise alternate in magnetic polarity about the lock member 104. With the interlocking door handle 96 rotated clockwise, e.g., manually, to an interlocking position illustrated in FIG. 6B, the magnetic polarities of the exposed surfaces of the magnets 68 are opposite those of the magnets 102 axially aligned therewith. As the door handle assemblies 20, 24 are brought toward each other by pivoting one door 12 toward the other door 22, or by pivoting both doors 12, 22 toward each other, about the one or more hinge assemblies 16 as illustrated in FIG. 7A, magnetic attractive forces develop between each axially aligned and opposite magnetic polarity pair of magnets in the opposing sets of magnets 68, 102. As the distance between the interlocking door handle 96 and the cover plate 70 decreases, magnetic attractive forces increase between each aligned pair of the opposing sets of magnets 68, 102 about the periphery of the lock receiver 56 and the lock member 104 until magnetic coupling occurs between each of the aligned and opposite magnetic polarity pairs of magnets 68, 102 which draws them into contact with each other, thereby magnetically coupling together the door handle assemblies 20, 24 as illustrated in FIG. 7B.

Such magnetic coupling between the exposed surfaces of two example opposing pairs of magnets 68A, 102A and 68B, 102B is illustrated in FIG. 8. As a result of such magnetic coupling, the door handle assemblies 20, 24, and thus the doors 12, 22 respectively are secured together adjacent to the latch sides 12B, 22B respectively thereof, such that the doors 12, 22 may be pivoted together about the one or more hinge assemblies 16 between common open and closed positions as illustrated in FIGS. 3A and 4A. And because the magnet assembly 74 rotates with the door handle 50A and the interlocking door handle 96 rotates with the door handle 80A, rotating either door handle 50A or 80A simultaneously operates both latch assemblies 40, 40'. By rotating either door handle 50A, 80A with the door handle assemblies 20, 24 interlocked, i.e., magnetically coupled together as illustrated in FIGS. 7B and 8, the latch tongues 46 of both latch assemblies 40, 40' can thus be selectively and simultaneously engaged/disengaged with/from the strike plates 15A, 15B respectively.

As illustrated in FIGS. 7A, 7B and 8, as the door handle assemblies 20, 24 are brought together and interlocked, the locking protrusion 106 extending from the lock member 104 is received within and rotatably engages the locking end 56A of the lock receiver 56. With the locking protrusion 106 rotatably engaged with the locking end 56A of the lock receiver, the lock member 104 rotates with rotation of the lock receiver 56 and vice versa such that rotation of the locking button 50D to the locked or unlocked position of the door handle 50A is transferred through the rotatably engaged lock receiver 56 and lock member 104 to also lock or unlock, respectively, the door handle 80A via actuation of the keyway 80D. Rotation of the keyway 80D, e.g., via a complementarily configured key, to the locked or unlocked position of the door handle 80A is likewise transferred through the rotatably engaged lock member 104 and lock receiver 56 to lock or unlock, respectively, the door handle 50A via actuation of the locking button 50D. By rotating either the locking button 50D or the keyway 80D with the door handle assemblies 20, 24 interlocked, i.e., magnetically coupled together, as illustrated in FIGS. 7B and 8B, the door handles 50A, 80A can thus be selectively and simultaneously locked/unlocked.

Figure 9A:
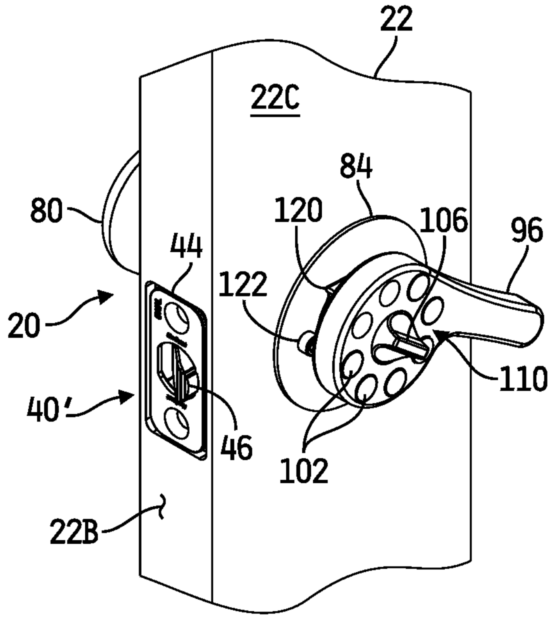
FIG. 9A is a perspective view of the door handle assembly illustrated in FIG. 6B shown in a position in which it may be interlocked with the door handle assembly illustrated in FIG. 6A.
Figure 9B:
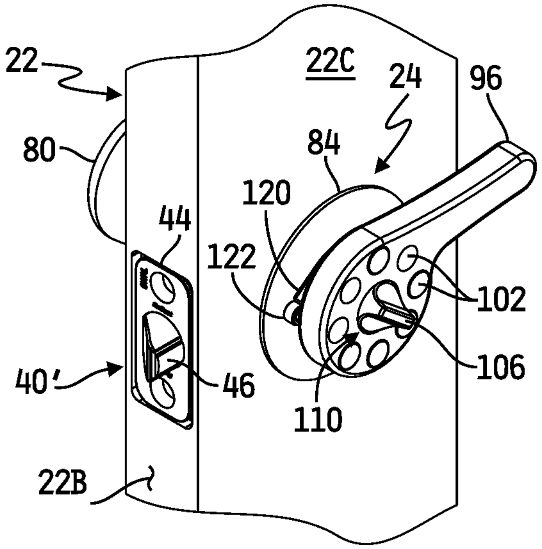
FIG. 9B is a perspective view of the door handle assembly of FIG. 9A shown moved to a position in which it may be decoupled from the door handle assembly illustrated in FIG. 6A.

Referring now to FIGS. 9A and 9B, the interlocking handle 96 is shown in its interlocking and release positions respectively. With the door handle assemblies 20, 24 decoupled as illustrated in FIGS. 3A and 7A, the interlocking handle 96 may be manually moved, e.g., rotated, from the interlocking position (FIG. 9A) to the release position (FIG. 9B) by rotating the interlocking handle 96 in the counterclockwise direction, and may be moved from the release position (FIG. 9B) to the interlocking position (FIG. 9A) by rotating the interlocking handle 96 in the clockwise direction. With the door handle assemblies 20, 24 interlocked as illustrated in FIGS. 7B and 8, the interlocking handle 96 may be moved from the interlocking position to the release position to thereby decoupled the door handle assemblies 20, 24 by rotating the door handle 50A in the counterclockwise direction which, through the magnetic coupling between the sets of magnets 68, 102, also rotates the interlocking handle 96 in the counterclockwise direction as described above.

Figure 9C:
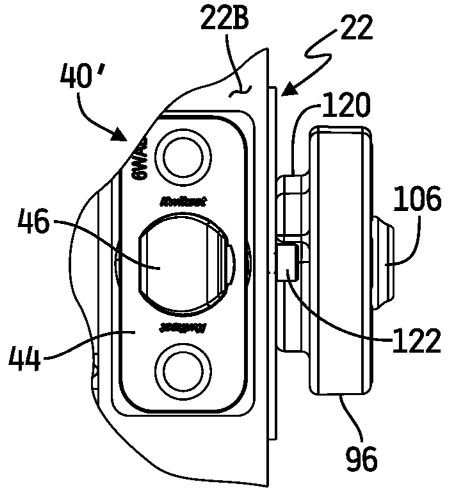
FIG. 9C is a side elevational view of the door handle assembly illustrated in FIG. 9B.

The release position of the interlocking door handle 96 is illustratively defined by a physical stop which prevents further rotation of the interlocking door handle 96 in the counterclockwise direction. In the embodiment illustrated in FIGS. 9A-9C, such a physical stop is illustratively implemented in the form of a protrusion 120 extending away from an inner surface of the interlocking door handle 96 toward the mounting plate 84 and another protrusion 122 extending away from the mounting plate 84 toward the inner surface of the interlocking door handle 96. The positions of the protrusions 120, 122 relative to the interlocking door handle 96 and the mounting plate 84 respectively may be selected to provide any amount of rotational distance between the interlocking and release positions of the interlocking door handle 96 relative to the mounting plate 84. Typically, the rotational distance between the interlocking and release positions of the interlocking door handle 96 will be selected to provide for selective disengagement of the latch tongues 46 of the latch assemblies 40, 40' from the strike plates 15A, 15B respectively via rotation of the door handle 50A and/or the door handle 80A prior to reaching the physical stop of the interlocking door handle 96 defined by the protrusions 120, 122.

In any case, with the interlocking door handle 96 rotated counterclockwise to the release position illustrated in FIG. 9B in which the protrusion 120 contacts the protrusion 122, the interlocking door handle 96 cannot be further rotated in the counterclockwise direction and the door handle assemblies 20, 24 may be decoupled from each other by further rotating the door handle 50A in the counterclockwise direction with sufficient force to overcome the magnetic coupling between aligned pairs of the magnets 68, 102. With the position of the interlocking door handle 96 fixed in its release position by the abutting protrusions 120, 122, such further rotation of the door handle 50A in the counterclockwise direction with a force greater than the magnetic coupling forces between the aligned pairs of magnets 68, 102 causes the magnet assembly 74 to rotate counterclockwise relative to the exposed face 99 of the interlocking door handle 96, thereby rotationally drawing the magnets 68 away from the previously aligned and opposite polarity magnets 102. As the magnet assembly 74 continues to rotate (with the door handle 50A) counterclockwise relative to the face 99 of the interlocking handle 96, the exposed surfaces of the magnets 68 continue to be drawn away from the exposed surfaces of magnets 102 having opposite magnetic polarity and toward the exposed surfaces of magnets 102 having like polarities. As the exposed surfaces of the magnets 68 rotate sufficiently away from the exposed surfaces of the previously aligned and opposite polarity magnets 102, the door assemblies 20, 24 magnetically decouple from each other so that the doors 12, 22 may be separated from each other. As the exposed surfaces of the magnets 68 move, e.g., with further rotation of the door handle 50A in the counter-clockwise direction, into alignment with the exposed surfaces of magnets 102 having like polarity, magnetic repulsive forces develop therebetween. Such magnetic repulsive forces operate to force the magnet assemblies 74, 110 away from each other, thereby magnetically assisting with the decoupling of the door handle assemblies 20, 24 and with the separation of the doors 12, 22 from each other.

In one embodiment, the bushing 88 is configured to form a frictional fit within the bore 86 defined through the mounting plate 84, and such frictional fit illustratively results in the interlocking handle 96 generally remaining in any position to which it is moved until the interlocking handle 96 is subsequently moved. In alternate embodiments, the interlocking handle 96 may be biased, e.g., via one or more conventional springs, to the interlocking position illustrated in FIG. 9A such that the interlocking handle 96 returns under bias to the interlocking position when the door handle assemblies 20, 24 are decoupled.

With the door handle assemblies 20, 24 decoupled from each other as illustrated in FIGS. 3A and 3B, the door handle assembly 24 is operable in a conventional manner, e.g., by rotating the handle 80A and/or the interlocking handle 96, to selectively engage and release the latch tongue 46 with and from the strike plate 15B. Illustratively, the rotational distance between the interlocking and release positions of the interlocking door handle 96 relative to the mounting plate 84 is selected to allow such rotation of the interlocking handle 96 to engage and release the latch tongue 46 before reaching the physical stop that defines the release position of the handle 96. In embodiments in which the door handle assembly 24 is lockable, i.e., to selectively prevent release of the latch tongue 46 from the strike plate 15B, and unlockable, i.e., to selectively allow release of the latch tongue 46 from the strike plate 15B, the door handle assembly 24 is further operable in a conventional manner, e.g., by manually rotating the locking protrusion 106 and/or by actuating the keyway 80D with a complementarily configured key, to lock and unlock the door handle assembly 24.

The door handle assembly 20 is also operable, with the door handle assemblies 20, 24 decoupled from each other, in a conventional manner, e.g., by rotating the handle 50A, to selectively engage and release the latch tongue 46 with and from the strike plate 15A. In embodiments in which the door handle assembly 20 is lockable, i.e., to selectively prevent release of the latch tongue 46 from the strike plate 15A, and unlockable, i.e., to selectively allow release of the latch tongue 46 from the strike plate 15A, the door handle assembly 20 is further operable in a conventional manner, e.g., by manually rotating the lock button 50D to lock and unlock the door handle assembly 20. However, as illustrated in FIGS. 3A and 3B, the door handle assembly 20 need not be operable from the major surface 12C side of the door 12 to selectively engage/release the latch tongue 46 or to lock/unlock the door handle assembly 20 since, with the door handle assemblies 20, 24 decoupled, the doors 12, 22 will typically be separated from each other, in which case the door 12 will typically be at least partially open and an operator of the doors 12, 22 will therefore have access to the major surface 12D side of the door 12 and, in turn, will have access to the handle 50A and lock button 50D.

With the door handle assemblies 20, 24 interlocked and therefore coupled to each other as illustrated in FIGS. 1A, 1B and 4A, 4B, the door handle assemblies 20, 24 are operable together and simultaneously as described above, e.g., by rotating the handle 80A and/or the handle 50A. Rotating only the handle 80A causes the latch assembly 40' to selectively engage and release the latch tongue 46 with and from the strike plate 15B in a conventional manner. And with the door handle assemblies 20, 24 coupled together, such rotational motion of the handle 80A is transferred through the components of the door handle assemblies 20, 24 as described above to also simultaneously rotate the handle 50A and cause the latch assembly 40 to selectively engage and release the latch tongue 46 with and from the strike plate 15A. Similarly, rotating only the handle 50A causes the latch assembly 40 to selectively engage and release the latch tongue 46 with and from the strike plate 15A in a conventional manner, and such rotational motion of the handle 50A is transferred through the components of the door handle assemblies 20, 24 as described above to also simultaneously rotate the handle 80A and cause the latch assembly 40' to selectively engage and release the latch tongue 46 with and from the strike plate 15B. As described above, the rotational distance between the interlocking and release positions of the interlocking door handle 96 relative to the mounting plate 84 is illustratively selected to allow such rotation of the door handle assembly 24 to engage and release the latch tongue 46 before reaching the physical stop that defines the release position of the interlocking door handle 96. Further rotation of the door handle 50A, e.g., counterclockwise, after reaching the physical stop that defines the release position of the interlocking door handle 96 causes the door handle assemblies 20, 24 to decouple from each other if the applied rotational force is sufficient to overcome the magnetic coupling force between the aligned sets of magnets 68, 102 as described above.

In embodiments in which the door handle assemblies 20, 24 are lockable, i.e., to selectively prevent release of the latch tongue 46 from the strike plate 15A and to prevent release of the latch tongue 46 from the strike plate 15B, and unlockable, i.e., to selectively allow release of the latch tongues 46 from the strike plates 15A, 15B, the door handle assemblies 20, 24 are each separately operable in a conventional manner, e.g., by manually rotating the lock button 50D or by selectively actuating the keyway 80D with a complementarily configured key, to lock and unlock the respective door handle assemblies 20, 24 as described above. When the door handle assemblies 20, 24 are interlocked as described above, rotation of the lock button 50D to lock or unlock the door handle assembly 20 is transferred, as described above, to the keyway 80D to thereby also simultaneously lock or unlock the door handle assembly 24, and rotation of the keyway 80D to lock or unlock the door handle assembly 24 is likewise transferred to the lock button 50D to thereby simultaneously lock or unlock the door handle assembly 20.

Referring now to FIGS. 10-22B, another embodiment is shown of a door assembly 210 including a pair of selectively interlocking, opposing doors 212, 222. The door assembly 210 is similar in some respects to the door assembly 10 illustrated in FIGS. 1-90, and like numbers +200 are used to identify like components. In one embodiment, the doors 212, 222 share three common hinge assemblies 216 spaced apart along the length of a door jamb 214A in a conventional manner, although in other embodiments the doors 212, 222 may alternatively share more or fewer common hinge assemblies 216. The door 212 includes a handle assembly 220, and the door 222 includes a separate handle assembly 224. The handle assemblies 220, 224 may be selectively interlocked, i.e., selectively coupled to or engaged with each other, such that the doors 212, 222 are together pivotable about the one or more hinge assemblies 216 between closed and open positions as illustrated by example in the embodiment illustrated in FIGS. 1A, 1B and 4A, 4B respectively and described above. The handle assemblies 220, 224 may also be selectively decoupled or disengaged from each other such that the doors 212, 222 may each be separately pivotable about the one or more hinge assemblies 216 so as to be independently openable and closable as illustrated by example in the embodiment illustrated in FIGS. 3A and 3B and described above.

The door assembly 210, like the door assembly 10 illustrated in FIGS. 1-9C, includes a door jamb mountable in a conventional manner to a door frame of a building structure. The door jamb illustratively includes a hinge-side jamb and a latch-side jamb both coupled to a top jamb, wherein each such jamb may be a separate from the others with all such jambs coupled together in a conventional manner to form the door jamb or wherein two or more such jambs may be of unitary construction. In the embodiment illustrated in FIGS. 10, 12, 13 and 14A—14D, hinge-side and latch-side and top jambs 214A, 214B, 214C respectively of the door jamb are shown coupled together in a conventional manner, and it will be understood that such jambs 214A, 214B, 214 are mountable, affixable or otherwise attachable to conventional door frame components of a building structure as described above with respect to the embodiment 10. The structure 226, like the structure 26 of the embodiment 10 illustrated in the embodiment 10 of FIGS. 1-9C, illustratively represents a sill plate coupled to the floor of the building structure or other floor structure that is part of the building structure which, in any case, also partially defines the doorway of the building structure. In some embodiments, the sill plate 226 is coupled to either or both of the jambs 214A, 214B, although in alternate embodiments the sill plate 226 may be separate from either or both of the jambs 214A, 214B.

Figure 10:
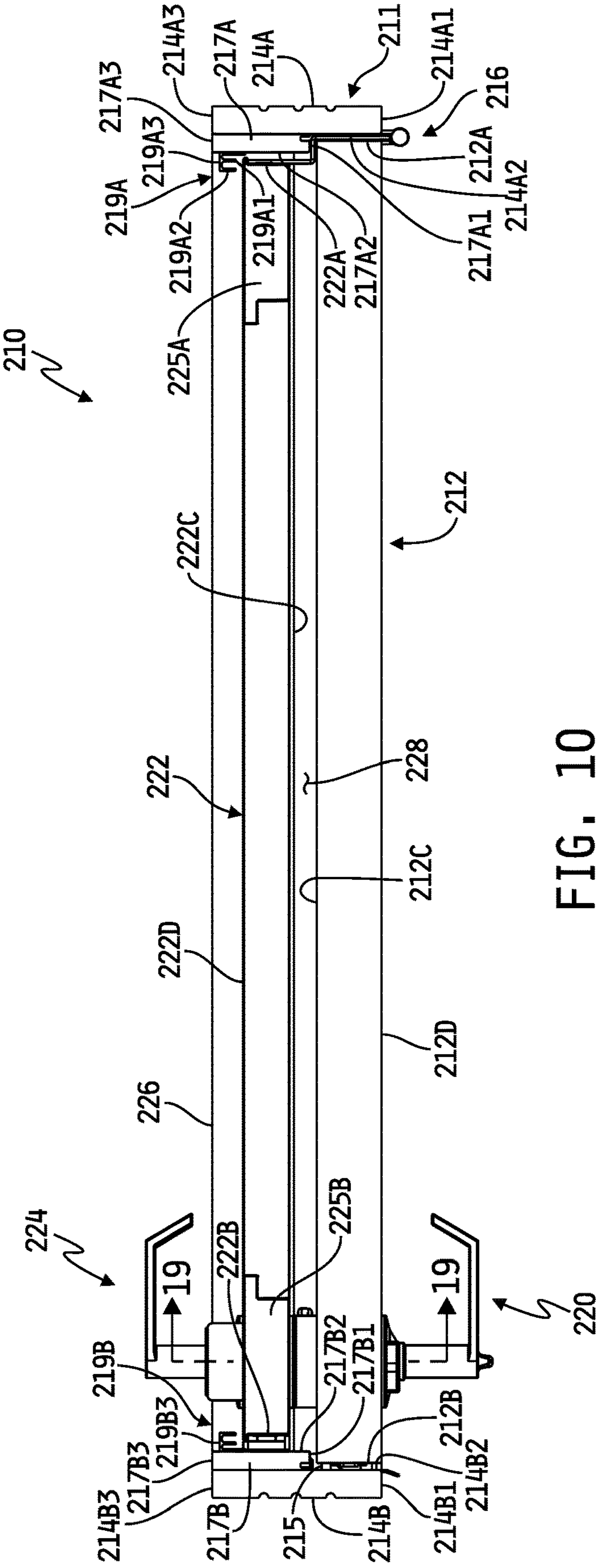
FIG. 10 is a top plan view of another embodiment of a door assembly including a pair of opposing doors that share a common hinge assembly, with the doors shown interlocked and with each in a closed position relative to a door frame.

In the illustrated embodiment, the door 212 defines a hinge side 212A to which the one or more hinge assemblies 216 is/are mounted, and the door 222 likewise defines a hinge side 222A to which the one or more hinge assemblies 216 is/are mounted. The one or more hinge assemblies 216 is/are also mounted to an inwardly-facing, generally planar, surface 214A2 of the hinge-side jamb 214A. The door 212 further defines a latch side 212B, and at least one conventional door latching component, e.g., at least one latch tongue, of the handle assembly 220 extends therefrom. At least one door latch engaging component, e.g., at least one strike plate 215 (see, e.g., FIG. 12), is mounted, attached or otherwise affixed to at least the latch-side jamb 214B, and the at least one door latching component extending from the door 212 and the at least one strike plate 215 are configured to selectively engage each other in a conventional manner when the door 212 is pivoted about the one or more hinge assemblies 216 to a closed position as illustrated in FIG. 10. Likewise, the door 222 defines a latch side 222B, and at least one conventional door latching component, e.g., at least one latch tongue of the handle assembly 224, extends therefrom. In the illustrated embodiment, the at least one door latch engaging component, e.g., the at least one strike plate 215, is also mounted, attached or otherwise affixed to a latch-side stop 217B coupled to or integral with the latch-side jamb 214B, and the at least one door latching component extending from the door 222 and the at least one strike plate 215 are configured to selectively engage each other in a conventional manner when the door 222 is pivoted about the one or more hinge assemblies 216 to a closed position as illustrated in FIG. 10. All such door latching components and the at least one door latch engaging component are also configured to selectively disengage from each other in a conventional manner, e.g., via conventional actuation of the door handle assemblies 220, 224 respectively, to enable the doors 212, 222 respectively to pivot about the one or more hinge assemblies 216.

Figure 21A:
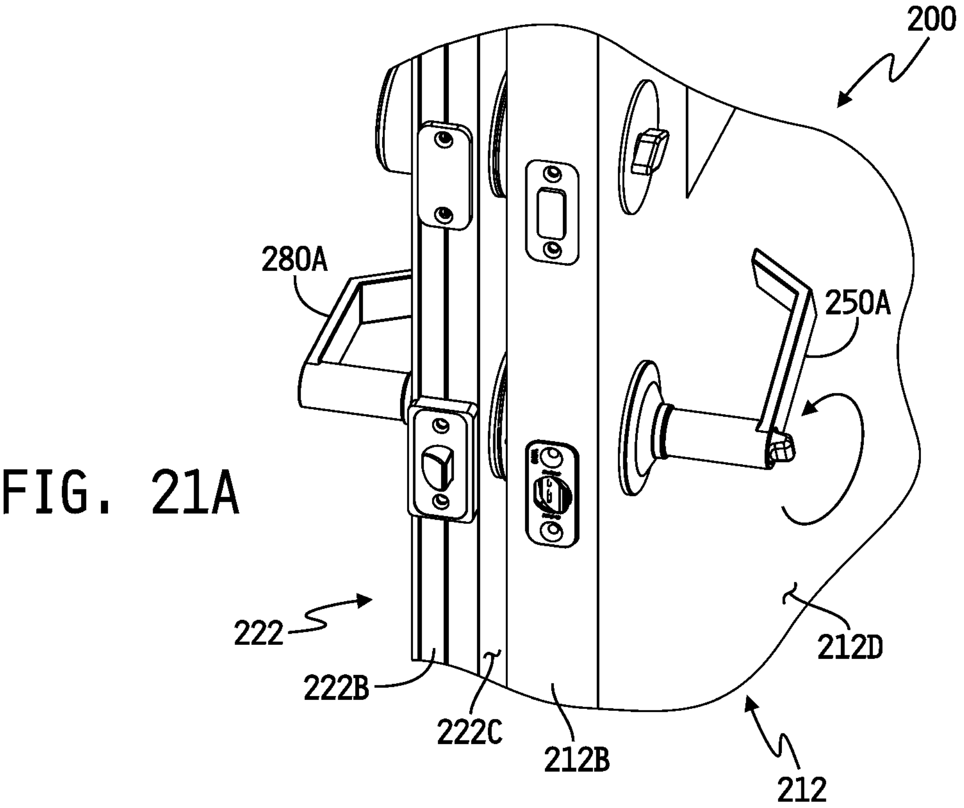
FIG. 21A is a perspective view of the two doors of the door assembly of FIGS. 10-20B shown with the two door handle assemblies interlocked and illustrating how the two door handle assemblies are decoupled via actuation of one of the door handle assemblies.

The door 212 further defines a first major surface 212C, and a second major surface 212D opposite the first major surface 212C, and the door 222 likewise defines a first major surface 222C and a second major surface 222D opposite the first major surface 222C. The first major surface 212C of the door 212 generally faces the first major surface 222C defined by the door 222, and a space 228 is defined by the door handle assemblies 220, 224 between the first major surfaces 212C, 222C of the doors 212, 222 respectively when the door handle assemblies 220, 224 are interlocked as illustrated in FIGS. 10, 20A and 21A. In the illustrated embodiment, the door 212 is a conventional exterior door, the first major surface 212C of which generally faces the door 222 and the second major surface 212D of which faces an interior of the building, and the door 222 is a conventional storm door, the first major surface 222C of which generally faces the door 212 and the second major surface 222D of which faces an exterior of the building. In some alternate embodiments, the door 212 may represent a conventional storm door and the door 222 may represent a conventional exterior door. In other alternate embodiments, the door 212 may represent any conventional interior, exterior, storm, general purpose or special purpose door, and the door 222 may likewise represent any conventional interior, exterior, storm, general purpose or special purpose door.

The door 212 may be formed of one or more conventional materials, examples of which may include, but are not limited to, wood, composite, plastic, fiber reinforced plastic, metal, any combination the foregoing, any of the foregoing materials as one or more outer shells or skins with an interior core that is hollow or is formed of a conventional material such as foam, plastic, fiber reinforced plastic, or the like. In the illustrated embodiment, which should not be considered limiting in any way, the door 212 is depicted as being a solid-core door made of wood. The door 222 may likewise be formed of one or more conventional materials, examples of which may include, but are not limited to, wood, composite, plastic, fiber reinforced plastic, metal, any combination the foregoing, any of the foregoing materials as one or more outer shells or skins with an interior core that is hollow or is formed of a conventional material such as foam, plastic, fiber reinforced plastic, or the like. As illustrated in FIGS. 14A-14D, which should not be considered limiting in any way, the door 222 is depicted as including a top stile 223A, a bottom stile 223B, a hinge-side stile 223C and a latch-side stile 223D, all coupled together in a conventional manner, wherein the stiles 223A—223D are illustratively hollow-core stiles formed of metal skins. In the illustrated embodiment, the door 222 further illustratively includes a panel 221 surrounded by and coupled to each of the stiles 223A—223D. The panel 223 is illustrated by example as being formed of a transparent material, examples of which may include but are not limited to glass, plexiglass, tempered glass, plastic or the like, although in other embodiments the panel 223 may be or include one or more translucent and/or opaque materials and/or one or more solid and/or other materials which block light or which otherwise does/do not transmit light. It will be understood that while the example door 222 illustrated in FIGS. 14A-14D includes only a single panel 223, alternate embodiments are contemplated which include more or no panels. In some embodiments, as depicted by example in FIG. 10, stile caps 225A and 225B may be mounted, attached or otherwise positioned over the stiles 223C and 223D respectively to prevent moisture ingress into the door 222.

As illustrated most clearly in FIGS. 10, 13, 14A, 14C and 14D, the hinge-side door jamb 214A defines a generally planar surface 214A1 at one end of the side surface 214A2 and another generally planar surface 214A3 at an opposite end of the side surface 214A2, and the latch-side door jamb 214B likewise defines a generally planar surface 214B1 at one end of the side surface 214B2 and another generally planar surface 214B3 at an opposite end of the side surface 214B2. The top door jamb is illustratively identically configured.

The door jamb further illustratively includes a conventional door stop mounted to and about an inner periphery of the door jamb which forms a physical stop and, in some embodiments, a sealing surface for the door 212. As further illustrated by example in FIGS. 10, 13, 14A, 14C and 14D, an inner side of a hinge-side door stop 217A is illustratively affixed to the inner-facing surface 214A2 of the hinge-side door jamb 214A along its length, and an inner side of a latch-side door stop 217B is likewise illustratively affixed to the inner-facing surface 214B2 of the hinge-side door jamb 214B. A generally planar outer side surface 217A2 of the hinge-side door stop 217A faces inwardly toward the door stop 217B, and a generally planar end surface 217A1 extends between the inner side surface and the outer side surface 217A2 of the stop 217A between, and generally parallel with, the end surfaces 214A1 and 214A3 of the hinge-side jamb 214A. A generally planar opposite end surface 217A3 of the hinge-side stop 217A is, in the illustrated embodiment, flush with the end surface 214A3 of the hinge-side jamb 214A, although in alternate embodiments the end surface 217A3 may extend beyond the end surface 214A3 or vice versa. The latch-side door stop 217B is illustratively configured identically to the hinge-side door stop 217A with corresponding surfaces 217B1, 217B2 and 217B3, and a corresponding top-side door stop 217C is illustratively identically configured as just described. The end surfaces 217A1 and 217B1 of the hinge-side stop 217A and the latch-side stop 217B, as well as the corresponding end surface of the top-side stop 217C, are sized to extend inwardly of the door jamb 214A, 214B, 214C and over a portion of the major surface 212C of the door 212 along the sides 212A and 212B and the top thereof to act as a conventional physical stop to the door 212 as it is moved from its open position to its closed position. In some embodiments, a conventional sealing material, e.g., foam, plastic, rubber, etc., may be attached or affixed to and along the end surfaces 217A1, 217B1 of the hinge-side and latch-side stops 217A, 217B respectively, as well as the corresponding end surface of the top-side stop, to form a seal between the major surface 212C of the door 212 and such stop surfaces when the door 212 is closed as illustrated in FIG. 10.

Figure 13:
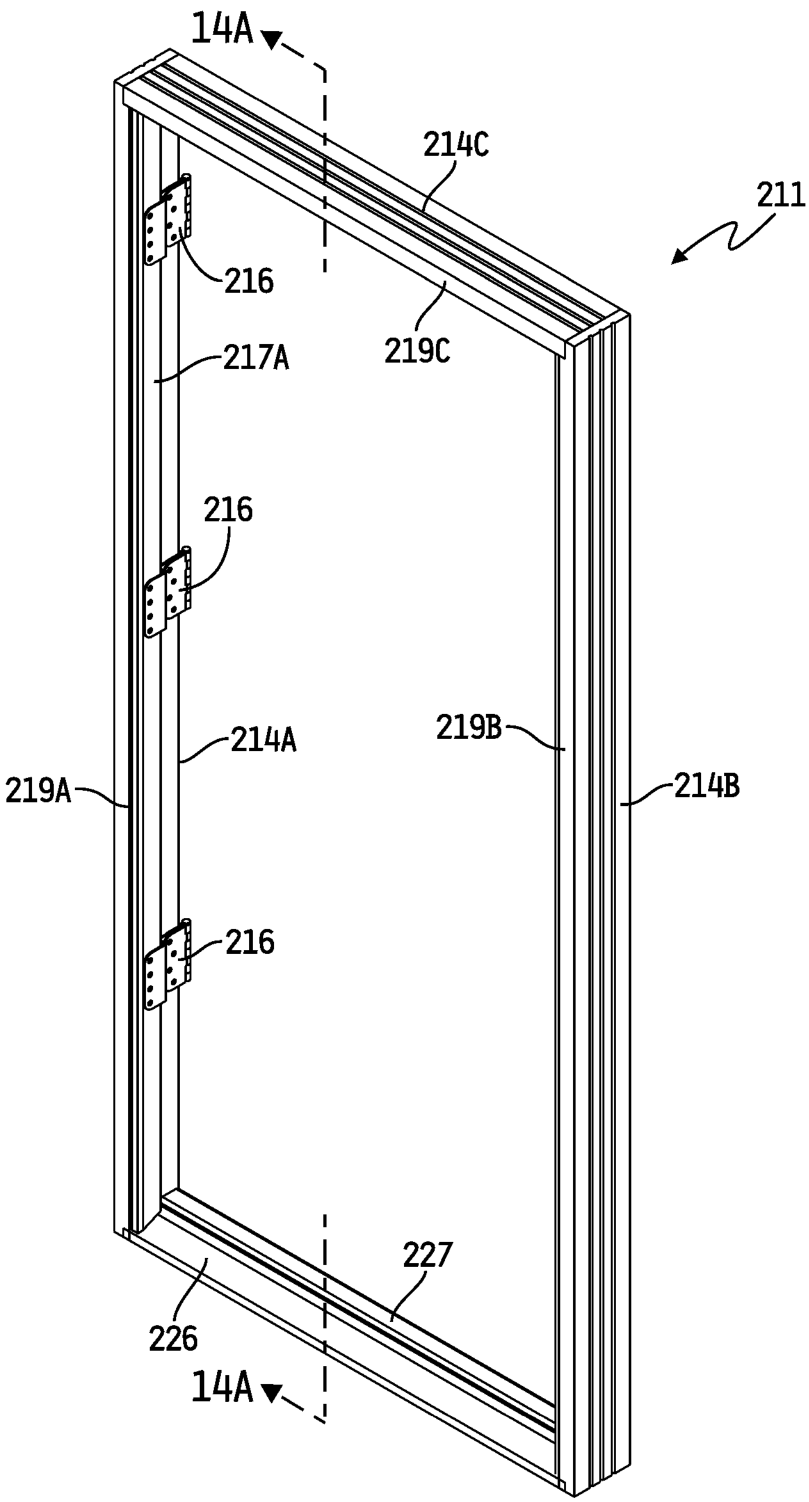
FIG. 13 is a perspective view of the door frame illustrated in FIGS. 10 and 12 with three of the hinge assemblies illustrated in FIG. 11 mounted thereto but with no doors mounted thereto.

As with the embodiment depicted in FIGS. 1A-9C, the doors 212, 222 pivot in the same direction about the one or more hinges 216, and the doors 212, 222 therefore each open and close in the same direction. In this regard, some embodiments of the door assembly 210 further illustratively include a second door stop mounted to and about an inner periphery of the door jamb to form a physical stop and, in some embodiments, a sealing surface for the door 222. As illustrated by example in FIGS. 10, 13, 14A, 14C and 14D, an inner side of a second hinge-side door stop 219A is illustratively attached or affixed to the inner-facing surface 217A2 of the hinge-side door stop 217A along its length between its two ends 217A1 and 217A3, and an inner side of a latch-side door stop 219B is likewise illustratively affixed to an inner-facing surface 217B2 of the hinge-side door stop 217B along its length between its two ends 217B1 and 217B3. A generally planar outer side surface 219A2 of the hinge-side door stop 219A faces inwardly toward the door stop 219B, and generally planar and opposing end surfaces 219A1 and 219A2 extend between the inner side surface and the outer side surface 219A2 of the stop 219A. The latch-side door stop 219A is illustratively configured identically as just described with corresponding surfaces 219B1, 219B2, 219B3, as is the corresponding top door stop 219C. In the illustrated embodiment, the end surfaces 219A3, 219B3 of the stops 219A, 219B respectively are generally parallel with the end surfaces 214A3, 214B3 of the hinge-side and latch-side jambs 214A, 214B and also with the end surfaces 217A3, 217B3 of the hinge-side and latch-side stops 217A, 217B, as is the corresponding end surface of the top stop 219C, as depicted in FIGS. 13, although in alternate embodiments the end surface 19A3 may extend beyond the end surfaces 214A3 and/or 217A3 or vice versa as depicted in FIG. 10.

The end surface 219A1 of the hinge-side stop 19A, as well as the corresponding end surface 219B1 of the latch-side stop 219B and the corresponding end surface of the top-side stop 219C, are sized to extend inwardly of the door jamb and over a portion of the major surface 222D of the door 222 along the sides 222A and 222B and the top thereof to act as a conventional physical stop to the door 222 as it is moved from an open position to its closed position, e.g., as illustrated in FIG. 10. In some embodiments, a conventional sealing material, e.g., foam, plastic, rubber, etc., may be attached or affixed to and along the end surface 219A1 of the hinge-side stop 219A, as well as the corresponding end surface 219B1 of the latch-side stop 219B and the corresponding end surface of the top-side stop, to form a seal between the major surface 222D of the door 222 and such stop surfaces when the door 222 is closed as illustrated in FIG. 10.

In some embodiments, as illustrated in FIGS. 10, 12-14A, 14C and 14D, the side jambs 214A, 214B and the top jamb 214C, are each separate components coupled together in a conventional manner, although in some alternate embodiments at least two such jamb components may be integral and of unitary construction, and in other alternate embodiments all three such jamb components are integral and of a single unitary construction. Likewise, the side stops 217A, 217B and the top-side stop 217C, are each illustratively separate components coupled together in a conventional manner, although in some alternate embodiments at least two such stop components may be integral and of unitary construction, and in other alternate embodiments all three such stop components are integral and of a single unitary construction. Further still, the side stops 219A, 219B and the top-side stop 219C are likewise each illustratively separate components coupled together in a conventional manner, although in some alternate embodiments at least two such stop components may be integral and of unitary construction, and in other alternate embodiments all three such stop components are integral and of a single unitary construction. In still other alternate embodiments the jamb components 214A—214C and the stop components 217A—217C may be integral and of a single unitary construction, and the stop components 219A—219C may be separate pieces mounted, affixed or otherwise attached to the unitary structure, and in yet further alternate embodiments all jamb components 214A—214C and all stop components 217A—217C and 219A—219C may be integral and of a single unitary construction. In any case, it will be appreciated that the common pivoting direction of the doors 212, 222, along with the door jamb and stop combination just described, advantageously provides for double sealing of the door assembly relative to the door jamb, which feature is generally not attainable in conventional storm door applications in which the storm door opens and closes in directions opposite to the opening and closing directions of the main or exterior door.

Figure 11:
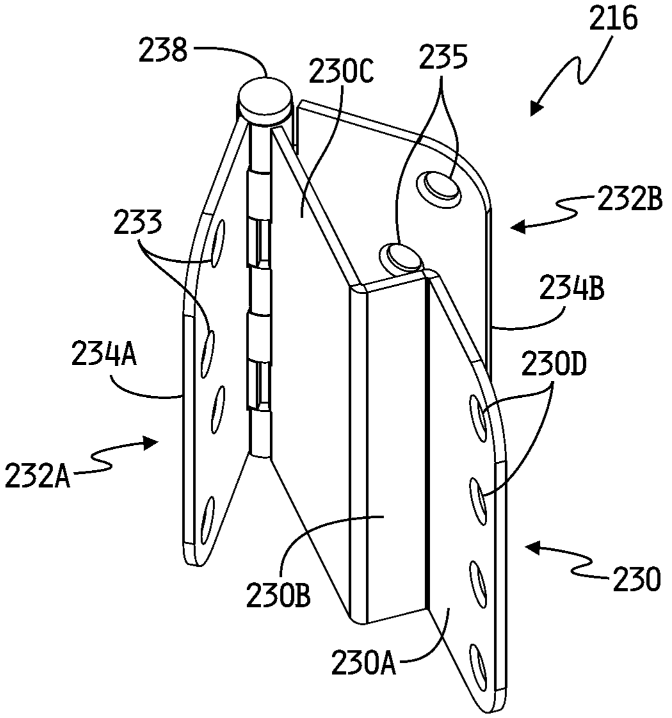
FIG. 11 is a perspective view of an embodiment of the hinge assembly illustrated in FIG. 10.

Referring now specifically to FIG. 11, an embodiment of one of the one or more hinge assemblies 216 is shown. In the illustrated embodiment, the hinge assembly 216 is identical in many respects to the hinge assembly 16 illustrated in FIGS. 2A-2B, such that the hinge assembly 216 includes three separate butt hinges 230, 232A and 232B inter-engaged by a hinge pin 238 extending through axially aligned knuckles associated with each hinge 230, 232A, 232B. As with the hinge, 30, the hinge 230 has three integral, planar hinge plate sections or portions 30A, 30B, 30C and a number of axially aligned knuckles at a terminal end of the hinge plate section 230C. Planes defined by the planar hinge plate sections 230A and 230C are illustratively parallel with each other, and a plane defined by the planar hinge section 230B joining the hinge plate sections 230A, 230C is illustratively perpendicular with the planes defined by the planar hinge plate sections 230A, 230C. The dimensions of the hinge plate sections 230A, 230B, 230C are illustratively configured complementarily to corresponding portions of the surfaces 217A2, 217A1 and 214A2 respectively of the hinge-side jamb 214A and stop 217A.

The hinge 232A defines a planar hinge plate 234A and a number of axially-aligned knuckles along one side thereof, and the hinge 232B likewise defines a planar hinge plate 234B and a number of axially-aligned knuckles along one side thereof. The axially-aligned knuckles of each hinge 230, 232A, 232B interdigitate as illustrated and the hinge pin 238 extends through each to couple the hinges 230, 232A, 232B together such that they all pivot or rotate about the longitudinal axis defined centrally through the hinge pin 238. The hinges 230, 232A, 232B each define a number of passageways 230D, 233, 235 respectively therethrough via which the hinges 230, 232A, 232B are mounted or attached, e.g., via conventional fixation members such as screws or the like, to the hinge sides of the door, 222, the hinge side of the door 212 and the hinge side 214A2 of the jamb 214A respectively. The hinge plate section 230C, unlike the hinge plate section 30C of the hinge 30, is solid.

As illustrated by example in FIG. 10, and unlike the door assembly 10 illustrated in FIGS. 1A-9C, the door 222 is illustratively sized such that the hinge side 222B is spaced apart from the inwardly-facing surface 217A2 of the door stop 217A. This additional spacing is illustratively provided to accommodate the combined thicknesses of the three hinges 230, 232A, 232B when forced together when both of the doors 212, 222 are closed as shown. In alternate embodiments, the one or more hinge assemblies 16 illustrated in FIGS. 2A and 2B may be used in place of the one or more hinge assemblies 216, and in such embodiments the door 222 may be sized as described above with respect to the door 22. In any case, the doors 212, 222 of the door assembly 210 are illustratively configured to open and close together and separately as described above with respect to the door assembly 10 illustrated in FIGS. 1A-4B.

Figure 12:
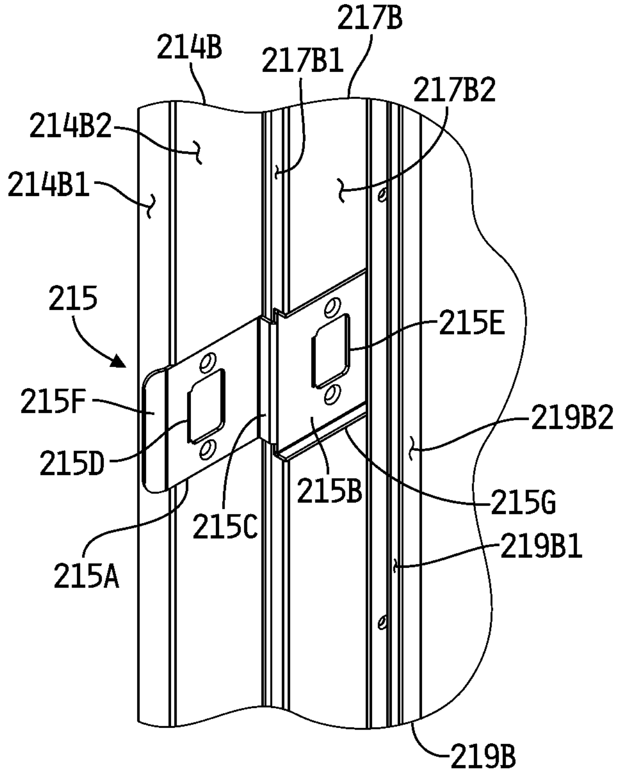
FIG. 12 is a perspective view of a portion of the door frame of FIG. 10 to which an embodiment of a latch plate is mounted.

Referring now to FIG. 12, an embodiment of the at least one door latch engaging component 215 is illustrated. In the embodiment depicted in FIG. 12, the at least one door latch engaging component 215 is illustratively provided in the form of a single, unitary strike plate mountable to the inwardly-facing surface 214B of the latch-side jamb 214B and also to the inwardly-facing surface 217B2 of the door stop 217B. The strike plate 215 illustratively includes a first generally planar plate section 215A defining a latch tongue opening 215D therethrough that is sized to receive the latch tongue 246 of the door handle assembly 220 (see, e.g., FIG. 15). The plate section 215A is illustratively sized and configured to be received on and secured to the inwardly-facing surface 214B2 of the latch-side jamb 214B, e.g., via one or more conventional fixation members passed through one or more corresponding bores defined through the plate section 215A, e.g., two such bores shown in FIG. 12 defined through the plate section 215A above and below the latch tongue opening 215D. Illustratively, the inwardly-facing surface 214B2 of the latch-side jamb 214B is mortised in a conventional manner to provide a guide for mounting and positioning the plate section 215A to and relative to the latch-side jamb 214B, to allow the exposed major surface of the plate section 215A to be mounted flush with the inwardly-facing surface 214B2 of the latch-side jamb 214B and to provide a passageway of sufficient depth to allow for appropriate penetration of the latch tongue 246 through the latch tongue opening 215D. In some embodiments, the latch plate section 215A includes a flange 215F along the end of the plate 215A that is adjacent to the end surface 214B1 of the latch-side jamb 214B to act as a guide for guiding the latch tongue 246 toward the latch tongue opening 215D. In embodiments which include the flange 215F, the flange 215F may illustratively be angled toward the end surface 214B1 of the latch-side door jamb 214B, e.g., at an acute angle relative to the substantially right-angled surfaces 214B1 and 214B2 of the latch-side jamb 214B.

Figure 15:
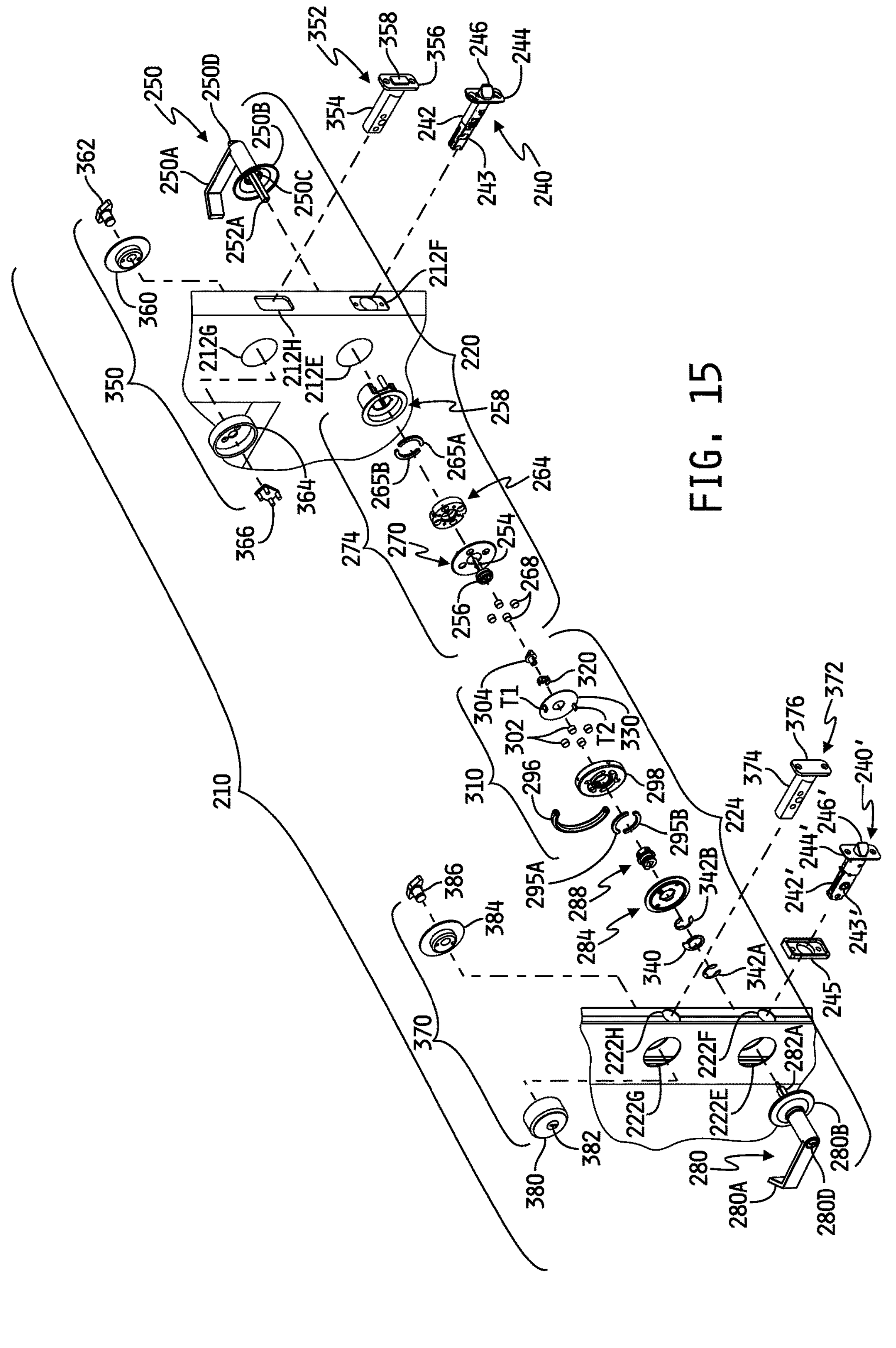
FIG. 15 is an exploded view of an embodiment of a door handle arrangement mounted to the door assembly illustrated in FIGS. 10-14D.

The strike plate 215 further illustratively includes a second generally planar plate section 215B defining a latch tongue opening 215E therethrough that is sized to receive the latch tongue 246' of the door handle assembly 224 (see, e.g., FIG. 15). The plate section 215B is illustratively sized and configured to be received on and secured to the inwardly-facing surface 217B2 of the latch-side door stop 217B, e.g., via one or more conventional fixation members passed through one or more corresponding bores defined through the plate section 215B, e.g., two such bores shown in FIG. 12 defined through the plate section 215B above and below the latch tongue opening 215E. Illustratively, the inwardly-facing surface 217B2 of the latch-side door stop 217B is mortised in a conventional manner to provide a guide for mounting and positioning the plate section 215B to and relative to the latch-side door stop 217B, to allow the exposed major surface of the plate section 215B to be mounted flush with the inwardly-facing surface 217B2 of the latch-side door stop 217B and to provide a passageway of sufficient depth to allow for appropriate penetration of the latch tongue 246' through the latch tongue opening 215E. In some embodiments, the latch plate section 215B includes a downwardly extending flange 215G along the lower end of the plate 215B to act as a support for supporting the plate section 215B on the latch-side door stop 217B. In embodiments which include the flange 215G, the flange 215G may illustratively be angled toward the surface 217B2 of the latch-side door stop 217B, e.g., at an oblique angle relative to the exposed major surface of the plate section 215B. In other embodiments, the flange 215G may be omitted.

In the illustrated embodiment, the plate sections 215A, 215B are joined by a generally planar plate section 215C extending between the adjacent ends of the plate sections 215A, 215B and at a substantially right angle relative to each such that, when the plate section 215A is mounted to the latch-side jamb 214B and the plate section 215B is mounted to the latch-side door stop 217B, the plate section 215C abuts the end section 217B1 of the latch-side door stop 217B. In some embodiments, the portion of the surface 217B1 of the latch-side door stop 217 which the plate section 215C abuts may be mortised to accommodate flush mounting thereof, although in other embodiments the portion of the surface 217B1 of the latch-side door stop 217 which the plate section 215C abuts may not be mortised. In the illustrated embodiment, the plate sections 215A, 215B and 215C are integral such that the entire strike plate 215 is of unitary construction. In other embodiments, only one of the plate sections 215A, 215B may be integral and unitarily constructed with the plate section 215C and the remaining plate section may be mounted, affixed or otherwise attached thereto, and in still other embodiments each of the plate sections 215A, 215B, 215C may be separate components which are mounted, affixed or otherwise attached together as illustrated in FIG. 12. In any case, it will be appreciated that such a single latch plate 215 sized to accommodate both latch tongues 246, 246' and mounted to both of the latch-side jamb 214B and the latch-side door stop 217B advantageously provides a number of advantages over separate latch plates as illustrated in FIG. 4A. For example, such a single latch plate 215 provides for increased strength over such separate latch plates, and thus provides an attendant increase in security of the door assembly 210, e.g., against intruders. As another example, horizontal and vertical alignment of the latch tongue openings 215D, 215E are preset with the single latch plate 215, thereby eliminating or at least reducing manual alignment of the latch tongue openings 215D, 215E with the corresponding latch tongues 246, 246'. Notwithstanding such advantages, it will be understood that, in some alternate embodiments, separate latch plates, e.g., such as the latch plates 15A, 15B illustrated in FIG. 4A, may be used in place of the single latch plate 215 just described.

Referring now to FIGS. 13 and 14A—14D, FIG. 13 depicts a perspective view of the door jamb assembly in its entirety including the door jamb components 214A, 214B and 214C, the door stop components 217A, 217B and 217C, the door stop components 219A, 219B and 219C as described above, as well as three of the hinge assemblies 216 spaced apart and mounted to the latch-side jamb 14A. Whereas the doors 212 and 222 have been omitted from FIG. 13 so as not to obscure the illustrated door jamb assembly, the door 222 is included in the cross-sectional views of FIGS. 14A and 14B, as if it was included in FIG. 13, to illustrate another feature of the door assembly 210. As described above, the door 222 in the embodiment depicted in FIGS. 14A-14D is illustrated as including hollow-core top, bottom, hinge-side and latch-side stiles 223A—223D respectively, all coupled together in a conventional manner with a panel 221 surrounded by and coupled to each of the stiles 223A—223D about its periphery.

Figure 14A:
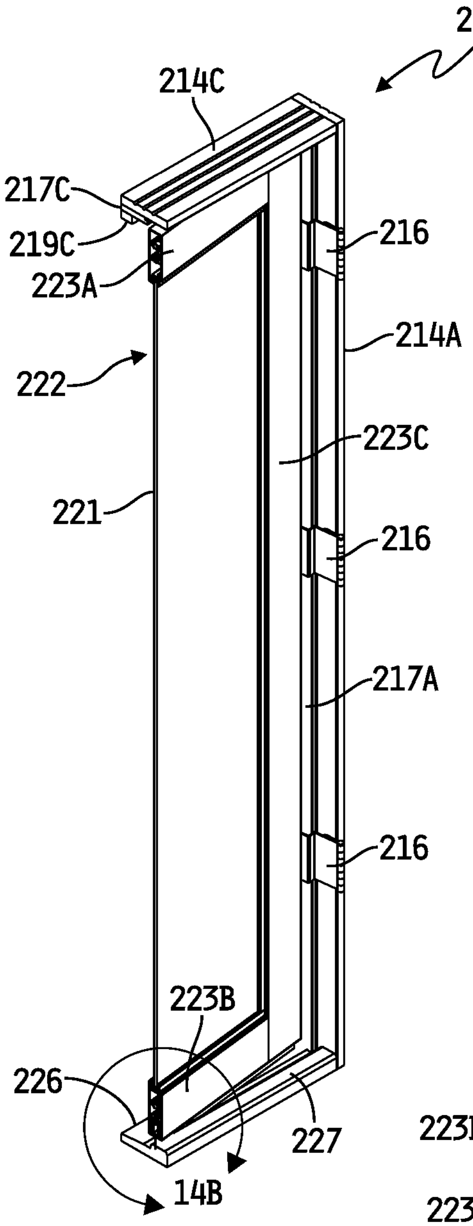
FIG. 14A is a cross-sectional view of the door frame of FIG. 13 as viewed along section lines 14B-14B, shown with a corresponding one of the doors illustrated in FIG. 10 mounted thereto in a partially open position relative to the door frame.
Figure 14B:
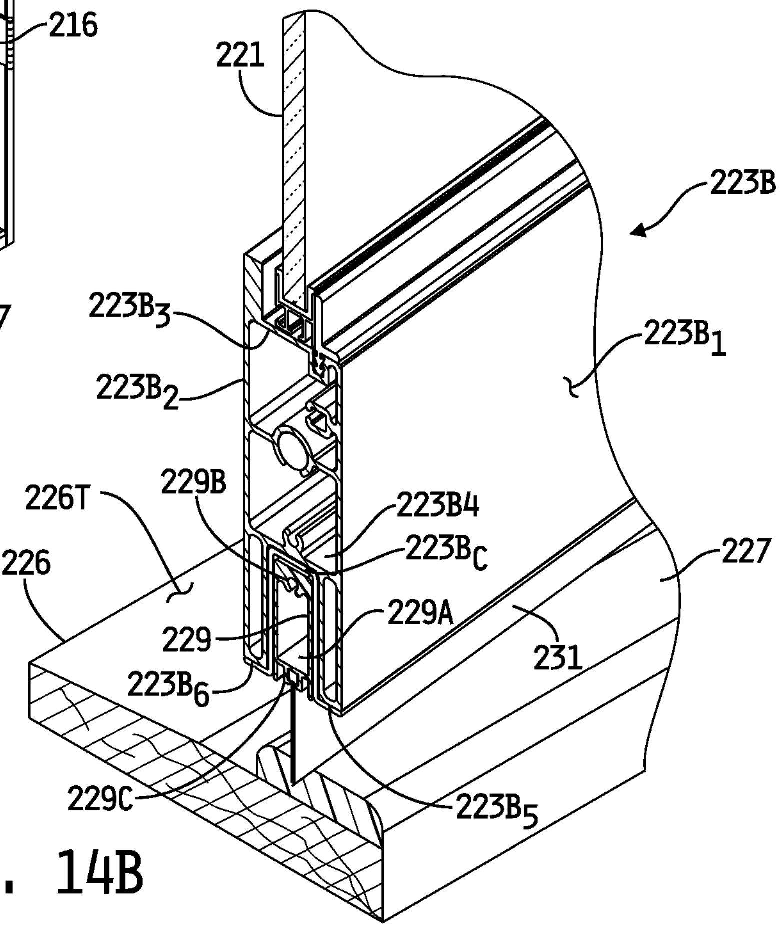
FIG. 14B is a magnified view of the portion 14B of the door frame and door shown in FIG. 14A illustrating an embodiment of an adjustable sweep carried by the door.

Referring now specifically, to FIG. 14B, a magnified view of the bottom stile 223B of the door 222 is shown. In the illustrated embodiment, the bottom stile 223B includes a pair of opposed and spaced-apart sides or skins 223$B_1$ and 223$B_2$ joined together at a top of the stile 223B by a top wall or skin 223$B_3$. A free bottom end 223$B_5$ of the side 223$B_1$ and a free bottom end 223$B_6$ of the side 223$B_2$ are spaced apart laterally, and in some embodiments a laterally extending wall 223$B_4$ joins the opposed inner surfaces of the two sides 223$B_1$, 223$B_2$ between the top wall or skin 223$B_5$ and the free ends 223$B_5$, 223$B_6$ of the sides 223$B_1$, 223$B_2$ respectively to form an elongated channel 223$B_C$ between the lateral wall 223$B_4$ and the free ends 223$B_5$, 223$B_6$ of the sides 223$B_1$, 223$B_2$ which extends longitudinally along the length of the stile 223B. It other embodiments, the stile 223B may not include the lateral wall 223$B_4$, and in such embodiments the channel 223$B_C$ may be defined between the top wall 223$B_3$ and the free ends 223$B_5$, 223$B_6$ of the sides 223$B_1$, 223$B_2$. In any case, an elongated sweep 229 is received within the channel 223$B_C$ such that the sweep 229 is vertically movable within and relative to the channel 223$B_C$ along the length of the stile 223B. In the illustrated embodiment, the sweep 299 is illustratively a hollow structure bound by opposing side and top walls which are configured complementarily to the shape of the channel 223$B_C$, and illustratively bound by a substantially planar bottom wall 229A. The cross-sectional shape of the channel 223$B_C$ is, in the illustrated example, an inverted U-shape with defined corners at the top of the U, and the opposing side and top walls of the elongated sweep are complementarily shaped to be received and vertically movable within and relative to the channel 223$B_C$, although in other embodiments the channel 223$B_C$ and the elongated sweep 229 may take on other complementary cross-sectional shapes. In any case, the top wall of the sweep 229 illustratively defines a bore or channel 229B sized to receive and engage a conventional fixation member, e.g., a screw or the like. In some embodiments, the bore or channel 229B runs along the length of the top wall of the sweep 229, although in other embodiments separate bores or channels 229B may be provided only at or adjacent to each end of the stile 223B which defines a portion of a respective side 222A, 222B of the door 222. In the illustrated embodiment, the exposed outer (bottom) surface of the bottom wall 229A defines another bore or channel 229C which runs along the length of the bottom stile 223B. A top surface of an elongated, flexible seal member 231 is configured to be received within and along the channel 229C, and a bottom surface of the flexible seal member 231 is illustratively configured to contact and form at least a partial seal with the top surface 226T of the sill plate 226 when the door 222 is closed. In one embodiment, the flexible sealing member 231 is provided in the form of a conventional fiber brush, although in alternate embodiments the flexible sealing member 231 may be additionally or alternatively formed of one or more other conventional flexible sealing materials.

The sill 226 is illustratively shown in FIG. 14B in the form of a conventional solid wood sill plate 226, which is or will be mounted to the floor of the building structure in which the door assembly 210 is installed, with a conventional elongated plastic dam 227 mounted, affixed or otherwise attached to the top surface 226T of the sill plate 226 along its length such that, when closed, the bottom edge of the door 212 is positioned above the dam 227 along its length. In some embodiments, a conventional sealing material, e.g., foam, plastic, rubber, etc., may be attached or affixed to and along the bottom surface of the door 212 to form a seal between the bottom surface of the door 212 and the top surface of the dam 227.

In some alternate embodiments, the sill plate 226 may be formed of a solid core, e.g., wood or composite material, capped by a metal skin, and in other alternate embodiments the sill plate 226 may be formed of a hollow or filled-core composite material which may or may not be capped by a metal skin. The dam 227 may likewise alternatively be formed of a solid core capped by a metal skin or of a hollow or filled-core composite material which may or may not be capped by a metal skin. In some embodiments, as illustrated in FIG. 14B, the sill plate 226 and the dam 227 are separate components which are subsequently attached, affixed or otherwise joined together in a conventional manner, and in other embodiments the sill plate 226 and the dam 227 may be integral and of unitary construction.

As described above, the flexible seal member 231 is illustratively provided to contact the top surface 226T of the sill 226 and, together with the sweep 229, to form at least a partial seal with and between the bottom surface of the stile 223B and the top surface 226T of the sill 226 when the door 222 is closed. However, as also described above and as illustrated in FIG. 14B, the door 222 is configured to open inwardly, and as such it is desirable that the bottom edge or surface of the stile 223B be positioned relative to the sill 226 such that it clears the dam 227 when the door 222 is opened and also such that the flexible seal member 231 contacts, and illustratively forms at least a partial seal with, the top surface 226T of the sill plate 226 when the door 222 is closed. Moreover, it is contemplated that the door 222 may be implemented with various different sills 226 in which the height of the top surface of the dam 227 above the top surface 226T of the sill plate 226 may vary. In this regard, the vertical position of the elongated sweep 229 within the channel 223$B_C$ defined in the bottom stile 223B is configured to be adjustable to a position in which the bottom surface of the sweep 229 and/or the bottom ends 223$B_5$, 223$B_6$ of the bottom stile 223B clears the top surface 227 of the dam when and as the door 222 is opened and in which at least the bottom edge of the flexible seal member 231 contacts the top surface 226T of the sill plate 226 when the door 222 is in its closed position so that the flexible seal member 231 forms at least a partial seal with and between the top surface 226T of the sill 226 and the bottom surface of the sweep 229 and/or the bottom surface of the stile 223B.

Figure 14C:
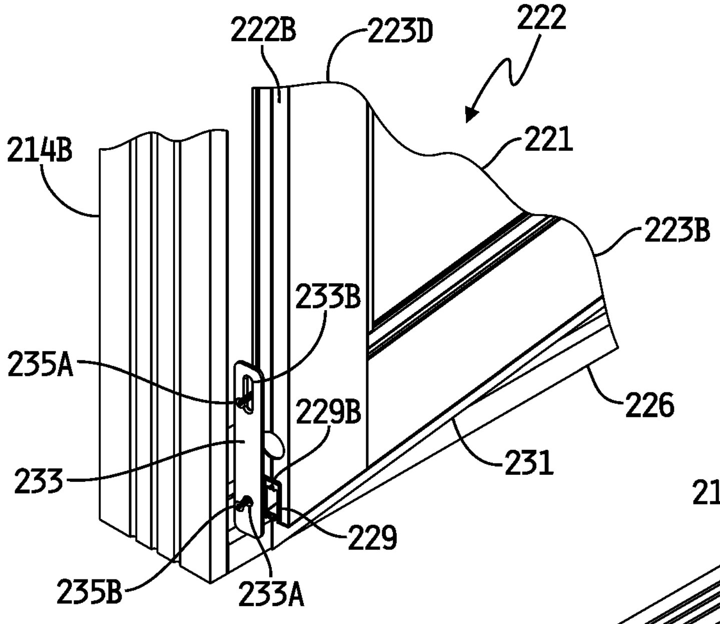
FIG. 14C is a magnified perspective view of a portion of the door frame and door illustrated in FIGS. 14A and 14B, illustrating an exploded view of additional components of the adjustable sweep.
Figure 14D:
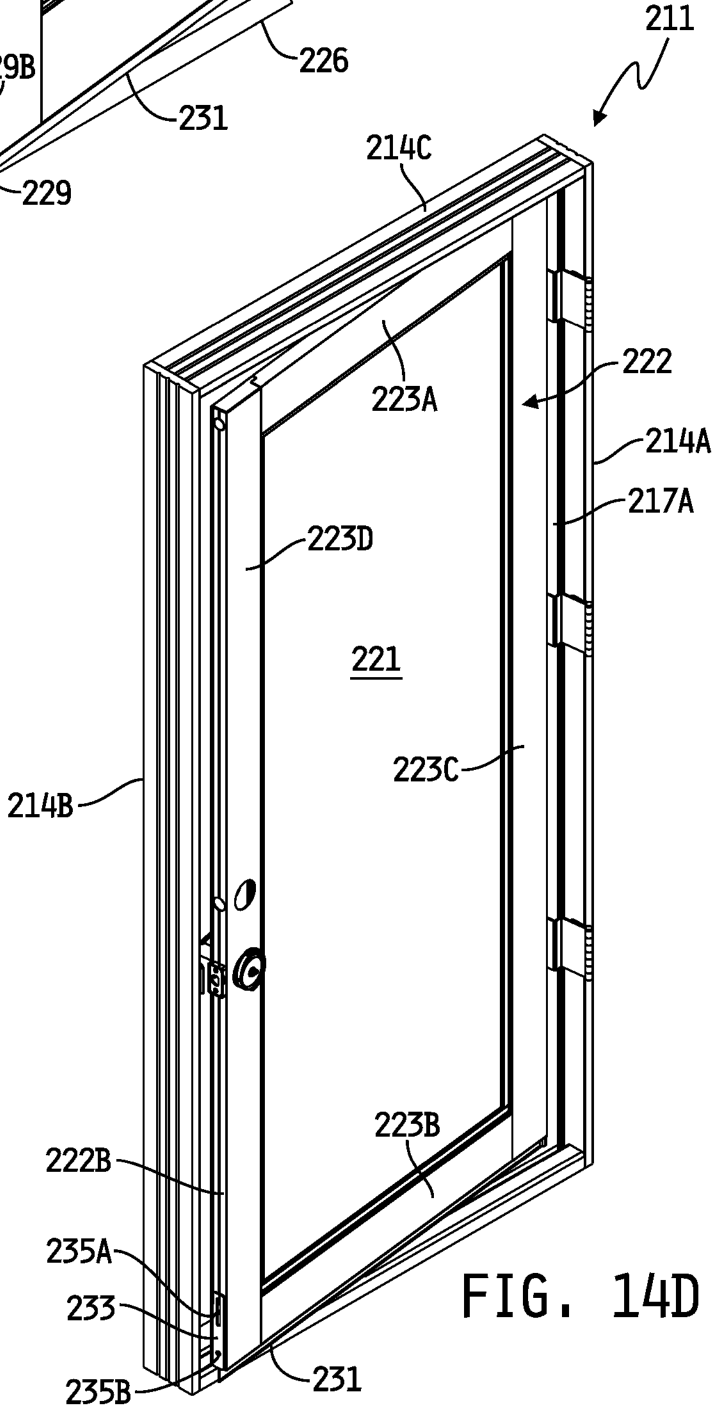
FIG. 14D is a perspective view of the door frame and door shown in FIGS. 14A-14C illustrating an assembled view of the components shown in exploded view in FIG. 14C.

Referring now to FIGS. 14C and 14D, an elongated sweep position adjustment plate 233 is provided with a through hole 233A at or near one end thereof and an elongated through slot 233B at or near an opposite end thereof, wherein a longitudinal axis of the slot 233B is illustratively parallel with a longitudinal axis of the elongated plate 233. Illustratively the plate 233 is a flat and substantially planar plate sized to be received over and in contact with the side 222B of the door inboard of, or flush with, the major surfaces of the stile 223D. In the illustrated embodiment, it will be understood that the elongated channel 223$B_C$, the elongated sweep 229 and the elongated flexible seal member 231 each run through and along the length of the bottom stile 223B but also in the same direction through the stiles 223C and 223D along the bottom edges thereof. In any case, as illustrated in FIG. 14C, a conventional fixation member 235A, e.g., a screw or the like, is passed through the through hole 233A of the sweep position adjustment plate 233 and into engagement with the channel 229C of the sweep 229 to secure the sweep adjustment plate 233 to the sweep 229. Another conventional fixation element 235B, e.g., a screw or the like, is passed through the slot 233B and into the side 222B of the door 222 but not fully tightened against the plate 233. Another such sweep position adjustment plate 233 is then attached to opposite end of the sweep 229 and to the opposite side 222A of the door 222 as just described. The vertical position of the elongated sweep 229 within the elongated channel 223$B_C$ is then manually adjusted by moving the plates 233 along the channels 233B relative to the fixation members 235A to a position in which the bottom edge of the sweep 229 clears the dam 227 when and as the door 222 is opened and in which at least the bottom edge of the flexible seal member 231 contacts the top surface 226T of the sill plate 226 when the door 222 is closed, and the fixation members 235A are then tightened against the plates 233 to secure the plates 233 to the sides 222A, 222B of the door 222 with the elongated sweep 229 in its adjusted position.

Figure 19:
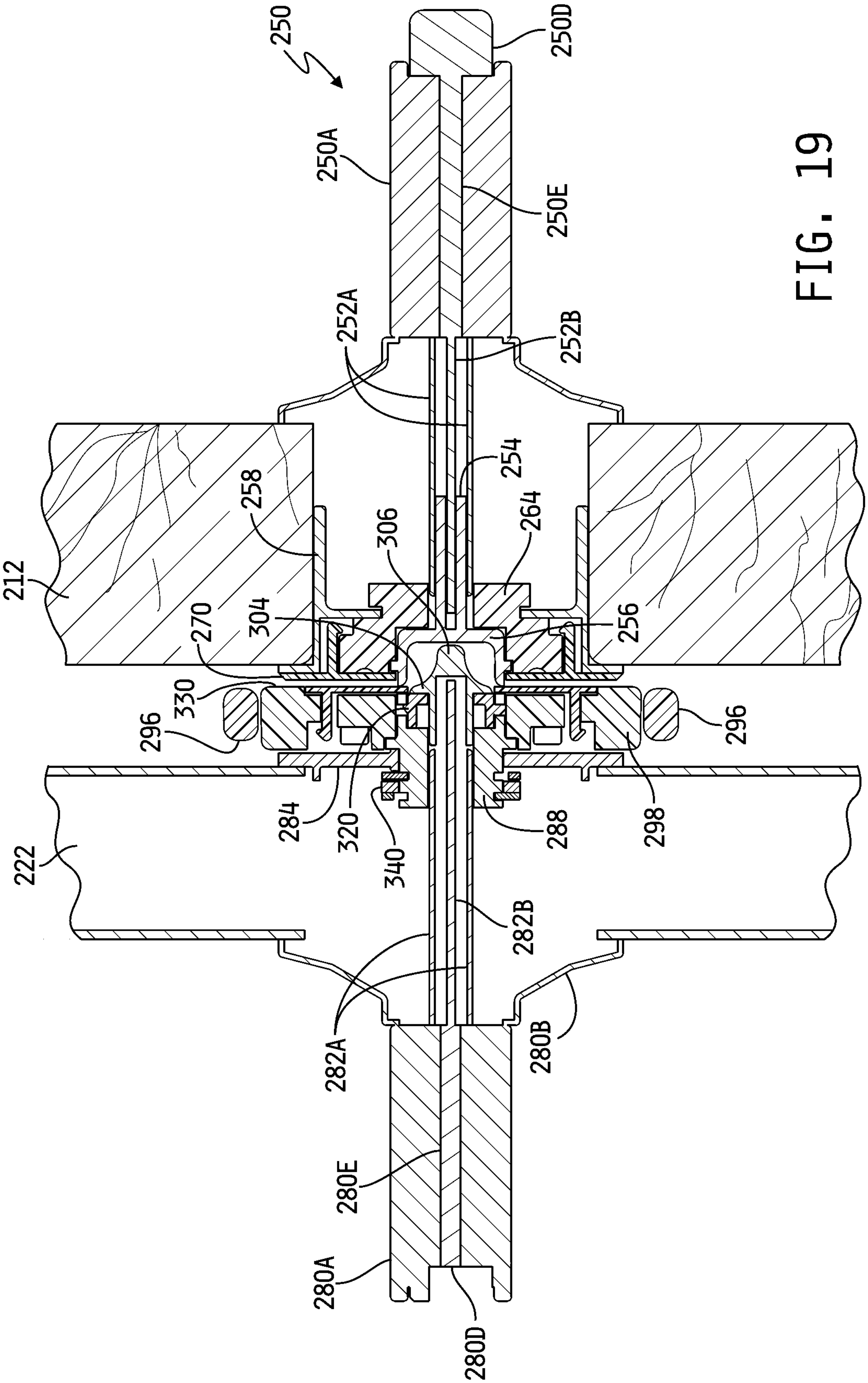
FIG. 19 is a cross-sectional view of the two door handle assemblies of FIGS. 18A and 18B interlocked as viewed along section lines 19-19 of FIG. 10.

Referring now to FIG. 15, an exploded view of the door assembly 210 is shown illustrating embodiments of each of the door handle assemblies 220, 224 as well as embodiments of latch assemblies 240, 240' and embodiments of interlockable deadbolt assemblies 350, 370 mounted to each of the doors 212, 222 respectively. In the illustrated assembly, the door 212 defines a cylindrical opening or face bore 212E therethrough, i.e., defined through the first and second major surfaces 212C, 212D of the door 212, adjacent to the latch side 212B, and another cylindrical opening or side bore 212F therein which opens to the face bore 212E. A conventional latch assembly 240 includes an elongated latch case 242 coupled to a latch plate 244 from which a latch tongue 246 extends. The elongated latch case 242 is illustratively sized to be received within the side bore 212F with at least a portion of the latch case 242 extending into the face bore 212E and the latch plate 244 abutting the latch side 212B of the door 212. In some embodiments, the latch side 212B of the door may be mortised to receive the latch plate 244 therein. The latch case 242 illustratively defines a bore 243 therethrough sized to receive therethrough a cam 252A of the door handle assembly 220. The latch case 242 and/or a leverset 250 of the door handle assembly 220 illustratively carries one or more conventional biasing components such that the latch tongue 246 is normally biased outwardly from the latch plate 244, e.g., as illustrated in FIG. 15, so that it engages and is captured by the latch tongue opening 215D of the strike plate 215 (see, e.g., FIG. 12), and such that axial rotation of the cam 252A causes the latch tongue 246 to be drawn inwardly toward and within the latch case 242 so that it disengages from the latch tongue opening 215D of the strike plate 215 to allow the door 212 to be pivoted via the hinge assembly 216 between open and closed positions thereof. In embodiments in which the door handle assembly 220 is lockable, as illustrated in FIGS. 16B and 19, the bore 243 also receives therethrough a spindle 252B carried by the cam 252A. Rotation of the spindle 252B about its longitudinal axis actuates conventional components within the leverset 250 between locked and unlocked positions in a conventional manner. For example, when the spindle 252B is rotated to an unlocked position, conventional components within the leverset 250 allow rotation of the cam 252A within the bore 43 to cause the latch tongue 246 to be drawn inwardly within the latch case 242 as described above. When the spindle 252B is rotated to a locked position, conventional components within the leverset 250 prevent rotation of the cam 252A, thereby preventing the cam 252A from drawing the latch tongue 246 inwardly within the latch case 242 such that the latch tongue 246 remains engaged with the strike plate 215. It will be understood that this disclosure contemplates alternate embodiments in which the handle assembly 220 is not lockable, and in such embodiments the spindle 252B may be omitted. In embodiments in which the handle assembly 220 is lockable as just described, the combination of the door handle assembly 220 and the latch assembly 240 may generally be termed a "lockset."

Figure 17A:
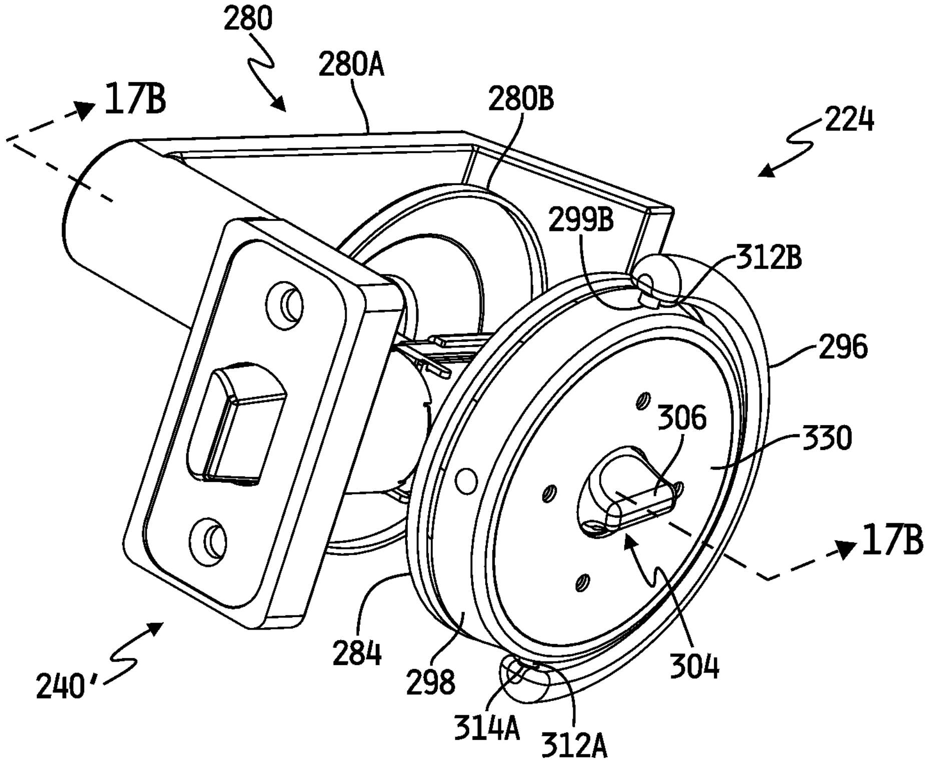
FIG. 17A is a perspective view of an embodiment of the other of the door handle assemblies of the door handle arrangement illustrated in FIGS. 10 and 15.
Figure 17B:
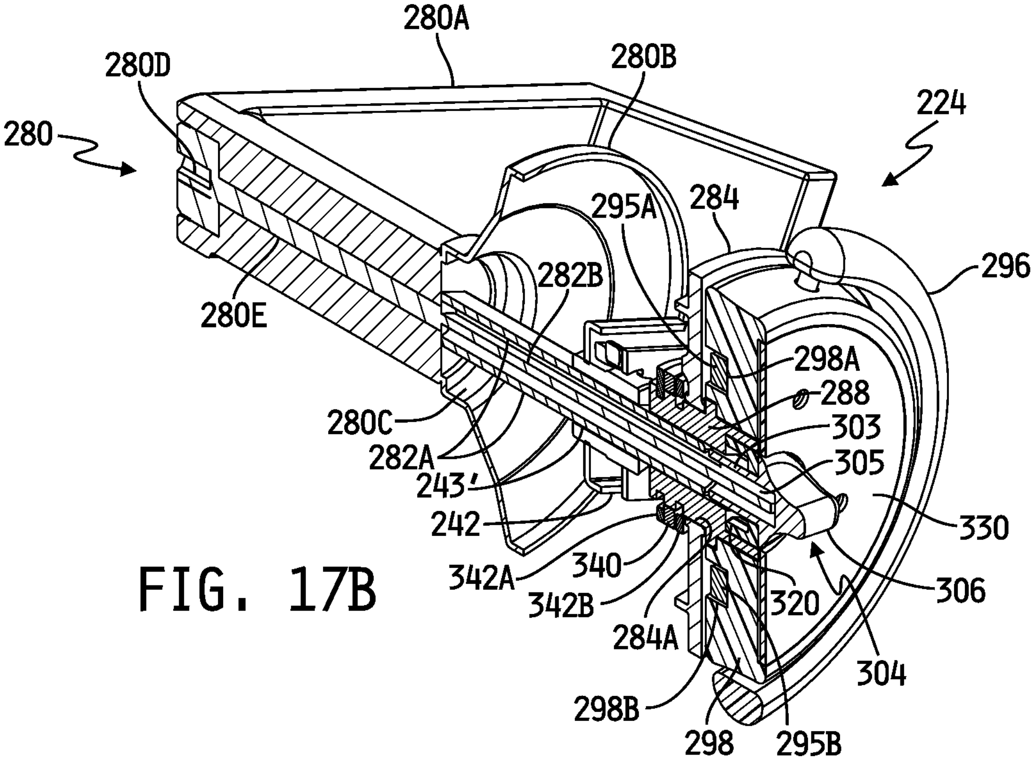
FIG. 17B is a cross-sectional view of the door handle assembly illustrated in FIG. 17A as viewed along section lines 17B-17B.
Figure 17C:
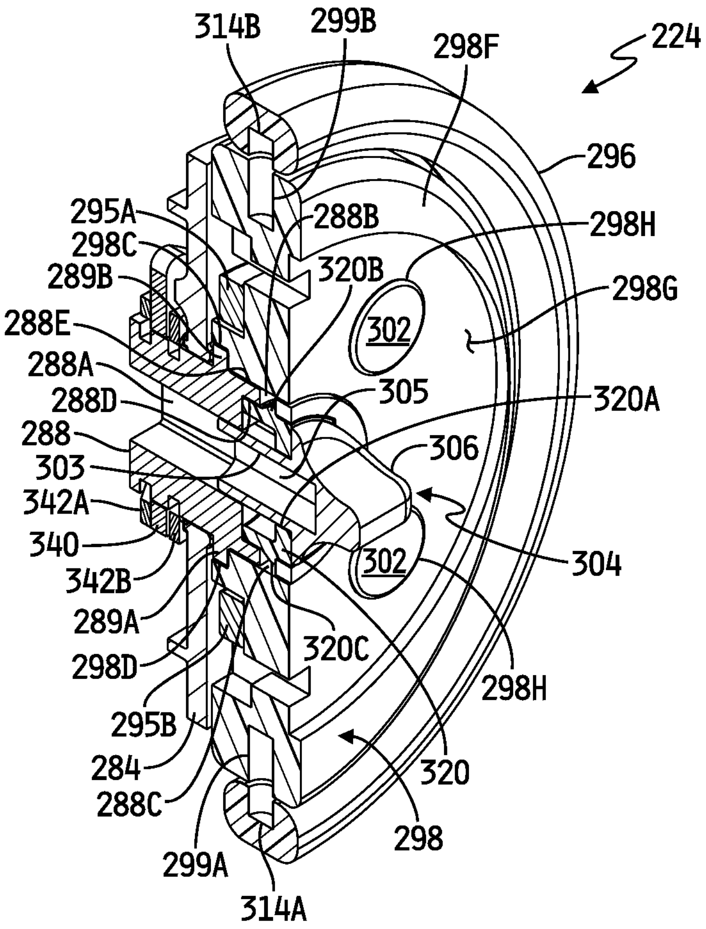
FIG. 17C is a cross-sectional view similar to that of FIG. 17B and illustrating of a portion of the magnet assembly of the door handle assembly illustrated in FIGS. 17A and 17B.

The door 22 illustratively likewise defines a cylindrical opening or face bore 222E therethrough, i.e., defined through the first and second major surfaces 222C, 222D of the door 222, adjacent to the latch side 222B, and another cylindrical opening or side bore 222F therein which opens to the face bore 222E. A conventional latch assembly 240' includes the same components as described above with respect to the latch assembly 240, and the latch case 242' of the latch assembly 240' is received within the side bore 222F and face bore 222E. In the illustrated embodiment, the latch assembly 240' further illustratively includes a latch plate extension 245 which receives the latch assembly 240' therethrough and the latch plate 244' therein and mounts to the latch side 222B of door 222 to move the position of the latch tongue 246' toward the strike plate 215. Illustratively, the thickness of the latch plate extension is configured consistently with the width of the door 222 as described above to accommodate and compensate for the thickness of the at least one hinge assembly 216. In any case, the latch assembly 240' is operable generally as described above with respect to the latch assembly 240 such that the latch tongue 246' of the latch assembly 40' is normally biased outwardly from the latch plate 244' (and the latch plate extension 245), e.g., as illustrated in FIG. 15, via one or more conventional biasing components carried by the latch case 242' and/or a leverset 280 of the door handle assembly 224 so that it engages and is captured by the latch tongue opening 215E of the strike plate 215 (see, e.g., FIG. 12), and such that axial rotation of a cam 282A received through the bore 243' causes the latch tongue 246' to be drawn inwardly toward and within the latch case 242' so that it disengages from the latch tongue opening 215E of the strike plate 215 to allow the door 222 to be pivoted relative to the hinge assembly 216 between open and closed positions thereof. In embodiments in which the door handle assembly 224 is lockable, as illustrated in FIGS. 17B and 19, the bore 243' also receives therethrough a spindle 282B carried by the cam 282A. Rotation of the spindle 282B about its longitudinal axis actuates conventional components within the leverset 280 between locked and unlocked positions in a conventional manner as described above. It will be understood that this disclosure contemplates alternate embodiments in which the handle assembly 224 is not lockable, and in such embodiments the spindle 282B may be omitted. In embodiments in which the handle assembly 224 is lockable as just described, the combination of the door handle assembly 224 and the latch assembly 240' may generally be termed a "lockset."

Figure 16A:
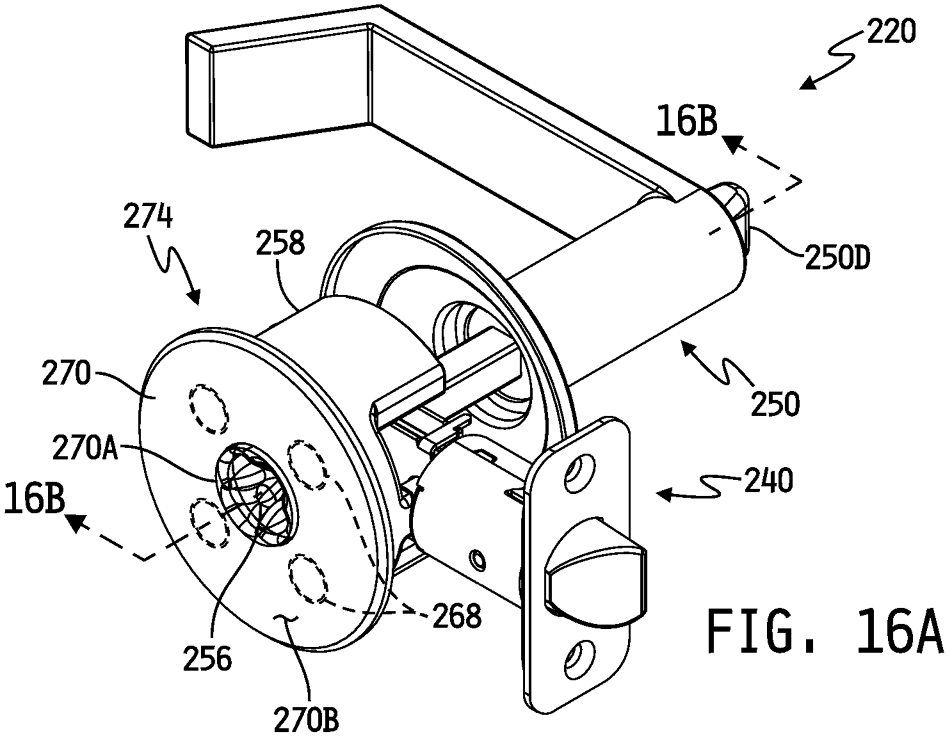
FIG. 16A is a perspective view of an embodiment of one of the door handle assemblies of the door handle arrangement illustrated in FIGS. 10 and 15.
Figure 16B:
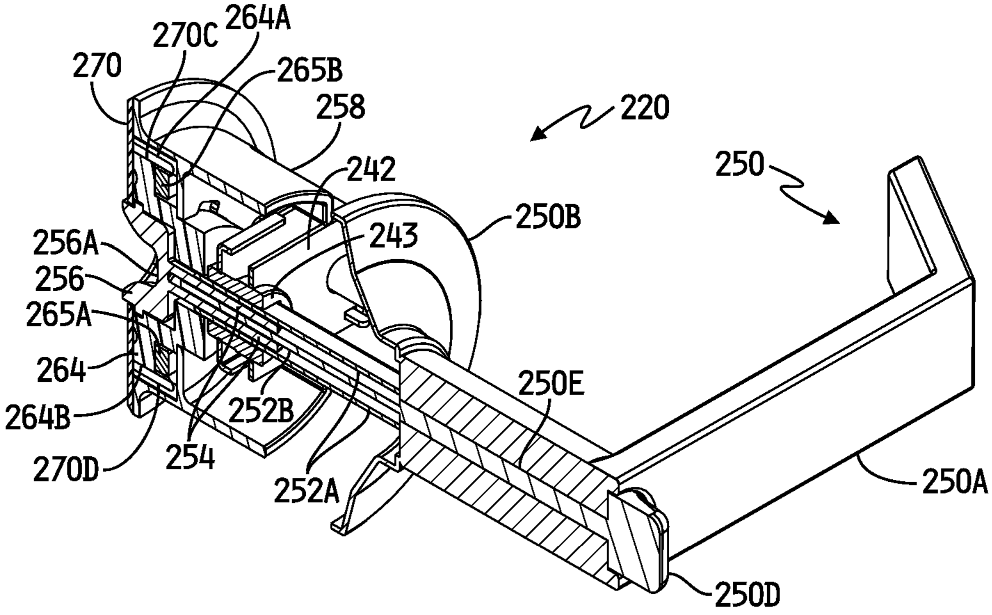
FIG. 16B is a cross-sectional view of the door handle assembly illustrated in FIG. 16A as viewed along section lines 16B-16B.

Referring generally now to the right sides of FIGS. 15 and 19 and to FIGS. 16A-16B, the door handle assembly 220 includes a leverset 250 having handle 250A rotatably coupled to a rosette 250B. Generally, the handle 250A may be or include any structure or combination of structures rotatably coupled to the rosette 250B. In the illustrated embodiment, for example, the handle 250A is provided in the form of a conventional lever rotatable relative to the rosette 250B. In alternate embodiments, the handle 250A may be provided in the form of a knob or other structure rotatable relative to the rosette 250B, and in such embodiments the leverset 250 may be alternately referred to as a "handleset." The leverset 250 further includes a cam 252A rotatably coupled to the handle 250A such that the cam 252A rotates with the handle 250A about a rotational axis and such that the cam 252A and the handle 250A rotate together relative to the rosette 250B. In embodiments in which the door handle assembly 220 is lockable, the handle 250A illustratively defines a central bore 250C sized to receive therein a rotatable shaft 250E having one end coupled to a locking button 250D carried by the handle 250A and an opposite end coupled to one end of the spindle 252B, and in such embodiments an axis extending centrally through the bore 250C defines the rotational axis of the handle 250A, cam 252A and spindle 252B. In such embodiments, rotation of the locking button 250D rotates the shaft 250E and spindle 252B relative to and independently of the handle 250A, cam 252B and rosette 250B, and rotation of the spindle 252B likewise rotates the shaft 250E and the locking button 250D relative to and independently of the handle 250A, cam 252B and rosette 250B.

The leverset 250 is mounted to the door 212 with the rosette 250B abutting the major surface 212D of the door 212 about the face bore 212E and with the cam 252A extending into the face bore 212E and through the bore 243 defined through the latch case 242 of the latch assembly 240. In embodiments which include it, the spindle 252B likewise extends with the cam 252A into the face bore 212E and further extends through the bore 243 defined through the latch case 242 of the latch assembly 240, as described above. A lock receiver 256 is illustratively affixed to or integral with one end of a lock receiver spindle 254, and the opposite end of the lock receiver spindle 254 is coupled to the spindle 252B carried by the cam 252A such that the lock receiver 256 rotates with the spindle 252B. In the illustrated embodiment, the cam 252A is illustratively provided in the form of an elongated hollow tube illustratively having a square, rectangular or other cross-sectional shape configured to cause one or more components receiving the cam 252A therein or received within the cam 252A to rotate with the cam 252A and vice versa. The spindle 252B is illustratively provided in the form of an elongated structure having a flat and square or rectangular or other cross-sectional shape configured to cause one or more components receiving the spindle 252B therein to rotate with the spindle 252B and vice versa. In the illustrated embodiment, the lock receiver spindle 254 illustratively defines a channel therein configured complementarily to the shape of the spindle 252B such that the spindle 252B is rotatably coupled to the lock receiver spindle, and thus to the lock receiver 256, when the spindle 252B is received within the channel defined in the lock receiver spindle 254. In such embodiments in which the door handle assembly 220 is lockable, the locking button 250D, rotatable shaft 250E, spindle 252B, lock receiver spindle 254 and lock receiver 256 are together rotatable relative to the door handle 250A between an unlocked position in which the spindle 252B and/or the rotatable shaft 250E and/or the locking button 250D cooperates with components within the leverset 250 to allow rotation of the cam 252A via the door handle 250A to operate the latch tongue 246 as described above, and a locked position in which the spindle 252B and/or the rotatable shaft 250E and/or the locking button 250D cooperates with components within the leverset 250 to prevent rotation of the cam 252A such that the handle 250A is prevented from rotating to operate the latch tongue 246. As also described above, the door handle assembly 220 may not include a locking feature in some embodiments, and in such embodiments the locking button 250D, the rotatable shaft 250E, the spindle 252B, the lock receiver spindle 254 and the lock receiver 56 may be omitted.

The remainder of the handle assembly 220 is similar in many respects to the handle assembly 20 illustrated in FIGS. 1A-9C and described above. For example, a cylindrical chassis 258 is similar to the chassis 58 described above and defines an outer periphery sized to be received within the face bore 212E defined through the door 212. The chassis 258 further illustratively defines a lip at one end thereof which abuts the first major surface 212C of the door 212 when the chassis 258 is received within the face bore 212E. The chassis 258 is illustratively affixed to the rosette 250B of the leverset 250 through the face bore 212E, e.g., via one or more conventional fixation members (not shown in FIG. 15). The chassis 258 and the rosette 250B are thus each fixed in position relative to the door 212 such that neither the rosette 250B nor the chassis 258 rotates with the handle 250A, shaft 250E, cam 252A, lock receiver spindle 254 or lock receiver 256. In the illustrated example, the chassis 258 defines a channel longitudinally along the outer periphery thereof that is sized to receive the latch case 242 transversely therethrough. In some embodiments, the channel is sized to engage the latch case 242 such that the latch case 242 prevents the chassis 258 from rotating within and relative to the face bore 212E.

The chassis 258 further illustratively defines a recessed plate inwardly of the radial lip, and the plate defines an opening centrally therethrough that is sized to receive the lock receiver 256 and lock receiver spindle 254 therethrough. Between the end of the chassis 258 adjacent to the radial lip and the recessed plate, the chassis 258 defines a cylindrical pocket sized to receive a cylindrical magnet housing 264 therein that is similar to the cylindrical magnet housing 64 described above. The cylindrical magnet housing 264 defines a cylindrical body portion having an outer diameter sized to be received within the pocket of the chassis 258 and to be rotatable within the pocket relative to the chassis 58. A cylindrical shaft extends axially away from the body portion and the shaft has an outer diameter sized to be received within and through the opening defined through the chassis. The body defines a bore centrally therethrough, and the shaft likewise defines an aligned bore centrally therethrough, wherein the axes of the two bores are aligned and the diameter of the bore through the shaft is less than that of the bore through the body. The bore through the body of the magnet housing 264 is sized to receive the lock receiver 256 and the lock receiver spindle 254 therein such that the lock receiver 256 is rotatable relative to the bore through the body, and the bore through the shaft is sized to receive the lock receiver spindle 254 but not the lock receiver 256 therein. The bore through the shaft is shaped complementarily to that of the cam 252A to that the magnet housing 264 axially rotates with the cam 252A about the cylindrical pocket defined by the chassis 258 as illustrated in FIG. 16B.

Distributed about the body portion of the magnet housing 264 between the outer diameter of the body portion and the lock receiver 256, the body portion defines a plurality of bores therein such that central axes of such bores are parallel with the central axes of the bores defined centrally through the magnet housing 264. Each of the magnet bores is illustratively sized to receive therein a different one of a corresponding plurality of cylindrically-shaped magnets 268 each defining a planar face oriented in a direction facing away from the magnet housing 264. A rear surface of the body portion of the magnet housing 264 defines a pair of opposing arcuate slots each sized to receive an arcuate-shaped metal plate 265A, 265B therein. The arcuate plates 265A, 265B illustratively operate to hold the magnets 268 within the magnet bores. A cylindrical cover plate 270 is received over and engages the exposed terminal face of the body portion of the magnet housing 264. The cover plate 270 illustratively defines a bore 270A centrally therethrough that aligns with the bores defined centrally through the magnet housing 264 and the chassis 258, and the bore 270A is sized to receive the lock receiver 256 therein and expose the lock receiver 256 therethrough. In the illustrated embodiment, the terminal face of the cover plate 270 is solid such that it covers the faces of the magnets 268, although in alternate embodiments the magnet cover 270 may define openings therethrough aligned with the magnets 268 as described with respect to the embodiment 10 illustrated in FIGS. 1A-9C. In any case, the magnet housing 264, magnets 268, metal plates 265A, 265B and cover plate 270 together illustratively define a magnet assembly 274 which is coupled to the door handle 250A via the cam 252A and which rotates with the handle 250A and cam 252A within and relative to the chassis 258.

In the illustrated embodiment, the plurality of magnets 268 illustratively include four magnets 268 equally spaced about the periphery of the lock receiver 256 as illustrated in FIG. 16A. Alternatively, the magnet assembly 274 may be configured to include more or fewer magnets, e.g., such that the total number of magnets is one or more. In embodiments which include two or more magnets 268, such magnets may be equally or non-equally spaced about the lock receiver 256, equally or non-equally spaced only partially about the lock receiver 256, or equally and/or non-equally spaced individually and/or in sub-groups about or partially about the lock receiver 256. In any of the foregoing embodiments, each of the one or more magnets 268 may be a conventional permanent magnet. Alternatively or additionally, the one or more magnets 268 may be or include one or more conventional programmable magnets each having programmable magnetic polarities and/or magnetic field strengths and/or each having two or more zones in which the magnetic polarity and/or magnetic field strength is programmable in a conventional manner. In one example such embodiment, which should not be considered to be limiting in any way, a single programmable magnet 268 may be used and programmed in a conventional manner to define at least two magnetic zones having opposite magnetic polarities, and in one specific example, a single programmable magnet 268 may be used and programmed in a conventional manner to define multiple magnetic zones distributed radially about an exposed surface thereof with each zone having a magnetic polarity opposite to the magnetic polarities of adjacent zones.

In embodiments that include the lock receiver 256, the locking end 256A of the lock receiver 256 exposed through the opening 270A is illustratively configured, e.g., keyed, to rotatably engage a locking protrusion carried by the door handle assembly 224, i.e., to couple to the locking protrusion carried by the door handle assembly 224 such that the locking protrusion and the lock receiver 256 rotate together in response to rotation of one or the other. An example configuration of the locking end 256A of the lock receiver 256 is illustrated in the perspective view of FIG. 16A and, in some embodiments, is identical to the locking end 56A of the lock receiver 56.

As described above, the rosette 250B of the leverset 250 and the chassis 258 of the door handle assembly 220 are illustratively coupled to each other and both fixed in position relative to the door 212, whereas the door handle 250A, cam 252A and magnet assembly 274 are rotatable together relative to the rosette 250B, chassis 258 and door 212. In embodiments that include them, the locking button 250D, rotatable shaft 250E, spindle 252B, lock receiver spindle 254 and lock receiver 256 are rotatable together relative to the chassis 258, rosette 250B and door 212, as well as relative to the door handle 250A, cam 252A and magnet assembly 274, to lock and unlock the door handle assembly 220 as also described above.

Referring still generally to the right side of FIG. 15, the deadbolt assembly 350 illustratively includes a rosette 360 to which a deadbolt locking lever 362 is rotatably coupled, a lock receiver cup 364 to which a deadbolt lock receiver 366 is rotatably coupled and a conventional deadbolt latch assembly 352. In the illustrated assembly, the door 212 defines another cylindrical opening or face bore 212G therethrough, i.e., defined through the first and second major surfaces 212C, 212D of the door 212, adjacent to the latch side 212B, and another cylindrical opening or side bore or passageway 212H therein which opens to the face bore 212G. The deadbolt latch assembly 352 includes an elongated latch case 354 coupled to a latch plate 356 from which a deadbolt 358 extends. The elongated latch case 354 is illustratively sized to be received within the side bore or passageway 212H with at least a portion of the latch case 354 extending into the face bore 212G and the latch plate 356 abutting the latch side 212B of the door 212. In some embodiments, the latch side 212B of the door may be mortised to receive the latch plate 356 therein. The latch case 354 is illustratively conventional and defines a bore therethrough sized to receive therethrough a cam extending from the deadbolt locking lever 362. The latch case 354 is operable in a conventional manner to extend the deadbolt 358 therefrom and into engagement with a deadbolt opening in a deadbolt strike plate suitable mounted to the latch-side jamb 214A when the deadbolt locking lever 362 is rotate in one direction, and to withdraw the deadbolt 358 from the deadbolt opening in the deadbolt strike plate when the deadbolt locking lever 362 is rotated in the opposite direction.

Figure 18A:
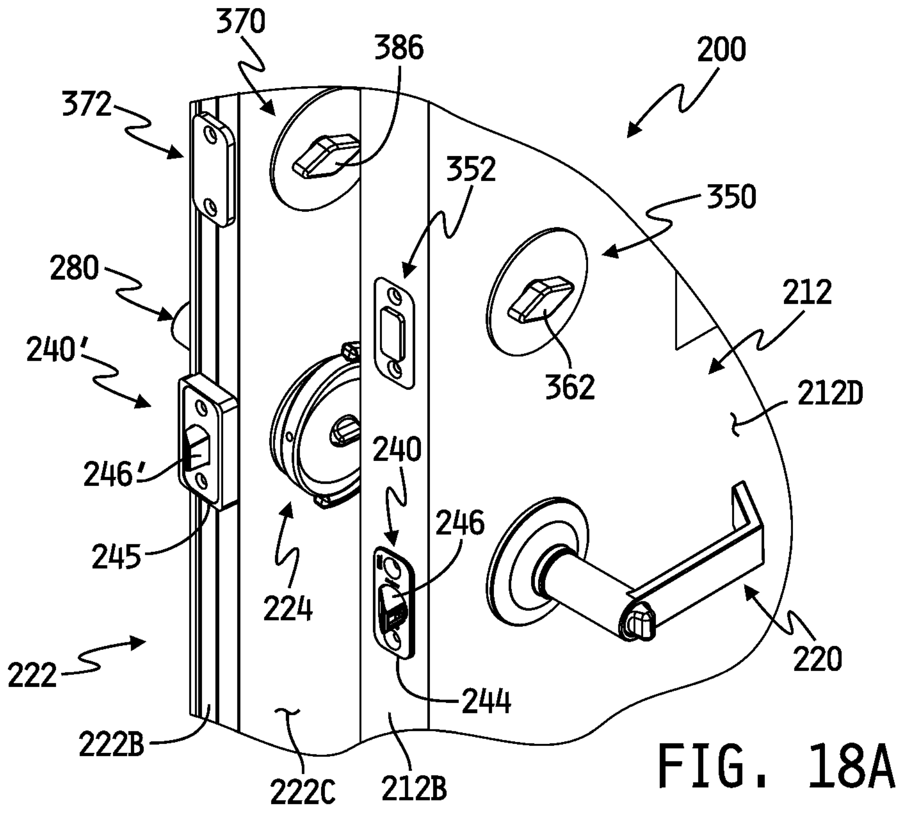
FIG. 18A is a view of the two doors of the door assembly of FIGS. 10-17D from a perspective of one of the doors and shown with the two door handle assemblies decoupled.
Figure 18B:
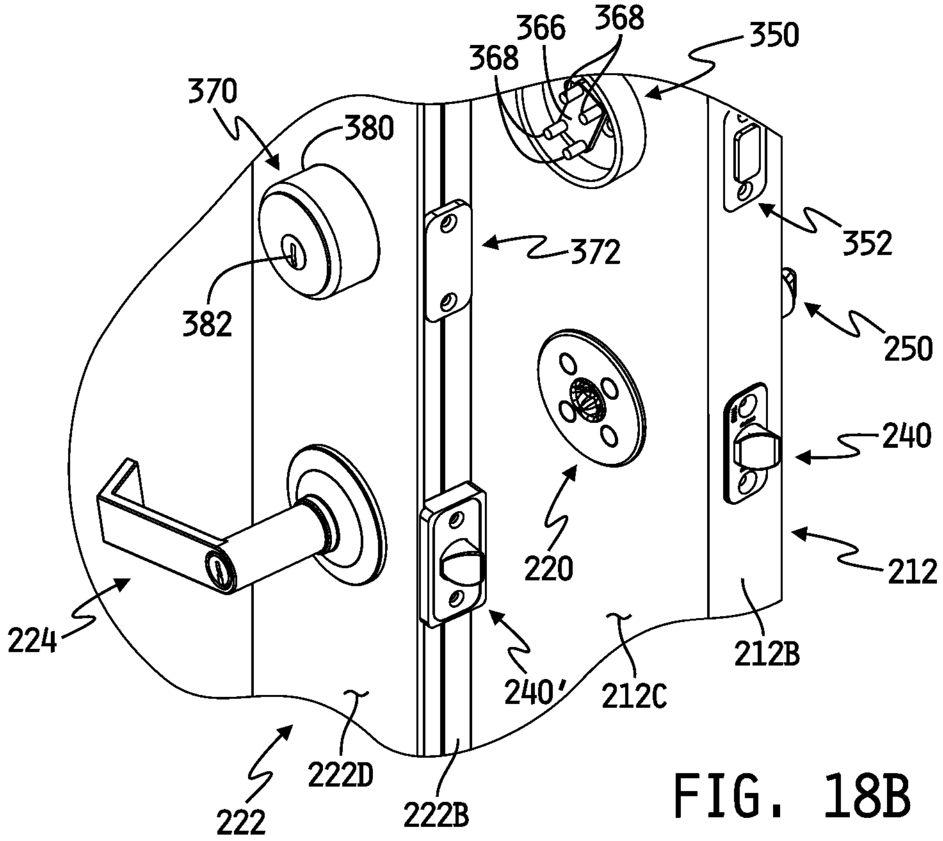
FIG. 18B is another view of the two doors of the door assembly of FIG. 18A from a perspective of the other of the doors.

The rosette 360 is mounted to and through the face bore 212G with at least an outer periphery of the rosette 360 abutting the major surface 212D of the door 212 about the face bore 212G and with the cam of the deadbolt locking lever 362 extending into the face bore 212G and through the bore defined through the latch case 354 of the latch assembly 352. The lock receiver cup 364 is mounted in alignment with the face bore 212G with at least an outer periphery of the cup 364 abutting the major surface 212C of the door 212. The deadbolt lock receiver 366 is positioned centrally within the cup 364 and coupled to the cam of the deadbolt locking lever 362. As illustrated in FIG. 18B, a number of prongs 368 extend outwardly in a pattern from the deadbolt lock receiver 366. The deadbolt lock receiver 364 is thus rotatable with the deadbolt locking lever 362, and rotation of either the deadbolt lock receiver 364 or the deadbolt locking lever 362 operates the deadbolt 358 as described above.

Referring generally now to the left sides of FIGS. 15 and 19 and to FIGS. 17A-17D, the door handle assembly 224 includes a leverset 280 having handle 280A rotatably coupled to a rosette 280B. Generally, the handle 280A may be or include any structure or combination of structures rotatably coupled to the rosette 280B. In the illustrated embodiment, for example, the handle 280A is provided in the form of a conventional lever rotatable relative to the rosette 280B. In alternate embodiments, the handle 280A may be provided in the form of a knob or other structure rotatable relative to the rosette 280B, and in such embodiments the leverset 280 may be alternately referred to as a "handleset." The leverset 280 further includes a cam 282A rotatably coupled to the handle 280A such that the cam 282A rotates with the handle 280A about a rotational axis and such that the cam 282A and the handle 280A rotate together relative to the rosette 280B. In embodiments in which the door handle assembly 224 is lockable, the handle 280A illustratively defines a central bore 280C sized to receive therein a rotatable shaft 280E having one end coupled to a keyway 280D carried by the handle 280A and an opposite end coupled to one end of the spindle 282B, and in such embodiments an axis extending centrally through the bore 280C defines the rotational axis of the handle 280A, cam 282A and spindle 282B. In such embodiments, rotation of the keyway 280D rotates the shaft 280E and spindle 282B relative to and independently of the handle 280A, cam 282A and rosette 280B, and rotation of the spindle 282B likewise rotates the shaft 280E and the locking button 280D relative to and independently of the handle 280A, cam 282A and rosette 280B.

The leverset 280 is mounted to the door 222 with the rosette 280B abutting the major surface 222D of the door 222 about the face bore 222E and with the cam 282A extending into the face bore 222E and through the bore 243' defined through the latch case 242' of the latch assembly 240'. In embodiments which include it, the spindle 282B likewise extends with the cam 282A into the face bore 222E and further extends through the bore 243' defined through the latch case 242' of the latch assembly 240', as described above. A lock member 304 is illustratively affixed to or integral with one end of a lock member spindle 303, and the opposite end of the lock member spindle 303 is coupled to the spindle 282B carried by the cam 282A such that the lock member 304 rotates with the spindle 282B. In the illustrated embodiment, the cam 258A is illustratively provided in the form of an elongated hollow tube illustratively having a square, rectangular or other cross-sectional shape configured to cause one or more components receiving the cam 282A therein or received within the cam 282A to rotate with the cam 282A and vice versa. The spindle 282B is illustratively provided in the form of an elongated structure having a flat and square or rectangular or other cross-sectional shape configured to cause one or more components receiving the spindle 282B therein to rotate with the spindle 282B and vice versa. In the illustrated embodiment, the lock member spindle 303 illustratively defines a channel 305 therein configured complementarily to the shape of the spindle 282B such that the spindle 282B is rotatably coupled to the lock member spindle 303, and thus to the lock member 304, when the spindle 282B is received within the channel 305 defined in the lock member spindle 303. In such embodiments in which the door handle assembly 224 is lockable, the keyway 280D, rotatable shaft 280E, spindle 282B, lock member spindle 303 and lock member 304 are together rotatable relative to the door handle 280A between an unlocked position in which the spindle 282B and/or the rotatable shaft 280E and/or the keyway 280D cooperates with components within the leverset 280 to allow rotation of the cam 282A via the door handle 280A to operate the latch tongue 246' as described above, and a locked position in which the spindle 282B and/or the rotatable shaft 280E and/or the keyway 280D cooperates with components within the leverset 280 to prevent rotation of the cam 282A such that the handle 280A is prevented from rotating to operate the latch tongue 246'. As also described above, the door handle assembly 224 may not include a locking feature in some embodiments, and in such embodiments the keyway 280D, the rotatable shaft 280E, the spindle 282B, the lock member spindle 303 and the lock member 304 may be omitted.

A mounting plate 284, e.g., in the form of an annular disk defines a bore 284A therethrough that is centrally aligned with the face bore 222E. A bushing 288 defines an outer periphery 288E sized to be received within the bore 284A defined through the mounting plate 284. The mounting plate 284 is illustratively affixed to the rosette 280B of the lockset 280 through the face bore 222E, e.g., via one or more conventional fixation members. The mounting plate 284 and the rosette 280B are thus each fixed in position relative to the door 222 such that neither the rosette 280B nor the mounting plate 284 rotates with the handle 280A, cam 282A or spindle 282B.

The bushing 288 defines a bore 288A centrally therethrough sized and configured to receive the cam 282A therein as illustrated in FIG. 17B such that the bushing 282 rotates with the cam 282A. A recess or bore 288D is defined in one end 288B of the bushing 288, and is sized to receive a lock member receiving bushing 320 therein. The walls of the recess or bore 288D are notched 288B, 288C to receive and engage protrusions 320B, 320C extending from the bushing 320 to thereby retain the bushing 320 within the recess or bore 288D. The lock member spindle 303 of the lock member 304 is received within and engages a bore 320A defined by the bushing 320 such that a lock protrusion 306 defined at the opposite end of the lock member 304 protrudes outwardly from the bushing 320. The spindle 282B is received through the bore 288A of the bushing and into the bore 305 of the lock member spindle 303 to engage the lock member 304 such that the lock member 304 rotates with the spindle 282B.

A magnet housing 298 defines a bore centrally therethrough sized to receive the outer periphery 288E of the bushing therethrough. Notches 298C, 298D are defined in the backside of the magnet housing 298 and engage protrusions 289B and 289A respectively extending from the outer periphery 288E of the bushing to rotatably couple the bushing to the magnet housing 298 such that the magnet housing 298 rotates with the bushing 288 which, in turn, rotates with the cam 282A as described above. The backside of the magnet housing 298 further defines opposing arcuate-shaped channels 298A, 298B therein sized to receive complementarily-shaped arcuate metal plates 295A, 295B. At opposite locations about an outer periphery of the magnet housing 298, the magnet housing 298 defines bores 299A, 299B therein each sized to receive a pin connector 312A, 312B. A C-shaped handle 296 defines complementarily configured bores 314A, 314B therein adjacent to each end of the C, and the pin connectors 312A, 312B are received within the bores 314A, 314B to couple the C-shaped handle 296 to the outer periphery of the magnet housing 298.

A rear portion of the bushing 288 extends rearwardly of the mounting plate 284 and the outer periphery 288E of this portion of the bushing 288 illustratively defines a pair of spaced-apart annular channels therein each sized to lockingly engage one of a pair of retaining rings 342A, 342B. For example, the outer periphery 288E of the bushing is illustratively notched at 288F and 288G to receive tabs 342A2 and 342A1 therein so that the retaining rings 342A, 342B do not rotate relative to the bushing 288. The mounting plate 284 is thus trapped between the protrusions 289A, 289B extending from the outer periphery 288E of the bushing 288 on one side and the retaining ring 342B on the other. In any case, a stop ring 340 is illustratively positioned over the outer periphery 288E of the bushing and held in place by the retaining rings 342A, 342B. In one embodiment, the stop ring is illustratively prevented from rotating relative to the outer periphery 288E of the bushing 288 keyed protrusions 340B1 and 340B2 which extending into the notches 288G and 288F respectively of the bushing as illustrated in FIG. 20B. The stop ring 340 illustratively includes a protrusion 340A which is sized and configured to engage a stop protrusion 284C extending axially away from the back side 288B of the mounting plate 284. In the illustrated embodiment, the protrusion 340A extending from the stop ring 340 and the stop protrusion 284C positioned on the back surface 288B of the mounting plate 284 together act as a rotational stopping mechanism which blocks clockwise rotation of the bushing 288 (and thus the magnet housing 298) but which allows counterclockwise rotation of the bushing 288 and the magnet housing 298.

A front face 298G of the magnet housing illustratively defines a plurality of bores 298H distributed about the lock member 304 such that central axes of the bores 298H are parallel with the central axis of the bore 288A defined through the bushing 288. Each of the bores 298H is illustratively sized to receive therein a different one of a corresponding plurality of cylindrically-shaped magnets 302 each defining a planar face oriented in a direction facing away from the magnet housing 298, and each having an opposite planar face magnetically coupled to one of the metal plates 295A, 295B so as to secure the magnets 302 within the bores 298H. In the illustrated embodiment, the bores 298H are sized such that the exposed planar faces of the magnets 302 are co-planar with the exposed front face 298G of the magnet housing 298, although this disclosure contemplates alternate embodiments in which the exposed planar faces of the magnets 302 are at least partially recessed within the bores 298H. The magnet housing 298 illustratively defines a pair of channels therein each sized to receive one of a pair of engagement tabs T1, T2 extending from a rear surface of a disk-shaped cover plate 330. The magnet housing 298 illustratively defines a flexible lip 298F about its outer periphery, and the cover plate 330 illustratively fits against the front surface 298G of the magnet housing 298 with the flexible lip 298F surrounding the outer periphery of the cover 330. In the illustrated embodiment, the cover 330 is solid, although in alternate embodiments the cover 330 may define passageways therethrough which align with the magnets positioned within the bores 298H. In any case, the metal plates 295*a*, 295B, the magnet housing 298, the magnets 302, the cover plate 330 and the handle 296 together illustratively define a magnet assembly 110 which is coupled to the door handle 280A via the cam 282A and which rotates with the handle 280A and cam 282A relative to the mounting plate 284.

In the example embodiment illustrated in FIGS. 15, 17B, 17C and 19, the plurality of magnets 302 illustratively includes four magnets 302 equally spaced about the periphery of the lock member 304. Alternatively, the magnet assembly 310 may be configured to include more or fewer magnets, e.g., such that the total number of magnets is one or more. In embodiments which include two or more magnets 302, such magnets may be equally or non-equally spaced about the lock member 304, equally or non-equally spaced only partially about the lock member 304, or equally and/or non-equally spaced individually and/or in sub-groups about or partially about the lock member 304. In any of the foregoing embodiments, each of the one or more magnets 302 may be a conventional permanent magnet. Alternatively or additionally, the one or more magnets 302 may be or include one or more conventional programmable magnets each having programmable magnetic polarities and/or magnetic field strengths and/or each having two or more zones in which the magnetic polarity and/or magnetic field strength is programmable in a conventional manner. In one example such embodiment, which should not be considered to be limiting in any way, a single programmable magnet 302 may be used and programmed in a conventional manner to define at least two magnetic zones having opposite magnetic polarities, and in one specific example, a single programmable magnet 302 may be used and programmed in a conventional manner to define multiple magnetic zones distributed radially about an exposed surface thereof with each zone having a magnetic polarity opposite to the magnetic polarities of adjacent zones.

One end of a lock member 304 is coupled to the spindle 282B as described above, and the lock member 304 thus rotates with the spindle 282B and keyway 280D relative to the door handle 280A, rosette 280B, mounting plate 284, bushing 288, magnet housing 298 and handle 296. A locking protrusion 306 extends outwardly away from the opposite end of the lock member 304, and the locking protrusion 306 is illustratively configured complementarily to the locking end 256A of the lock receiver 256 such that the locking protrusion 306 rotatably engages the locking end 256A of the lock receiver when the door handle assemblies 220 and 224 are brought together in contact with each other. An example configuration of the locking protrusion 306 extending from the lock member 304 is illustratively the same as that of the locking protrusion 106 illustrated in FIG. 6B and described above, and an example configuration of the locking end 256A of the lock receiver 256 is illustratively the same as that of the locking end 56A of the lock receiver 56 illustrated in FIG. 6A, although it will be understood that other configurations of the locking end 256A of the lock receiver 256 and the locking protrusion 306 extending from the lock member 304 are contemplated.

As described above, the rosette 280B of the leverset 280 and the mounting plate 284 of the door handle assembly 224 are illustratively affixed to each other and both are fixed in position relative to the door 222, whereas the door handle 280A, cam 282A, bushing 288 and magnet assembly 310 are rotatable together relative to the rosette 280B, mounting plate 284 and door 222. In embodiments that include them, the keyway 280D, the spindle 282A and lock member 304 are rotatable together relative to the rosette 280B, mounting plate 284 and door 222, as well as relative to the door handle 280A, cam 282A, bushing 288 and magnet assembly 310, to lock and unlock the door handle assembly 224 as also described above.

Referring still generally to the left side of FIG. 15, the deadbolt assembly 370 illustratively includes a rosette 380 in which a keyway 382 is disposed, a rosette 384 to which a deadbolt locking lever 386 is rotatably coupled, and a deadbolt-less latch assembly 372. In the illustrated assembly, the door 222 defines another cylindrical opening or face bore 222G therethrough, i.e., defined through the first and second major surfaces 222C, 222D of the door 222, adjacent to the latch side 222B, and another cylindrical opening or side bore or passageway 222H therein which opens to the face bore 222G. The deadbolt-less latch assembly 372 includes an elongated latch case 374 coupled to a latch plate 376 with a cover extending over and attached to the latch plate 376. The elongated latch case 374 is illustratively sized to be received within the side bore or passageway 222H with at least a portion of the latch case 374 extending into the face bore 222G and the latch plate 376 abutting the latch side 222B of the door 222. In some embodiments, the latch side 222B of the door may be mortised to receive the latch plate 376 therein. In the illustrated embodiment, the latch-side door stop 17B does not include a deadbolt strike plate, and the latch case 374 is therefore illustratively a dummy latch case 374 and serves only as a pass through between the keyway 382 and the locking lever 382.

The rosette 384 is mounted to and through the face bore 222G with at least an outer periphery of the rosette 384 abutting the major surface 222C of the door 222 about the face bore 222G and with the cam of the deadbolt locking lever 386 extending into the face bore 222G and through the bore defined through the latch case 374 of the deadbolt-less latch assembly 372. The rosette 380 is mounted in alignment with the face bore 222G with at least an outer periphery of the rosette 380 abutting the major surface 222D of the door 222, and the keyway 382 carried by the rosette 380 is coupled to the cam of the deadbolt locking lever 386. As illustrated in FIGS. 18A and 18B, the deadbolt locking lever 386 is configured complementarily to the pattern defined by the number of prongs 368 extending outwardly from the deadbolt lock receiver 366 and/or vice versa such that, when the doors 212, 222 are interlocked the deadbolt locking lever 382 is captured between the prongs 368 and is thereby rotatably coupled to the deadbolt locking lever 362. With the doors 212, 222 interlocked, either the keyway 382 or the deadbolt locking lever 362 may be rotated to operate the deadbolt 358 as described above. When the doors 212, 222 are decoupled, either the deadbolt locking lever 362 or the deadbolt lock receiver 366 may be rotated to operate the deadbolt 358 as described above.

The door handle assemblies 220, 224 may be selectively interlocked, coupled together or otherwise engage each other such that the doors 212, 222 pivot together about the one or more hinge assemblies 216 and may be selectively decoupled or disengaged from each other such that the doors 212, 222 pivot independently from each other about the one or more hinge assemblies 216, e.g., as illustrated in FIGS. 3A-4B and described above respect to the door assembly 10. As also described above with respect to the door assembly 10 and illustrated in FIG. 8, such selective interlocking of the door handle assemblies 220, 224 is illustratively accomplished through selective alignment of the two sets of magnets 268, 302 followed by magnetic coupling of and between the two sets of magnets 268, 302 as the two handle assemblies 220, 224 are subsequently brought into contact with each other. As the two door handle assemblies 220, 224 interlock, the two deadbolt assemblies 350, 370 likewise interlock as described above, and when so interlocked the deadbolt 358 may be operated with the door 212 closed to further secure the door 212 to the latch-side jamb 214B as described above. Selective decoupling or disengagement of the interlocked door handle assemblies 220, 224 is illustratively accomplished by rotating the door lever 250A in a release direction, as will be described below, until the stop ring 340 rotatably coupled to the magnet assembly 310 of the door handle assembly 224 has reached a release position at which the lever 280A of the door handle assembly 224 is prevented from further rotation in the release direction, and then further rotating the door lever 250A in the release direction with a rotational force that is sufficient to overcome the magnetic coupling force between the two sets of magnets 268, 302, thereby decoupling the two door handle assemblies 220, 224.

As described above with respect to the embodiment illustrated in FIGS. 1A-90, the magnets 268, 302 are illustratively arranged such that the exposed surfaces of the magnets 268 alternate in magnetic polarity about the lock receiver 256 and the exposed surfaces of the magnets 302 likewise alternate in magnetic polarity about the lock member 304. With the levers 250A and 280A in their unactuated positions, e.g., both horizontal as illustrated in FIGS. 18A and 18B, the magnetic polarities of the exposed surfaces of the magnets 268 are opposite those of the magnets 302 axially aligned therewith. In the embodiment illustrated in FIGS. 10-22C, the levers 250A and 280A are illustratively each biased to their unactuated or default positions, i.e., positions assumed by the levers 250A, 280A when no external forces outside of the door handle assemblies 220, 224 are acting on them, by the latching assemblies 240, 240' acting on the cams 252A, 282A respectively, e.g., by one or more conventional biasing members carried by the latching assemblies 240, 240' and forcing the cams 252A, 282A respectively to rotate to positions at which the levers 250A, 280A are in their default positions, e.g., with each lever 250A, 280A horizontal as illustrated in FIGS. 15, 16A—17B and 18A—18B. In this embodiment, the interlocking position of the door handle assembly 220 is thus with the lever 250A in its default, unactuated position, and the interlocking position of the door handle assembly 224 is that in which the lever 280A is in its default, unactuated position. In some alternate embodiments, the door handle assembly 220 and/or 224 may alternatively or additionally include one or more conventional biasing members acting directly upon the lever 250A and/or the lever 280A respectively and/or acting upon one or more other component(s) that rotate with the lever 250A and/or the lever 280A respectively, to bias the handle assembly 220, and thus the lever 250A, to its default, unactuated and interlocking position and/or to bias the handle assembly 224, and thus the lever 280A, to its default, unactuated and interlocking position. Those skilled in the art will recognize other conventional structures and/or techniques for biasing the door handle assembly 220 and/or the door handle assembly 224 to its default, unactuated and interlocking position, and it will be understood that any such other conventional structures and/or techniques are contemplated by this disclosure.

As the door handle assemblies 220, 224 are brought toward each other by pivoting one door 212 toward the other door 222, or by pivoting both doors 212, 222 toward each other, about the one or more hinge assemblies 216 as illustrated in FIGS. 18A and 18B, magnetic attractive forces develop between each axially aligned and opposite magnetic polarity pair of magnets in the opposing sets of magnets 268, 302 such that, as the distance between the cover plates 270 and 330 decreases, magnetic attractive forces increase between each aligned pair of the opposing sets of magnets 268, 302 until magnetic coupling occurs between each of the aligned and opposite magnetic polarity pairs of magnets 268, 302 which draws them into contact with each other, thereby magnetically coupling together the door handle assemblies 220, 224 as illustrated in FIG. 20A.

As a result of such magnetic coupling, the door handle assemblies 220, 224, and thus the doors 212, 222 respectively, are secured together adjacent to the latch sides 212B, 222B respectively thereof such that the doors 212, 222 may be pivoted together about the one or more hinge assemblies 216 between common open and closed positions. And because the magnet assembly 274 rotates with the door handle 250A and the magnet assembly 310 rotates with the door handle 280A, rotating the door handle 250A in the clockwise direction or rotating the door handle 280A in the counterclockwise direction, as illustrated by example in FIG. 20A, simultaneously operates both latch assemblies 240, 240' to couple the latch tongues 246, 246' to, and disengage the latch tongues 246, 246' from, the latch plate 215 as described above.

Figure 17D:
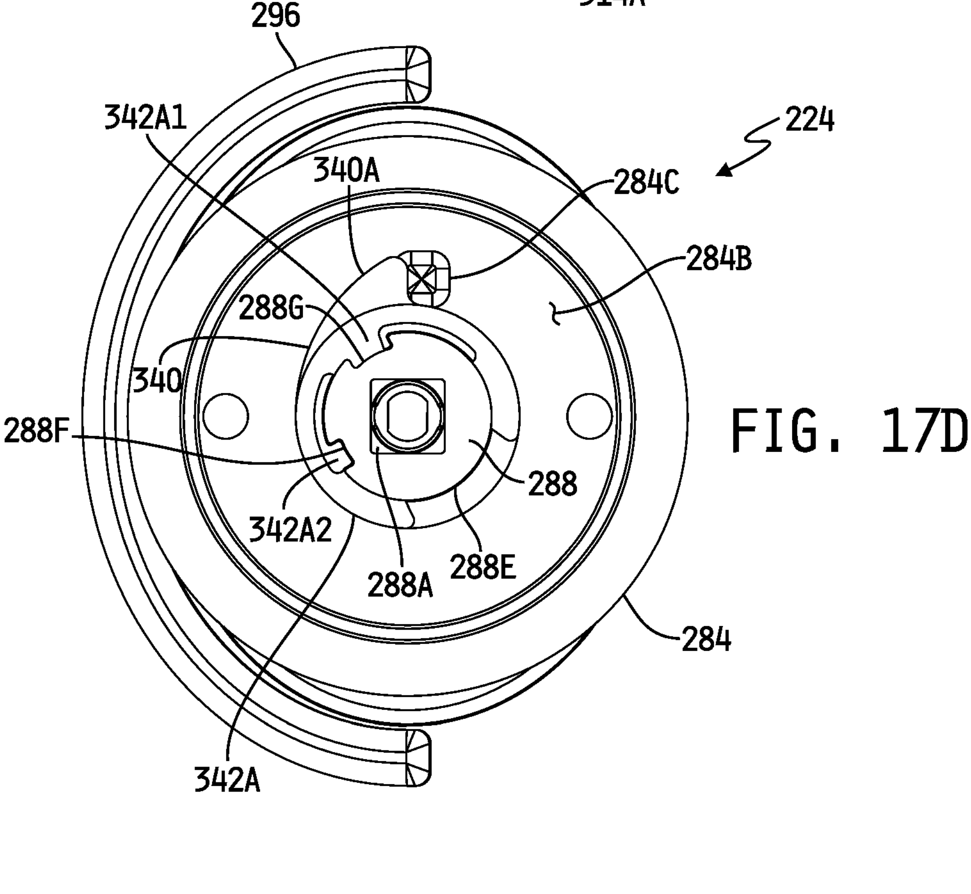
FIG. 17D is a front elevational view of a back side of the magnet assembly of the door handle assembly illustrated in FIGS. 17A-17C.

FIG. 20B illustratively depicts the operation of the stop ring 340 and the stop protrusion 284C when the door handle 280A is rotated in the counterclockwise direction as depicted in FIG. 20A and as just described. As the door handle 280A is rotated counterclockwise, the stop ring protrusion 340A is drawn rotationally away from the stop protrusion 284C positioned on the back side 284B of the mounting plate 284, and as the door handle 280A is then rotated clockwise the stop ring protrusion 340A is drawn rotationally toward and eventually contacts the mounting plate protrusion 284C, thereby preventing further clockwise rotation of the door handle 280A as illustrated in FIG. 17D. This default and unactuated position of the door handle assembly 224 in which the stop ring protrusion 304A is in contact with the mounting plate protrusion 284C thus defines not only the interlocking position of the door handle assembly but also the release position of the door handle assembly 224, and in this position the lever 280A is illustratively horizontal as illustrated in FIGS. 17A and 17B. The door handle 280A of the door handle assembly 280 is thus configured to operate the latch assembly 240' to open the door 222 or to operate both of the latch assemblies 240', 240 to open both of the doors 222, 212 only by rotating the handle 208A counter clockwise to force the stop ring protrusion 340A away from the mounting plate protrusion 284C. It will be appreciated that in some alternate embodiments, the door handle assembly 280 may be alternately configured to operate the latch assembly 240' to open the door 222 or to operate both of the latch assemblies 240', 240 to open both of the doors 222, 212 only by rotating the handle 208A clockwise to force the stop ring protrusion 340A away from the mounting plate protrusion 284C. In any case, positioning of the stop ring protrusion 340A and the mounting plate protrusion 284C relative to operation of the latch tongue 246' of the latch assembly 240' or relative to operation of the latch tongues 246', 246 of the latch assemblies 240', 240 may be as described above with respect to FIGS. 9A-9C.

With the door handle assemblies 220, 224 brought together and interlocked as illustrated in FIGS. 19 and 20A, the locking protrusion 306 extending from the lock member 304 is received within and rotatably engages the locking end 256A of the lock receiver 256. With the locking protrusion 306 rotatably engaged with the locking end 256A of the lock receiver 256, the lock member 304 rotates with rotation of the lock receiver 256 and vice versa such that rotation of the locking button 250D to the locked or unlocked position of the door lever 250A is transferred through the rotatably engaged lock receiver 256 and lock member 304 to also lock or unlock, respectively, the door lever 280A via actuation of the keyway 280D. Rotation of the keyway 280D, e.g., via a complementarily configured key, to the locked or unlocked position of the door lever 280A is likewise transferred through the rotatably engaged lock member 304 and lock receiver 256 to lock or unlock, respectively, the door lever 250A via actuation of the locking button 250D. By rotating either the locking button 250D or the keyway 280D with the door handle assemblies 220, 224 interlocked, i.e., magnetically coupled together, as illustrated in FIGS. 19 and 20A the door levers 250A, 280A can thus be selectively and simultaneously locked/unlocked.

Figure 21B:
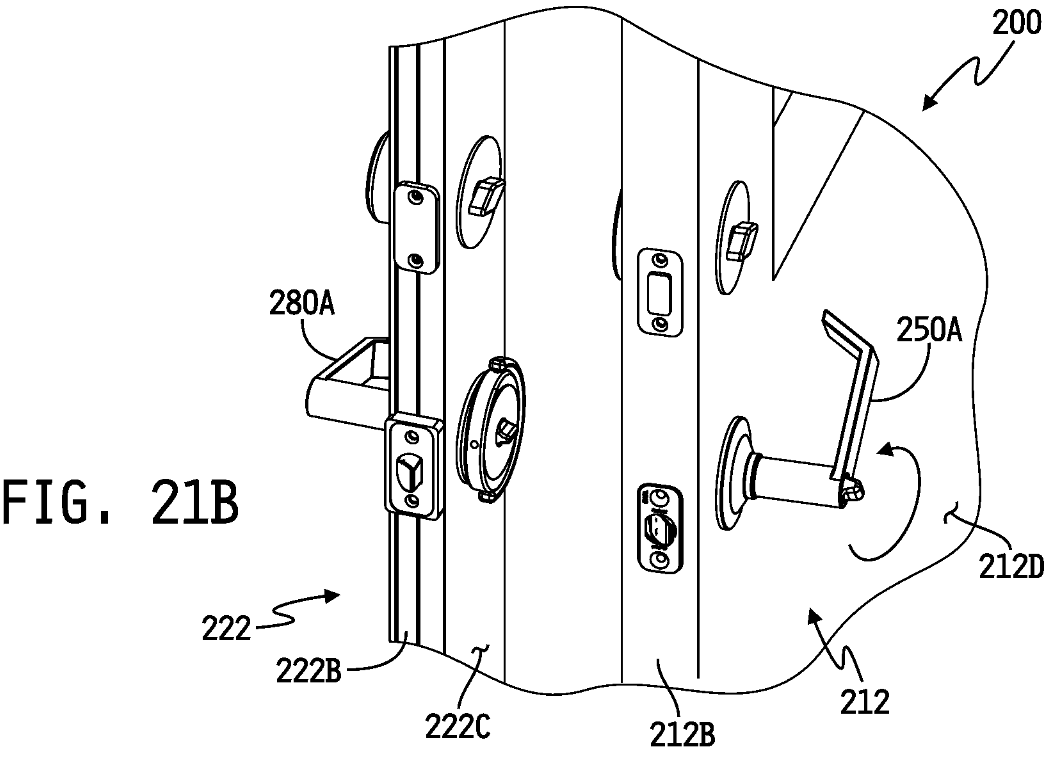
FIG. 21B is a perspective view similar to FIG. 21A shown with the two door handle assemblies decoupled via actuation of one of the door handle assemblies.

As illustrated in FIGS. 21A and 21B, the door handle assemblies 220, 224 may be decoupled by rotating the door handle 250A in the counterclockwise direction with the door lever 280A in its default, unactuated and release position, e.g., with the lever 280A horizontal. With the door lever 280A in its unactuated, default and release position, and as the door lever 250A is rotated in the counterclockwise direction with a force greater than the magnetic coupling forces between the aligned pairs of magnets 268, 302 as illustrated in FIG. 21A, the magnet assembly 274 is caused by the counterclockwise rotation of the lever 250A to also rotate counterclockwise relative to the magnet assembly 310, thereby rotationally drawing the magnets 268 away from the previously aligned and opposite polarity magnets 302. As the magnet assembly 274 continues to rotate with the counterclockwise rotation of the door lever 250A, the exposed surfaces of the magnets 268 continue to be drawn away from the exposed surfaces of magnets 302 having opposite magnetic polarity and toward the exposed surfaces of magnets 302 having like polarities. As the exposed surfaces of the magnets 268 rotate sufficiently away from the exposed surfaces of the previously aligned and opposite polarity magnets 302, the door assemblies 220, 224 magnetically decouple from each other so that the doors 212, 222 may be separated from each other. As the exposed surfaces of the magnets 268 move, e.g., with further counterclockwise rotation of the door lever 250A in the counterclockwise direction, into alignment with the exposed surfaces of magnets 302 having like polarity, magnetic repulsive forces develop therebetween which operate to force the magnet assemblies 274, 310 away from each other, thereby magnetically assisting with the decoupling of the door handle assemblies 220, 224 and with the separation of the doors 212, 222 from each other as illustrated in FIG. 21B.

Figure 22A:
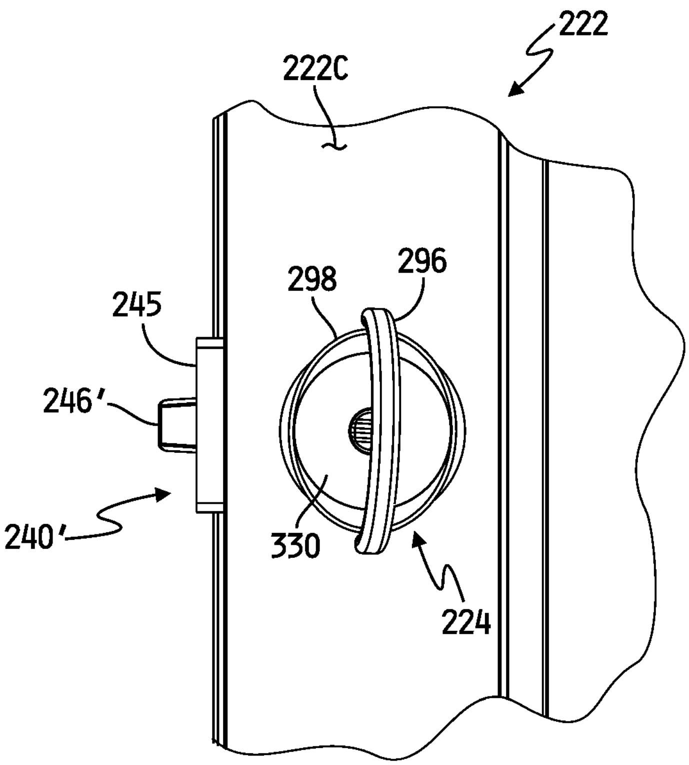
FIG. 22A is an elevational view of the door handle assembly of FIGS. 17A-17D illustrating positioning of the interior handle for opening of a corresponding one of the doors.
Figure 22B:
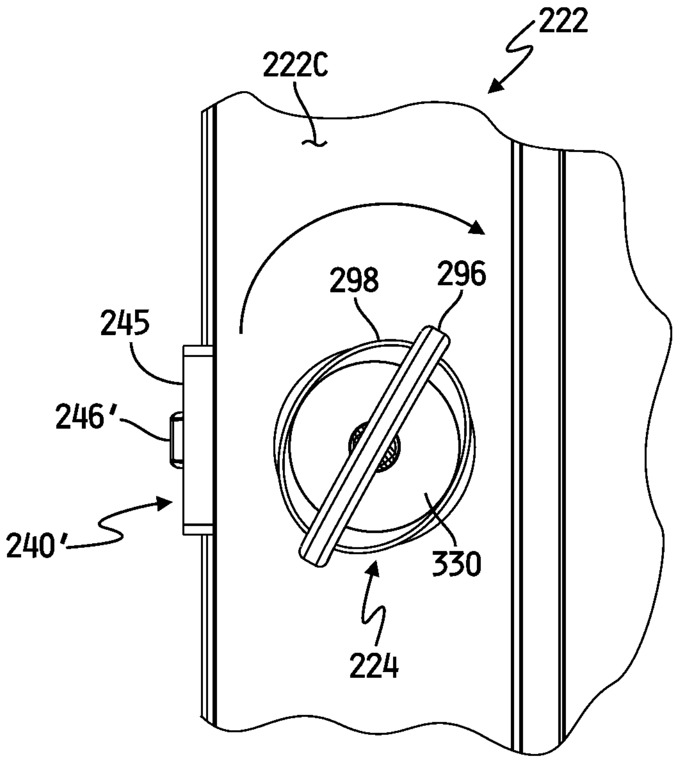
FIG. 22B is an elevational view similar to FIG. 22A illustrating opening of the door via actuation of the door handle assembly of FIGS. 17A-17D.

With the door handle assemblies 220, 224 decoupled from each other as illustrated in FIG. 21B, the door handle assembly 224 is operable from either side, e.g., by rotating the lever 280A and/or the handle 296, to selectively engage and release the latch tongue 246' with and from the strike plate 215. Operation of the door handle 296 is illustrated in FIGS. 22A and 22B. As illustrated in FIG. 21A, the handle 296 is first folded or deployed outwardly from its default position beside the magnet assembly 310, as illustrated in FIGS. 17A and 18A. The handle 296 may then be rotated clockwise as illustrated in FIG. 22B to actuate the latch tongue 246'. In some embodiments, the handle 296 is configured to return to its default position when released.

It will be noted that in the embodiment illustrated in FIGS. 10-22B, the interlocking and release positions of the door handle assembly 224 and therefore the operation and positioning of the door handle assemblies 220, 224 to interlock and release the door handle assemblies 220, 224, are configured differently than in the embodiment illustrated in FIGS. 1A-9C. In the former case, the unactuated, default position of the door handle assembly 224 is both its interlocking and release position such that the door handle assemblies 220, 224 can be interlocked as described above when each of the door handle assemblies 220, 224 are in their unactuated and default positions and, when so interlocked, the latch tongues 246, 246' of both latch assemblies 240, 240' may be operated with the door handle assembly 224 by applying an external rotational force to the lever 280A to rotate it counterclockwise (or clockwise in alternate embodiments) from its unactuated, default position, and when the external rotational force is removed from the lever 280A it automatically returns, under bias, to its unactuated, default position. To then decouple the door handle assemblies 220, 224, an external rotational force is applied to the lever 250A to rotate it counterclockwise which, through the magnetic coupling, applies a clockwise rotational force (or a counterclockwise force in alternate embodiments) to the door handle assembly 224 which is initially in its unactuated, default position. Because the stop ring protrusion 340A is in contact with the mounting plate protrusion 284C in the unactuated, default position of the door handle assembly 224, this is also its release position because the clockwise force applied to the door handle assembly 224 via the counterclockwise force applied to the lever 250A of the door handle assembly 220 further forces the stop ring protrusion 340A against the mounting plate protrusion 284C thereby eventually decoupling the door handle assemblies 220, 224. In the embodiment illustrated in FIGS. 1A-9C, in contrast, the door handle assembly 24 has different interlocking and release positions and no unactuated, default position, i.e., the rotational position of the magnet assembly 110 at any instant in time corresponds to the position to which the interlocking lever 96 was most recently moved. The door handle assembly 24 must be manually moved to its interlocking position, e.g., by manually rotating the interlocking lever 96 clockwise as illustrated in FIG. 6B (or counterclockwise in alternate embodiments), and then forcing the door handle assemblies 20, 24 together to interlock them via magnetic coupling as described above. To decouple the door handle assemblies 20, 24, the door handle assembly 20 must be rotated counterclockwise via counterclockwise rotation of the door handle assembly 20 from its interlocking position, e.g., illustrated in FIG. 6B, to its release position, e.g., illustrated in FIGS. 9B and 9C, and then further rotated counterclockwise via further counterclockwise rotation of the door handle assembly 20 to decouple the door handle assemblies 20, 24. In order to thereafter interlock the door handle assemblies, the interlocking handle 96 must first be manually return, via clockwise rotation thereof, to its interlocking position illustrated in FIG. 6B.

This disclosure contemplates providing the door assembly 10, 210 either as an OEM assembly or as an aftermarket assembly. In the latter case, it will be noted that the jambs 14, 214 and door stop 17, 217, the sill 26, 226 and the door 12, 212 need not be supplied as they will already be in place and mounted to and within a building structure, i.e., such structures will preexist. Rather, in this application, only the one or more hinge assemblies 16, 216, the door 22, 222, the door stop components 19, 219, the door handle assemblies 20, 24 or 220, 224, the latch assemblies 40, 40' or 240, 240' and, in some cases, the strike plate(s) 15A, 15B or 215 need be supplied and installed. In some such applications, the deadbolt assemblies 250, 370 and corresponding latch assemblies 352, 372 may also be supplied and installed. In some such applications, the door stop components 19, 219 may be keyed to facilitate attachment to the existing, corresponding jamb components 14, 214 and/or to the existing, corresponding door stop components 17, 217.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected. For example, embodiments of the interlocking door handle assemblies 20, 24, 220, 224 have been illustrated and described herein as implementing rotatable door handles 50A, 80A, 250A, 280A and in this regard the magnet assemblies 74, 110, 274, 310 the lock receiver 56, 256 and lock member 104, 304, the door handle 96, 296 and the physical stop 120, 122, 340, 284C have all been implemented in the context of such rotatable door handles. It will be understood, however, that this disclosure contemplates alternate embodiments in which either or both of the door handle assemblies include one or more non-rotating door handles, e.g., linearly actuating door handles, non-linearly actuating door handles other than circularly rotating door handles, and the like. Those skilled in the art will recognize that any modifications to one or more of the structures illustrated and described herein for any such alternate embodiment would be a mechanical step in view of the concepts illustrated and described in detail herein.

What is claimed is:

1. A door assembly for selectively interlocking first and second opposing doors each pivotably mounted at a hinge side thereof to a door frame, the door assembly comprising:

a first door handle assembly operatively mounted to the first door at a latch side of the first door opposite the hinge side thereof, and a second door handle assembly operatively mounted to the second door at a latch side of the second door opposite the hinge side thereof, a deadbolt assembly operatively mounted to one of the first door and the second door, the deadbolt assembly having a deadbolt movable in an unlocked state of the deadbolt assembly between extended and retracted positions, a first deadbolt actuator operatively mounted to the first door for locking and unlocking the deadbolt assembly, and a second deadbolt actuator operatively mounted to the second door, the first and second actuators aligned with each other and operatively engaging each other as the first and second door handle assemblies are brought proximate to each other, the deadbolt assembly lockable and unlockable via actuation of either of the operatively engaged first and second deadbolt actuators.

2. The door assembly of claim 1, wherein the first door and the second door each include a deadbolt assembly and actuation of either of the operatively engaged first and second deadbolt actuators will extend or retract both deadbolt assemblies.

3. The door assembly of claim 1, further comprising plural latch assemblies including:

a first latch assembly operatively mounted to the first door, the first latch assembly having a latch tongue movable between extended and retracted positions thereof, a first actuator comprising a first locking element and a first rotatable shaft, a second latch assembly operatively mounted to the second door, the second latch assembly having a latch tongue movable between extended and retracted positions, and a second actuator comprising a second locking element and a second rotatable shaft, the first and second rotatable shafts aligned with each other and operatively engaging each other as the first and second door handle assemblies are brought proximate to each other, the first and second door handle assemblies lockable and unlockable via actuation of either of the operatively engaged first and second actuators.

4. The door assembly of claim 3, wherein a first door handle is operatively coupled to the first latch assembly such that rotation of the first door handle can move the latch tongue of the first latch assembly between the extended and retracted positions thereof, and wherein the second door handle assembly comprises a second door handle that rotates with the second door handle assembly, the second door handle operatively coupled to the second latch assembly such that rotation of the second door handle can move the latch tongue of the second latch assembly between the extended and retracted positions thereof, and wherein rotation of either of the first and second door handles can move the latch tongues of both of the first and second latch assemblies between the extended and retracted positions thereof when the first and second door handle assemblies are coupled together.

5. The door assembly of claim 1, further comprising a latch assembly operatively mounted to at least one of the first door and the second door, the latch assembly having a latch tongue movable between extended and retracted positions thereof and prevented in a locked state of at least one of the first and second door handle assemblies from moving from the extended position to the retracted position thereof.

6. A door assembly for selectively interlocking first and second opposing doors each pivotably mounted at a hinge side thereof to a door frame so as to both open and close in a same rotary direction, the door assembly comprising:

a first door handle assembly operatively mounted to the first door at a latch side of the first door opposite the hinge side thereof, the first door handle assembly carrying at least one first interlocking element having an interlock surface, a second door handle assembly operatively mounted to the second door at a latch side of the second door opposite the hinge side thereof, the second door handle assembly carrying at least one second interlocking element having an interlock surface, the first and second door handle assemblies arranged relative to each other with the first at least one interlocking element aligned with the second at least one interlocking element such that the interlock surfaces of an aligned pair of the first and second interlocking elements can couple with one another, a deadbolt assembly operatively mounted to one of the first door and the second door, the deadbolt assembly having a deadbolt movable in an unlocked state of the deadbolt assembly between extended and retracted positions, a first deadbolt actuator operatively mounted to the first door for locking and unlocking the deadbolt assembly, and a second deadbolt actuator operatively mounted to the second door, the first and second actuators aligned with each other and operatively engaging each other as the first and second door handle assemblies are brought proximate to each other, the deadbolt assembly lockable and unlockable via actuation of either of the operatively engaged first and second deadbolt actuators.

7. The door assembly of claim 6, wherein the first door and the second door each include a deadbolt assembly and actuation of either of the operatively engaged first and second deadbolt actuators will extend or retract both deadbolt assemblies.

8. The door assembly of claim 6, wherein the aligned pair of the first and second interlocking elements can be misaligned by rotation of a door handle of one of the first and second door handle assemblies while the other of the first and second door handle assemblies is restricted from rotation by a stop element limiting rotation in one rotary direction so as to separate the first and second door handle assemblies.

9. The door assembly of claim 6, further comprising:

a door jamb including a hinge-side jamb spaced apart from a latch-side jamb, the first door having a hinge side and a latch side opposite the hinge side thereof, the second door having a hinge side and a latch side opposite the hinge side thereof, the hinge sides of the first and second doors both pivotably mounted to the hinge-side jamb such that the first and second doors pivot individually or together in the same rotary direction relative to the hinge-side jamb between open and closed positions, a door sill assembly connected to the hinge-side jamb and the latch-side jamb, the door sill assembly including a sill surface positioned below and along at least a portion of a bottom surface of the first door when the first door is closed, the door sill assembly also including a dam provided to the sill surface and having a dam surface positioned above the sill surface, the dam positioned below and extending along a bottom surface of the first door when the first door is closed, the bottom surface of the first door passing over the surface of the dam when the first door is opened.

10. The door assembly of claim 9, wherein a single strike plate is mounted to the latch-side jamb, the single strike plate defines the first opening and the second opening.

11. The door assembly of claim 6, wherein the coupled at least one first interlocking element and at least one second interlocking element can be separated to decouple the interlocked first portions of the first and second door handle assemblies by at least one of 1) rotating one of the first portions of the first and second door handle assemblies relative to the other, and 2) applying an actuation force urging the first and second door handle assemblies away from one another with the actuation force being greater than a force of the coupling between the at least one first interlocking element and the at least one second interlocking element.

12. The door assembly of claim 6, further comprising:

a door jamb including a hinge-side jamb spaced apart from a latch-side jamb and a top jamb connected to and between the hinge-side and latch-side jambs, the first door having a hinge side, a latch side opposite the hinge side thereof, a top extending between the hinge and latch sides thereof, a bottom opposite the top thereof, a first major surface between the latch side, hinge side, top and bottom thereof, and a second major surface opposite the first major surface thereof, the second door having a hinge side, a latch side opposite the hinge side thereof, a top extending between the hinge and latch sides thereof, a bottom opposite the top thereof, a first major surface between the latch side, hinge side, top and bottom thereof, and a second major surface opposite the first major surface thereof, the hinge sides of the first and second doors both pivotably mounted to the hinge-side jamb such that the first and second doors pivot individually or together in the same rotary direction relative to the hinge-side jamb between open and closed positions and such that the first major surface of the first door faces the first major surface of the second door when the first and second doors are both closed, a first door stop including a first hinge-side door stop coupled to or integral with and extending along a length of the hinge-side jamb, a first latch-side stop coupled to or integral with and extending along a length of the latch-side jamb and a first top stop coupled to or integral with and extending along a length of the top jamb and coupled to and between top ends of the first hinge-side door stop and the first latch-side door stop, the first hinge-side door stop, the first latch-side door stop and the first top stop together defining a first door stop surface facing the first major surface of the first door when the first door is closed, the first door stop surface defining a physical stop to and about a periphery of the first major surface of the first door, and a second door stop including a second hinge-side door stop coupled to or integral with and extending along a length of the hinge-side jamb and spaced apart from the first hinge-side door stop, a second latch-side stop coupled to or integral with and extending along a length of the latch-side jamb and spaced apart from the first latch-side door stop and a second top stop coupled to or integral with and extending along a length of the top jamb, the second top stop spaced apart from the first top stop and coupled to and between top ends of the second hinge-side door stop and the second latch-side door stop, the second hinge-side door stop, the second latch-side door stop and the second top stop together defining a second door stop surface facing the second major surface of the second door when the second door is closed, the second door stop surface defining a physical stop to and about a periphery of the second major surface of the second door.

13. The door assembly of claim 12, further comprising a first seal material coupled to and along the first door stop surface, the first seal material forming a seal between the first door stop surface and the first major surface of the first door at least partially about a periphery thereof when the first door is closed.

14. The door assembly of claim 13, further comprising a second seal material coupled to and along the second door stop surface, the second seal material forming a seal between the second door stop surface and the second major surface of the second door at least partially about a periphery thereof when the second door is closed.

15. The door assembly of claim 12, further comprising an elongated sweep mounted proximate to and along the bottom surface of the second door, the elongated sweep including at least one elongated flexible member extending downwardly below the bottom surface of the second door so that the elongated flexible member contacts the door sill assembly when the second door is closed yet the elongated sweep passes over the dam when the second door is opened.

16. The door assembly of claim 15, wherein the elongated sweep is adjustable relative to the bottom surface of the second door.

* * * * *